(12) United States Patent
Kitabayashi et al.

(10) Patent No.: US 7,152,982 B2
(45) Date of Patent: Dec. 26, 2006

(54) OPTICAL COMPONENT CASING AND PROJECTOR

(75) Inventors: Masashi Kitabayashi, Horigane-mura (JP); Hideo Yamaguchi, Matsumoto (JP); Hidetoshi Hashizume, Hotaka-machi (JP); Shohei Fujisawa, Matsumoto (JP); Kazuyuki Iinuma, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 74 days.

(21) Appl. No.: 10/796,190

(22) Filed: Mar. 10, 2004

(65) Prior Publication Data

US 2005/0018151 A1  Jan. 27, 2005

(30) Foreign Application Priority Data

Mar. 10, 2003 (JP) ............................. 2003-063087
Mar. 10, 2003 (JP) ............................. 2003-063121
Apr. 18, 2003 (JP) ............................. 2003-114145

(51) Int. Cl.
*G03B 21/14* (2006.01)
*G03B 21/22* (2006.01)

(52) U.S. Cl. ...................................... 353/119
(58) Field of Classification Search ................ 353/119
See application file for complete search history.

(56) References Cited

U.S. PATENT DOCUMENTS 5,988,818 A * 11/1999 Fujimori et al. ............ 353/119
6,059,412 A    5/2000 Sugita
6,592,226 B1 *  7/2003 Fujimori ..................... 353/31
6,882,480 B1 *  4/2005 Yanagisawa ................ 353/33
2005/0001985 A1 * 1/2005 Kitabayashi ................ 353/31

FOREIGN PATENT DOCUMENTS

| JP | U 2-123004 | 10/1990 |
|---|---|---|
| JP | A 5-27344 | 2/1993 |
| JP | A 9-230221 | 9/1997 |
| JP | A 9-329737 | 12/1997 |
| JP | A 10-288812 | 10/1998 |
| JP | 10-319501 | 12/1998 |
| JP | A 11-211957 | 8/1999 |
| JP | 2000-010044 | 1/2000 |
| JP | 2001-042281 | 2/2001 |
| JP | A 2002-31843 | 1/2002 |
| JP | A 2003-57529 | 2/2003 |
| TW | 478608 | 3/2002 |

* cited by examiner

Primary Examiner—Christopher Mahoney
(74) Attorney, Agent, or Firm—Oliff & Berridge, PLC

(57) ABSTRACT

An optical component casing (25) having a plurality of holes penetrating toward the inside thereof includes a casing body which is constituted of a container (25A), in which a plurality of optical components are housed and arranged therein, and a lid (25B), and a plurality of positioning members (253) for positioning the plurality of optical components at predetermined positions in the casing body. The plurality of positioning members (253) abut on the optical components by being inserted through the plurality of holes to position the optical components at the predetermined positions on an illumination optical axis of light beam irradiated by a light source.

31 Claims, 60 Drawing Sheets

FIG.37
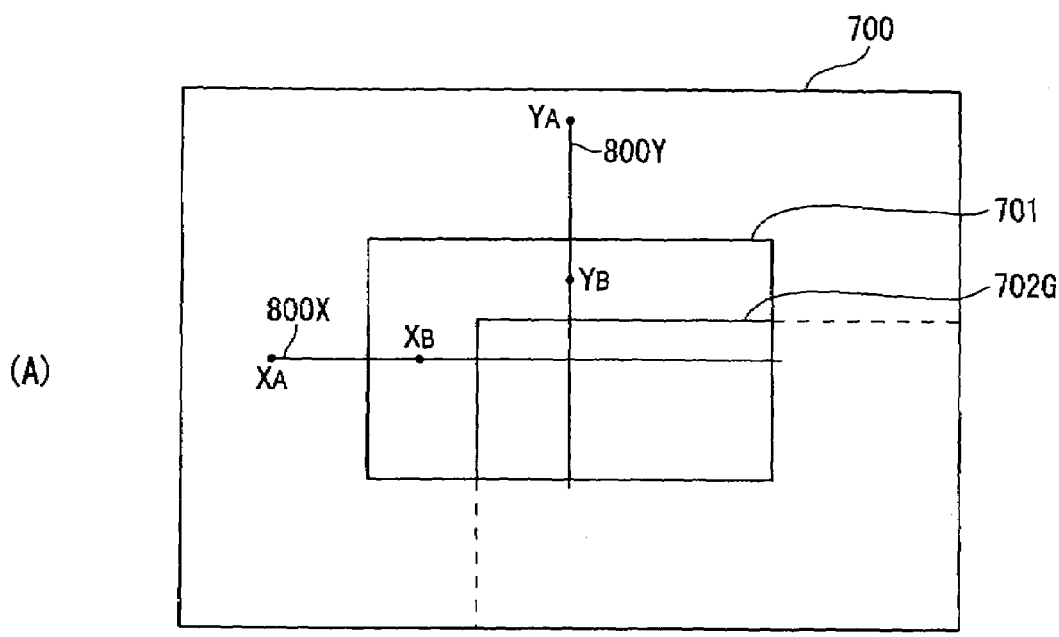
(A)
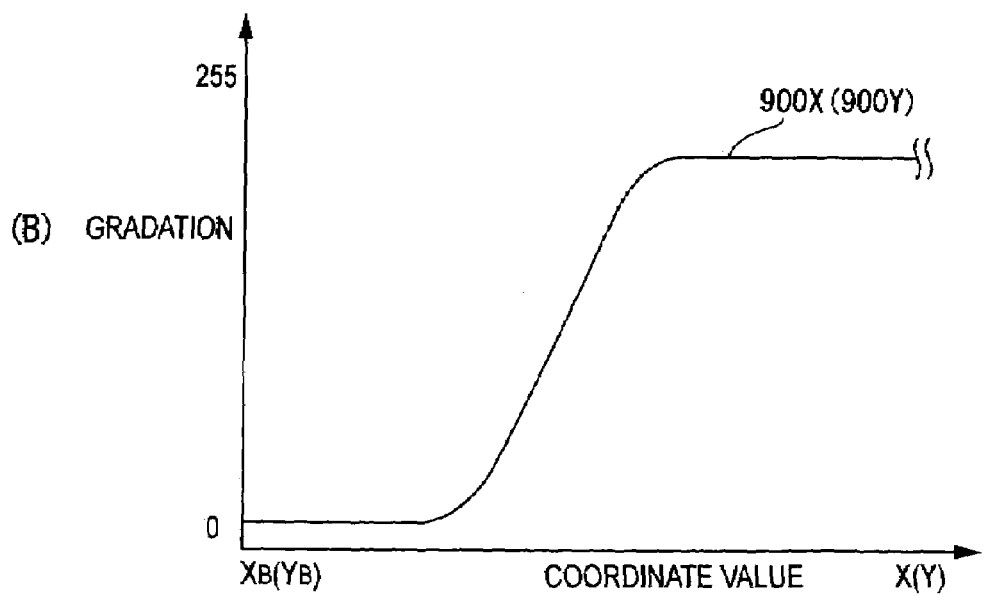
(B)

OPTICAL COMPONENT CASING AND PROJECTOR

TECHNICAL FIELD

The present invention relates to an optical component casing and a projector.

BACKGROUND ART

Conventionally, a projector that makes an optical modulator to modulate a light beam irradiated by a light source in accordance with image information and form an optical image and projects the optical image in an enlarged manner has been known (for example, refer to Patent Publication 1 (JP2002-31843A)).

The projector includes optical components such as a lens for superposing the light beam irradiated by the light source on an image formation area of the optical modulator, a dichroic mirror for separating the light beam irradiated by the light source into three color lights (R, G and B) and a reflection mirror for conducting the light beam irradiated by the light source to the optical modulator, and an optical component casing, in which the optical components are housed and arranged at predetermined positions on an illumination optical axis of the light beam irradiated by the light source.

The optical component casing, which is a synthetic resin molding product manufactured by molding such as injection molding, has a groove formed on an inner side thereof to serve as an external position reference face of the optical component so that the optical component slides and fits to the groove.

However, the groove formed on the inner side of the optical component casing requires to be highly accurately formed to house and arrange the respective optical components at predetermined positions on the illumination optical axis of the light beam irradiated by the light source. Accordingly, since a molding die for the optical component casing needs to be a complicated profile and to be highly accurately manufactured, manufacturing of the optical component casing may be difficult while the production cost thereof may be increased.

An object of the present invention is to provide an optical component casing and a projector that can reduce the production cost and can easily be manufactured.

DISCLOSURE OF THE INVENTION

An optical component casing according to an aspect of the present invention with an illumination optical axis of light beam irradiated by a light source being set therein, in which a plurality of optical components are housed and arranged at predetermined positions on the illumination optical axis, the optical component casing includes: a casing body having a plurality of holes penetrating toward the inside thereof, in which the plurality of optical components are housed and arranged therein; and a plurality of positioning members for positioning the plurality of optical components at the predetermined positions in the casing body, in which the plurality of positioning members are inserted to the plurality of holes to abut on the optical components so that the plurality of optical components are positioned at the predetermined positions on the illumination optical axis of the light beam irradiated by the light source.

The casing body may be any profile as long as the plurality of optical components can be housed and arranged therein. For instance, the casing body may be a container structure or a hollow structure.

Further, the casing body may be a synthetic resin molding product manufactured by molding such as injection molding in the same manner as the conventional art, a structure formed by sheet metal processing, or a structure formed by BMC (Bulk Molding Compound).

For instance, the plurality of holes include an opening of the container when the casing body is formed in a container structure.

With this arrangement, the optical component casing includes the casing body and the plurality of positioning members. The plurality of positioning members are inserted from the outside of the casing body to the inside thereof through the holes to abut on the optical components. Accordingly, after the optical components are shifted and the positions are adjusted, the optical components can be easily positioned at the predetermined positions on the illumination optical axis of the light beam irradiated by the light source. Thus, the plurality of optical components can be housed and arranged at the proper positions in the casing body by way of the plurality of positioning members without highly accurately manufacturing the casing body, thus easily manufacturing the optical component casing and reducing the production cost thereof.

Further, since the positioning members abut on the optical components to position the optical components at the predetermined positions in the casing body, when the optical components are fixed in the casing body together with the positioning members, a member such as a holder frame for holding the optical components can be omitted, thereby reducing the production cost of the optical unit when the optical unit including the optical components and the optical component casing is manufactured.

Preferably, in the above optical component casing, the casing body is formed by sheet metal processing.

According to this arrangement, since the casing body is formed by sheet metal processing, the casing body can further easily be manufactured and the production cost of the optical component casing can further be reduced as compared to the conventional optical component casing which is a synthetic resin molding product which has an external position reference face therein and requires highly accurate manufacturing.

Since the casing body is made of metal, heat generated at the plurality of optical components due to irradiation of the light beam irradiated by the light source can be radiated to the casing body, cooling efficiency of the optical components can be enhanced.

Preferably, in the above optical component casing, the plurality of positioning members include a parallel arrangement positioning member that abuts on the optical component arranged along an inner side of the casing body to position the optical component at the predetermined position on the illumination optical axis of the light beam irradiated by the light source.

For example, the optical component arranged along the inner side of the casing body is a full reflection mirror for conducting the light beam irradiated by the light source to a predetermined position.

With this arrangement, for example, the parallel arrangement positioning member is inserted from the outside of the casing body to the inside thereof through the hole to abut on a back side of the optical component such as the full reflection mirror or an end of the optical component such as the full reflection mirror so that the optical component can easily positioned at the predetermined position on the illumination optical axis of the light beam irradiated by the light source, after the optical component is shifted and the position thereof is adjusted. When the optical component is fixed on the casing body together with the parallel arrangement positioning member, the light beam irradiated by the light source can be prevented from being shielded due to the parallel arrangement positioning member.

Preferably, in the above optical component casing, the parallel arrangement positioning member has a plurality of pins inserted to the plurality of holes to abut on the optical component.

With this arrangement, when the plurality of pins are shifted to shift the optical component such as the full reflection mirror for positioning at the predetermined position with the plurality of pins inserted from the outside of the casing body to the inside thereof and abutting on the back side of the optical component such as the full reflection mirror or the end of the optical component such as the full reflection mirror, the optical component such as the full reflection mirror can be easily positioned at the predetermined position by shifting the plurality of pins to the inside or the outside of the casing body.

Further, when the optical component such as the full reflection mirror is fixed on the casing body together with the plurality of pins, the plurality of pins reduce an external force so that the position of the optical component such as the full reflection mirror can be fixed on the casing body without displacement.

Preferably, in the above optical component casing, the parallel arrangement positioning member includes a plate body integrating the plurality of pins.

With this arrangement, since the parallel positioning member includes the plate body, for instance, when the optical component such as the full reflection mirror is shifted by shifting the plurality of pins to position at the predetermined position, each pin can be shifted at once only by shifting the plate body so that the optical component such as the full reflection mirror is positioned at the predetermined position. Accordingly, the optical component can further be easily positioned.

Further, since the plurality of pins are integrated by the plate body and the positions of the plurality of pins are relatively fixed, when the optical component such as the full reflection mirror is fixed on the casing body together with the parallel arrangement positioning member, the position of the optical component such as the full reflection mirror can further preferably be fixed on the casing body.

Further, when the optical component is replaced etc., the plurality of pins can be removed at once without a cumbersome work of removing the plurality of pins one by one, thus enhancing reworkability of the optical component.

Preferably, in the above optical component casing, the plurality of positioning members include orthogonal arrangement positioning members each of which abuts on the optical component housed in the casing body in a manner orthogonal to the illumination optical axis of the light beam irradiated by the light source to position the optical component at the predetermined position on the illumination optical axis of the light beam irradiated by the light source.

For example, the optical component housed in the casing body to be orthogonal to the illumination optical axis of the light beam irradiated by the light source may be a light beam separating optical element for separating the light beam irradiated by the light source, a focusing optical element for focusing the light beam irradiated by the light source at a predetermined position, or the like.

With this arrangement, for example, the orthogonal arrangement positioning member is inserted from the outside of the casing body to the inside thereof through the hole to abut on the outer periphery of the optical component such as the light beam separating optical element or the focusing optical element so that the optical component such as the light beam separating optical element or the focusing optical element can easily positioned at the predetermined position on the illumination optical axis of the light beam irradiated by the light source by way of the orthogonal arrangement positioning member, after the optical component is shifted and the position thereof is adjusted.

Preferably, in the above optical component casing, the orthogonal arrangement positioning member has a groove having a V-shaped cross-section so that the groove abuts on an outer periphery of the optical component.

With this arrangement, since the orthogonal arrangement positioning member has the groove having a V-shaped cross-section, the orthogonal arrangement positioning member can securely abut on the outer periphery of the optical component. Accordingly, the optical component can accurately be positioned by the orthogonal arrangement positioning member.

Further, since the groove of the orthogonal arrangement positioning member abuts on the outer periphery of the optical component so that the optical component is positioned at the predetermined position in the casing body, when the optical component is fixed on the casing body together with the orthogonal arrangement positioning member, the orthogonal arrangement positioning member reduces an external force so that the position of the optical component can be fixed on the casing body without displacement.

Preferably, in the above optical component casing, a support portion for supporting the positioning member is formed at the hole.

With this arrangement, since the support portion is formed at the hole, the positioning member can smoothly be shifted to accurately position the optical component.

Further, when the optical component is fixed on the casing body together with the positioning member, the position of the optical component can further securely be fixed by the positioning member and the support portion for supporting the positioning member.

Preferably, in the above optical component casing, the hole is formed by cutting and folding a part of a lateral side of the casing body, and the cut and folded part of the lateral side serves as the support portion.

With this arrangement, since the hole and the support portion are formed by cutting and folding the part of the lateral side of the casing body, the hole and the support portion can easily be formed, and consequently, the optical component casing can further easily be manufactured and the production cost thereof can be reduced.

Preferably, the above optical component casing further includes: a pair of plate members opposite to both ends of the optical component housed in an inclined manner relative to the lateral side of the casing body, in which the plurality of positioning members include an inclined arrangement positioning member that includes spacers respectively interposed between the both ends of the optical component and the plate members to position the optical component at the predetermined position on the illumination optical axis of the light beam irradiated by the light source by way of the spacers.

For example, the optical component housed in an inclined manner relative to the lateral side of the casing body may be a color-separating optical element for separating the light beam irradiated by the light source into a plurality of color lights.

Further, the lateral side of the casing body may be a plate member, or components of the casing body except for the lateral side may be plate members.

With this arrangement, since the inclined arrangement positioning member includes the spacer, the optical component such as the color-separating optical element can easily be positioned at the predetermined position on the illumination optical axis of the light beam irradiated by the light source, by interposing the spacer between the end of the optical component such as the color-separating optical element and the plate member, after the optical component is shifted and the position thereof is adjusted.

Further, since the spacer of the inclined arrangement member is interposed between the end of the optical component such as the color-separating optical element and the plate member to position the optical component at the predetermined position in the casing body, when the optical component is fixed in the casing body together with the spacer, a member such as a holder frame for holding the optical components such as the color-separating optical element can be omitted, thereby reducing the production cost of the optical unit when the optical unit including the optical components and the optical component casing is manufactured.

Preferably, in the above optical component casing, the inclined arrangement positioning member includes the spacers, a mount fixed on the bottom side of the casing body and the pair of plate members vertically provided on the mount.

With this arrangement, since the inclined arrangement positioning member includes the spacer, the mount and the plate member, the lateral side of the casing body is not required to be formed as a plate member. In other words, even when the profile of the optical component such as the color-separating optical element is changed, the profile of the casing body is not necessary to be changed, but the plate member of the inclined arrangement positioning member can correspond by changing the adjacent distance thereof.

Preferably, in the above optical component casing, each part of the pair of plate members is cut and folded toward the other plate member, and the cut and folded part of the plate member serves as a support portion for supporting the spacer.

With this arrangement, since the spacer is supported by the support portion, the spacer can smoothly be shifted to accurately position the optical component.

Further, when the optical component is fixed on the casing body together with the spacer, the position of the optical component such as the color-separating optical element can securely be fixed by the spacer and the support portion for supporting the spacer.

Preferably, in the above optical component casing, the spacer has a face slanted along an inclined direction of the optical component.

With this arrangement, since the spacer has the slanted face, the spacer can securely abuts on the end of the optical component. Accordingly, the optical component can accurately be positioned by the spacer.

Further, since the optical component is positioned at the predetermined position in the casing body with the slanted face of the spacer abutting on the end of the optical component, when the optical component is fixed on the casing body together with the spacer, the fixing state of the optical component can securely be maintained on the casing body.

An optical component casing according to another aspect of the present invention with an illumination optical axis of light beam irradiated by a light source being set therein, in which a plurality of optical components are housed and arranged at predetermined positions on the illumination optical axis, the optical component casing includes: a casing body having a hole penetrating toward the inside thereof and support portions for supporting a group of the plurality of optical components; and a plurality of positioning members for positioning the rest of the plurality of optical components at predetermined positions in the optical component casing, in which the plurality of positioning members are inserted to the holes to abut on the optical components so that the rest of the optical components are positioned at the predetermined positions on the illumination optical axis of the light beam irradiated by the light source, in which the group of the optical components are held by the support portions while being positioned at the predetermined positions on the illumination optical axis of the light beam irradiated by the light source, and in which each one side of the group of the optical components is fixed on each one side of the support portions.

The casing body may be any profile as long as the plurality of optical components can be housed and arranged therein. For instance, the casing body may be a container structure or a hollow structure in the same manner as the above-described casing body of the optical component casing. Further, for example, the casing body may be a synthetic resin molding product manufactured by molding such as injection molding in the same manner as the conventional art, a structure formed by sheet metal processing, or a structure formed by BMC (Bulk Molding Compound).

With this arrangement, a group of the plurality of optical components are fixed on the support portions formed on the inner side of the casing body while positioned at the predetermined positions on the illumination optical axis of the light beam irradiated by the light source. Accordingly, the manufacturing accuracy of the some of the optical components need not to be so high. Further, the rest of the optical components of the plurality of optical components are positioned at the predetermined positions by way of the positioning members inserted from the outside of the casing body to the inside thereof. Accordingly, the casing body may not highly accurately be manufactured, thus easily manufacturing the optical component casing and reducing the production cost thereof.

Further, when the group of the optical components are directly fixed on the support portions and the rest of the optical components are fixed in the casing body together with the positioning members, a member such as a holder frame for holding the plurality of optical components can be omitted, thereby reducing the production cost of the optical unit when the optical unit is manufactured.

For instance, since the positioning members are used only for the rest of the optical components requiring relatively high positioning accuracy, the number of the positioning members may be minimized, thus reducing the weight and the production cost of the optical component casing based upon the omission of the members. Further, when the optical unit is manufactured, the placement process of the positioning member can be simplified, thus quickly manufacturing the optical unit and reducing the production cost thereof.

Preferably, in the above optical component casing, a groove is formed on each of the support portions at a position abutting the one side of the group of the optical components to inject an adhesive for fixing the group of the optical components.

With this arrangement, since the groove for injecting the adhesive is formed on the support portion, the adhesive can easily be injected between the support portion and the group of the optical components. When the adhesive is applied between the support portion and the group of the optical components, the group of the optical components can be prevented from the adhesive unnecessarily adhering. For instance, even when the gap between the support portion and the group of the optical components becomes narrow due to manufacturing error of the casing body, the adhesive can easily be injected between the support portions and the group of the optical components.

Preferably, in the above optical component casing, the groove is formed in an approximately planarly-viewed straight line extending from a first side of the support portion to a second side opposite to the first side so that an outflow of the adhesive from the first side to the second side opposite to the first side is restricted by a terminal on the second side.

Restricting the outflow of the adhesive from the first side to the second side opposite to the first side by the terminal opposite to the first side means that the groove does not penetrate from the first side to the second side opposite to the first side.

With this arrangement, since the groove does not penetrate from the first side to the second side opposite to the first side, the adhesive does not leak from the second side opposite to the first side when the adhesive is injected between the support portions and the group of the optical components, thus preventing the casing body from the adhesive unnecessarily adhering.

An optical component casing according to still another aspect of the present invention with an illumination optical axis of light beam irradiated by a light source being set therein, in which a plurality of optical components are housed and arranged at predetermined positions on the illumination optical axis, the optical component casing includes: a plurality of support portions formed on an inner side of the optical component casing for respectively supporting the plurality of optical components, in which the plurality of optical components are respectively held by the plurality of support portions while being positioned at the predetermined positions on the illumination optical axis of the light beam irradiated by the light source, and in which each one side of the plurality of optical components is respectively fixed on each one side of the plurality of support portions.

The optical component casing may be any profile as long as the plurality of optical components can be housed and arranged therein. For instance, the casing body may be a container structure or a hollow structure in the same manner as the above-described casing body of the optical component casing. Further, for example, the casing body may be a synthetic resin molding product manufactured by molding such as injection molding in the same manner as the conventional art, a structure formed by sheet metal processing, or a structure formed by BMC (Bulk Molding Compound).

With this arrangement, the plurality of optical components are fixed on the plurality of support portions formed on the inner side of the optical component casing with the optical components positioned at the predetermined positions on the illumination optical axis of the light beam irradiated by the light source device. Thus, the plurality of optical components can be housed and arranged at the proper positions in the casing body without highly accurately manufacturing the optical component casing, thus easily manufacturing the optical component casing and reducing the production cost thereof.

Further, as compared to the above-described optical component casing, the positioning member can be omitted so that the production cost of the optical component casing can further be reduced as well as the weight of the optical component casing can be reduced, and consequently, the weight of the optical unit can be reduced. Further, when the optical unit is manufactured, the placement process of the positioning member can be simplified, thus quickly manufacturing the optical unit and reducing the production cost thereof.

Preferably, in the above optical component casing, at least one of the support portions is formed in a profile having a V-shaped cross-section to sandwich and support both sides of the optical component, and each inner side of the support portions is fixed on at least one of the both sides of the optical component.

With this arrangement, since at least one of the plurality of support portions are formed in a profile having a V-shaped cross-section and the optical component is fixed on the inner side thereof, the optical component can preferably be supported, and the support portion reduces an external force so that the position of the optical component can be fixed on the optical component casing without displacement.

Preferably, in the above optical component casing, at least one of the plurality of support portions projects from the inner side of the optical component casing to support the optical component arranged along the inner side at a projected tip end thereof, and the tip end of the support portion is fixed on the one side of the optical component.

For example, the optical component arranged along the inner side of the optical component casing may be a full reflection mirror for conducting the light beam irradiated by the light source to a predetermined position.

With this arrangement, at least one of the plurality of support portions projects from the inner side of the optical component casing. For example, the back side of the optical component such as the full reflection mirror is fixed on the tip end of the support portion. Accordingly, a gap with the dimension of the support portion projecting is formed between the inner side of the optical component casing and the back side of the optical component such as the full reflection mirror. Thus, when the optical component such as the full reflection mirror is replaced, the optical component such as the full reflection mirror can easily be removed from the optical component casing by inserting a tip end of a driver etc. into the gap, thereby enhancing reworkability of the optical component.

Preferably, in the above optical component casing, the optical component casing is a synthetic resin molding product having a frame-shaped hole formed on the inner side of the optical component casing to planarly surround the support portion.

For instance, the hole may be continuously formed in a frame-shape, or formed in a frame-shape though not being continued.

With this arrangement, since the optical component casing is a synthetic resin molding product and the frame-shaped hole is formed on the inner side of the optical component casing, the part of the inner side, where the support portion is formed, is likely to be broken from the optical component casing. Accordingly, when the optical component such as the full reflection mirror bonded to the tip end of the support portion by the adhesive is removed from the optical component casing, even when the adhesion is adhered on the tip end, the adhesive would not be remained in the optical component casing by breaking the part of the inner side where the support portion is formed. Thus, the optical component casing can be recycled.

Preferably, in the above optical component casing, a groove for an adhesive for fixing the optical component to be injected is formed on the support portion at a position abutting on the optical component.

With this arrangement, since the groove for injecting the adhesive is formed on the support portion, the adhesive can easily be injected between the support portion and the optical component. When the adhesive is applied between the support portion and the optical components, the optical components can be prevented from the adhesive unnecessarily adhering. For instance, even when the gap between the support portion and the optical component becomes narrow due to manufacturing error of the optical component casing, the adhesive can easily be injected between the support portion and the optical component.

An optical component casing according to further aspect of the present invention with an illumination optical axis of light beam irradiated by a light source being set therein, in which a plurality of optical components are housed and arranged at predetermined positions on the illumination optical axis, a plurality of holes into which each part of positioning jigs for positioning the plurality of optical components at the designed predetermined positions can be inserted are formed on a side of the optical component casing.

The optical component casing may be any profile as long as the plurality of optical components can be housed and arranged therein. For instance, the casing body may be a container structure or a hollow structure in the same manner as the above-described casing body of the optical component casing. Further, for example, the casing body may be a synthetic resin molding product manufactured by molding such as injection molding in the same manner as the conventional art, a structure formed by sheet metal processing, or a structure formed by BMC (Bulk Molding Compound).

With this arrangement, since the plurality of holes are formed on the side of the optical component casing, the parts of the positioning jigs can be inserted through the plurality of holes so that the optical component can be positioned by way of the positioning jigs. Therefore, as compared to the optical component casing having an external position reference face therein and requiring highly accurate manufacturing, the optical component casing can easily be manufactured and the production cost thereof can be reduced without requesting high manufacturing accuracy.

Further, as compared to the above-described optical component casing, the positioning member can be omitted so that the production cost of the optical component casing can further be reduced and the weight of the optical component casing can be reduced, and consequently, the weight of the optical unit can be reduced. Further, when the optical unit is manufactured, the placement process of the positioning member can be simplified, thus quickly manufacturing the optical unit and reducing the production cost of the optical unit.

A projector according to still further aspect of the present invention includes: the above optical component casing; a plurality of optical components housed and arranged in the optical component casing to form an optical image in accordance with image information; and a projection optical device for projecting the optical image formed by the plurality of optical components in an enlarged manner.

According to the above aspect of the present invention, since the projector has the above-described optical compo nent casing, the same functions and advantages as the above-described optical component casing can be obtained. Further, since the manufacturing of the optical component casing is facilitated while the production cost thereof is reduced, the manufacturing of the projector is also facilitated while the production cost thereof is reduced.

BRIEF DESCRIPTION OF THE DRAWINGS

FIG. 37 is an illustration showing an example of a method for acquiring a luminance curve by a luminance curve acquiring unit according to the aforesaid embodiment;

BEST MODE FOR CARRYING OUT THE INVENTION (1) First Embodiment

A first embodiment of the present invention will be described below with reference to the attached drawings.

(1-1) Structure of Projector

Figure 1:
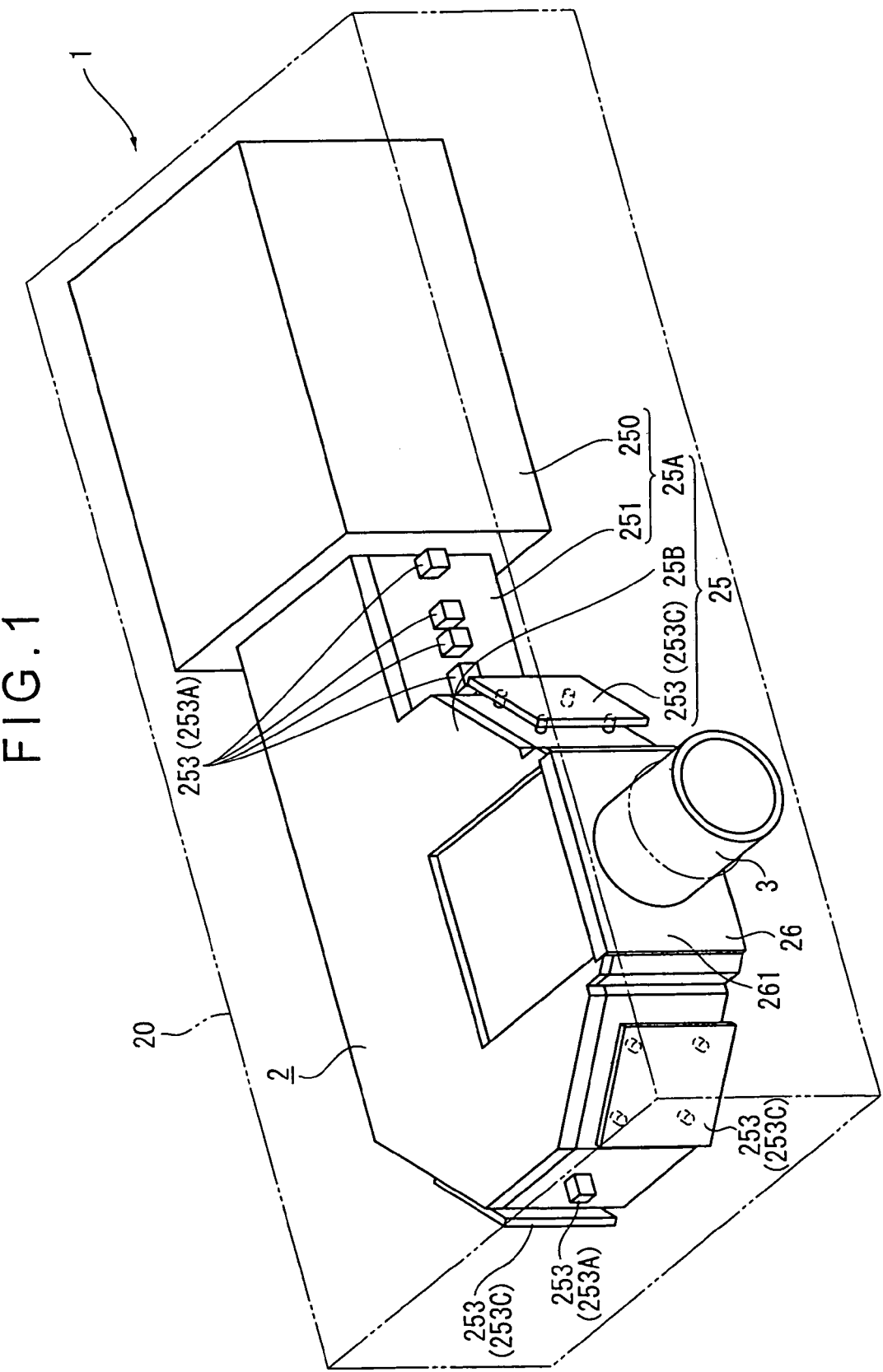
FIG. 1 is a perspective view showing structure of a projector including an optical component casing according to a first embodiment.

FIG. 1 is a perspective view showing structure of a projector 1 including an optical component casing according to the present embodiment.

The projector 1 modulates a light beam irradiated by a light source in accordance with image information and projects the light beam on a projection surface such as a screen in an enlarged manner. The projector 1, as shown in FIG. 1, has a planarly-viewed L-shaped optical unit 2 and a projection lens 3 as a projection optical device connected to an end of the optical unit 2.

Incidentally, though not particularly shown, the projector 1 includes a power source unit for providing electric power supplied from the outside to the components of the projector 1, a control board for controllably driving a below-described liquid crystal panel of the optical unit 2 and a cooling unit having a cooling fan for blowing cooling air to the components of the projector 1 in addition to the optical unit 2 and the projection lens 3.

As shown in FIG. 1 with a dotted line, the respective components of the projector 1 such as the optical unit 2, a part of the projection lens 3, the power source unit, the control board and the cooling unit etc. are housed in an exterior case 20. The projection lens 3 is arranged in the state that an image can be projected outside through an opening of the exterior case 20.

Under the control of the control board (not shown), the optical unit 2 forms an optical image in accordance with image information provided from the outside. Though described below in detail, as shown in FIG. 1, the optical unit 2 includes an optical component casing 25 that has a casing body constituted of a container 25A formed in a container-shape and a lid 25B for closing an opening of the container 25, a plurality of optical components arranged and housed in the optical component casing 25 and a head 26 connected to the optical component casing 25 to support the projection lens 3 and an electric optical device 24.

The projection lens 3 enlarges and projects the optical image modulated by the optical unit 2 in accordance with image information. The projection lens 3 is a lens set including a plurality of lenses housed in a cylindrical lens barrel, which has a lever (not shown) capable of changing the relative position of the plurality of lenses so that the focus and magnification of the projected image can be adjusted.

(1-2) Structure of Optical System

Figure 2:
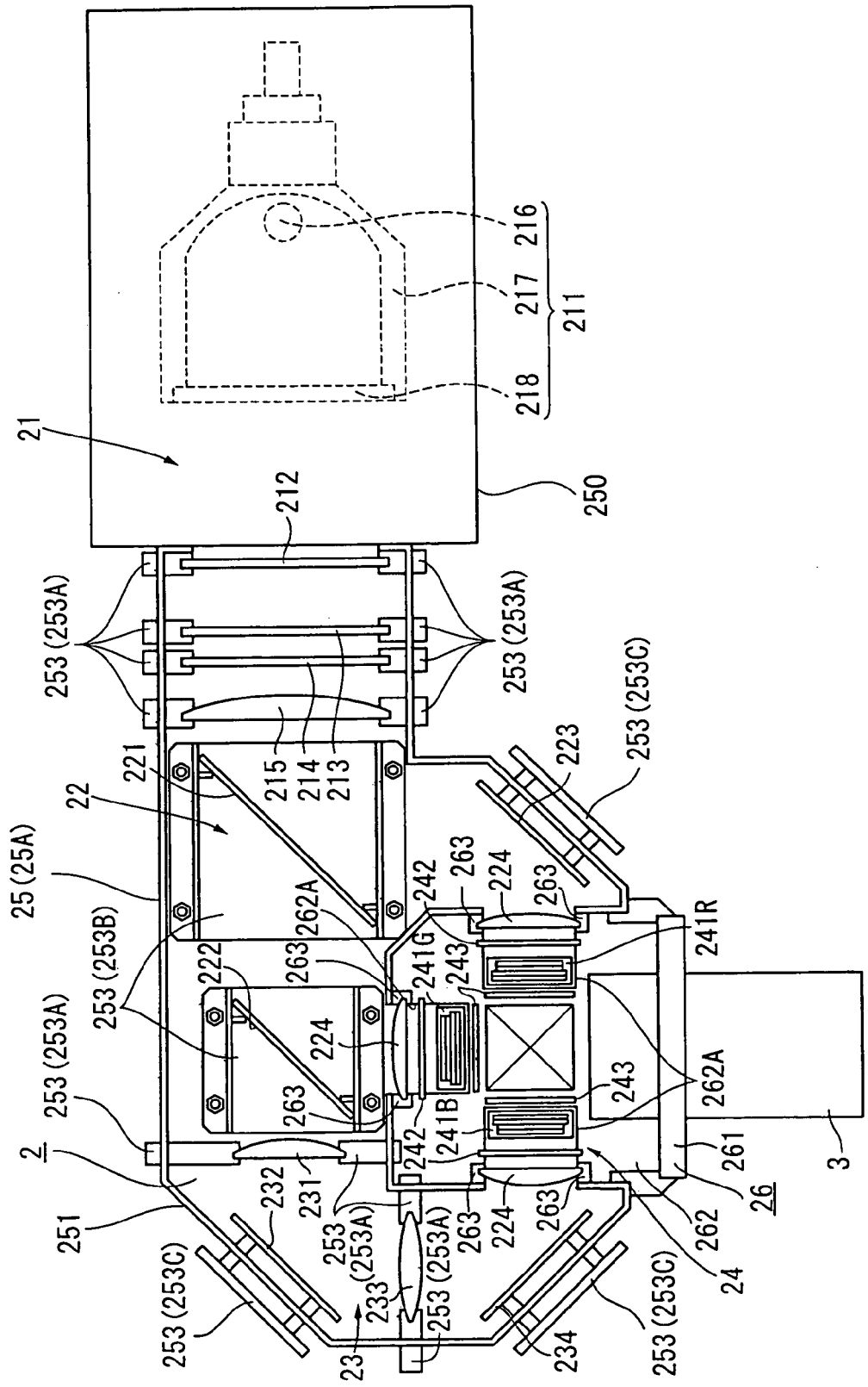
FIG. 2 is a plan view schematically showing inside structure of an optical unit according to the aforesaid embodiment.

FIG. 2 is a plan view schematically showing the inside structure of the optical unit 2. Specifically, FIG. 2 is an illustration of the optical unit 2 with the lid 25B removed.

As shown in FIG. 2, the optical components of the projector 1 according to the present embodiment include an integrator illuminating optical system 21, a color-separating optical system 22, a relay optical system 23 and the electric optical device 24 integrating an optical modulator and a color-combining optical device.

The integrator illuminating optical system 21 is an optical system for equalizing the illuminance of the light beam irradiated by the light source on a plane orthogonal to the illumination optical axis. As shown in FIG. 2, the integrator illuminating optical system 21 has a light source device 211, a first lens array 212, a second lens array 213, a polarization converter 214 and a superposing lens 215.

The light source device 211 has a light source lamp 216 (a radial light source), a reflector 217 and a protection glass 218 covering the light-irradiation side of the reflector 217. The radial light beam irradiated by the light source lamp 216 is reflected by the reflector 217 to be an approximately parallel light beam and is irradiated toward the outside. In the present embodiment, a high-pressure mercury lamp is used as the light source lamp 216 and a parabolic mirror is used as the reflector 217. Incidentally, the light source lamp 216 may not be a high-pressure mercury lamp but may be a metal halide lamp or a halogen lamp. Further, though a parabolic mirror is used as the reflector 217, a parallelizing concave lens disposed on an irradiation-side of a reflector of an ellipsoidal mirror may alternatively be used.

The first lens array 212 has small lenses arranged in a matrix, the lenses having substantially rectangular profile seen in the illumination optical axis direction. The respective lenses separates the light beam irradiated by the light source lamp 216 into sub-beams and emits the sub-beams in the illumination optical axis direction.

The second lens array 213 is arranged approximately in the same manner as the first lens array 212, which includes small lenses arranged in a matrix. The second lens array 213 together with the superposing lens 215 superposes the image of the respective small lenses of the first lens array 212 onto the image formation areas of the below-described liquid crystal panels 241R, 241G and 241B of the electric optical device 24.

The polarization converter 214 converts the light from the second lens array 213 into substantially uniform polarized light, thereby enhancing the light utilization efficiency of the electric optical device 24.

Specifically, the respective sub-beams converted into substantially uniform polarized light by the polarization converter 214 are substantially superposed on the image formation areas of the below-described liquid crystal panels 241R, 241G and 241B of the electric optical device 24 by the superposing lens 215. Since only one-type of polarized light can be used in a projector using the liquid crystal panels 241R, 241G and 241B that modulate a polarized light, approximately half of the light beam from the light source lamp 216 emitting random polarized light cannot be used. Accordingly, with the use of the polarization converter 214, the light beam irradiated by the light source lamp 216 is converted into substantially uniform polarized light to enhance the light utilization efficiency of the electric optical device 24. Incidentally, such polarization converter 214 is disclosed in, for instance, JP H08-304739A.

The color-separating optical system 22 has two dichroic mirrors 221 and 222, and a reflection mirror 223. The plurality of sub-beams irradiated by the integrator illuminating optical system 21 are separated into three color lights of red (R), green (G) and blue (B) by the two dichroic mirrors 221.

The relay optical system 23 has an incident-side lens 231, a relay lens 233, and reflection mirrors 232 and 234. The relay optical system 23 guides the color light (blue light) separated by the color-separating optical system 22 toward the below-described liquid crystal panel 241B of the electric optical device 24.

At this time, the dichroic mirror 221 of the color-separating optical system 22 transmits the green light component and blue light component of the light beam irradiated by the integrator illuminating optical system 21 and reflects the red light component. The red light reflected by the dichroic mirror 221 is reflected by the reflection mirror 223, which reaches to the liquid crystal panel 241R for red color through the field lens 224. The field lens 224 converts the respective sub-beams irradiated by the second lens array 213 into a light beam parallel to the central axis (main beam) thereof. The field lenses 224 provided on the light-incident side of the other liquid crystal panels 241G and 241B function in the same manner.

In the blue and green lights passed through the dichroic mirror 221, the green light is reflected by the dichroic mirror 222, which reaches to the liquid crystal panel 241G for green light through the field lens 224. On the other hand, the blue light passes through the dichroic mirror 222, which passes through the relay optical system 23 to reach the liquid crystal panel 241B for blue light through the field lens 224.

Incidentally, the relay optical system 23 is used for the blue light in order to avoid deterioration in the light utilization efficiency on account of light dispersion and the like caused by the longer length of the optical path of the blue light than the optical path of the other color light. In other words, the relay optical system 23 is used for directly transmitting the sub-beams incident on the incident-side lens 231 to the field lens 224. Incidentally, though the blue light of the three color lights passes through the relay optical system 23, the red light, for instance, may alternatively pass through the relay optical system 23.

The electric optical device 24 modulates the incident light beam in accordance with image information to form a color image. The electric optical device 24 has three incident-side polarization plates 242 on which the respective color lights separated by the color-separating optical system 22 are incident, the liquid crystal panels 241R, 241G and 241B (optical modulators) and irradiate-side polarization plates 243 disposed on the downstream of the respective incident-side polarization plates 242, and a cross dichroic prism 244 (color-combining optical device).

The liquid crystal panels 241R, 241G and 241B use, for instance, a polycrystalline silicon TFT as a switching element, which has a pair of opposing transparent substrates with liquid crystal sealed therebetween. The liquid crystal panels 241R, 241G and 241B irradiate the light beam incident thereon through the incident-side polarization plates 242 after modulating in accordance with image information. Incidentally, the liquid crystal panels 241R, 241G and 241B are held and accommodated in a holder frame (not shown).

The incident-side polarization plate 242 transmits a polarized light in a predetermined direction out of the respective color lights separated by the color-separating optical system 22 and absorbs the other light beam, which have a substrate made of sapphire glass and the like with a polarization film attached thereon.

The irradiation-side polarization plate 243 is also arranged substantially in the same manner as the incident-side polarization plate 242, which transmits the polarized light in a predetermined direction out of the light beam irradiated by the liquid crystal panels 241R, 241G and 241B, where the polarization axis of the transmitted polarized light is set orthogonal to the polarization axis of the polarized light passed through the incident-side polarization plate 242.

The cross dichroic prism 244 combines the optical image irradiated by the irradiation-side polarization plate 243 and modulated for each color light to form a color image. In the cross dichroic prism 244, a dielectric multi-layer film for reflecting the red light and a dielectric multi-layer film for reflecting the blue light are formed along the boundaries of four right-angle prisms approximately in X-shape, the dielectric multi-layer films combining the three color lights.

Incidentally, the cross dichroic prism 244 is fixed on a mount (not shown). Further, the liquid crystal panels 241R, 241G and 241B, and the three irradiation-side polarization plates 243 are respectively fixed on the three light incident sides of the cross dichroic prism 244 to be unitized. Hereinafter, the unit, in which the cross dichroic prism 244, the mount, the liquid crystal panels 241R, 241G and 241B and the three irradiation-side polarization plates 243 are integrated, is called as a "prism unit" for convenience.

Note that, the electric optical device 24 may be equipped with a visual-angle corrector plate arranged between the incident-side polarization plate 242 and the irradiation-side polarization plate 243 to correct the visual field angle of the optical image formed by the liquid crystal panels 241R, 241G and 241B in addition to the liquid crystal panels 241R, 241G and 241B, the incident-side polarization plate 242, the irradiation-side polarization plate 243 and the cross dichroic prism 244. The visual field angle of the projection image is enlarged and the contrast of the projected image is enhanced since the visual-angle corrector plate is arranged.

(1-3) Structure of Optical Component Casing

As shown in FIG. 1 or 2, the optical component casing 25 includes the container 25A in which the various optical components of the above-described optical systems 21, 22 and 23 and the electric optical device 24 are housed, the lid 25B (FIG. 1) for closing the upper opening of the container 25A, a positioning member 253 for positioning the optical components of the optical systems 21, 22 and 23 excluding the light source device 211 at predetermined positions in the container 25A, and rework members 254X, 254Y and 254Z (not shown here) appropriately mounted on the outer side of the optical component casing 25 to be able to rework the various optical components housed and arranged in the container 25A.

Figure 3:
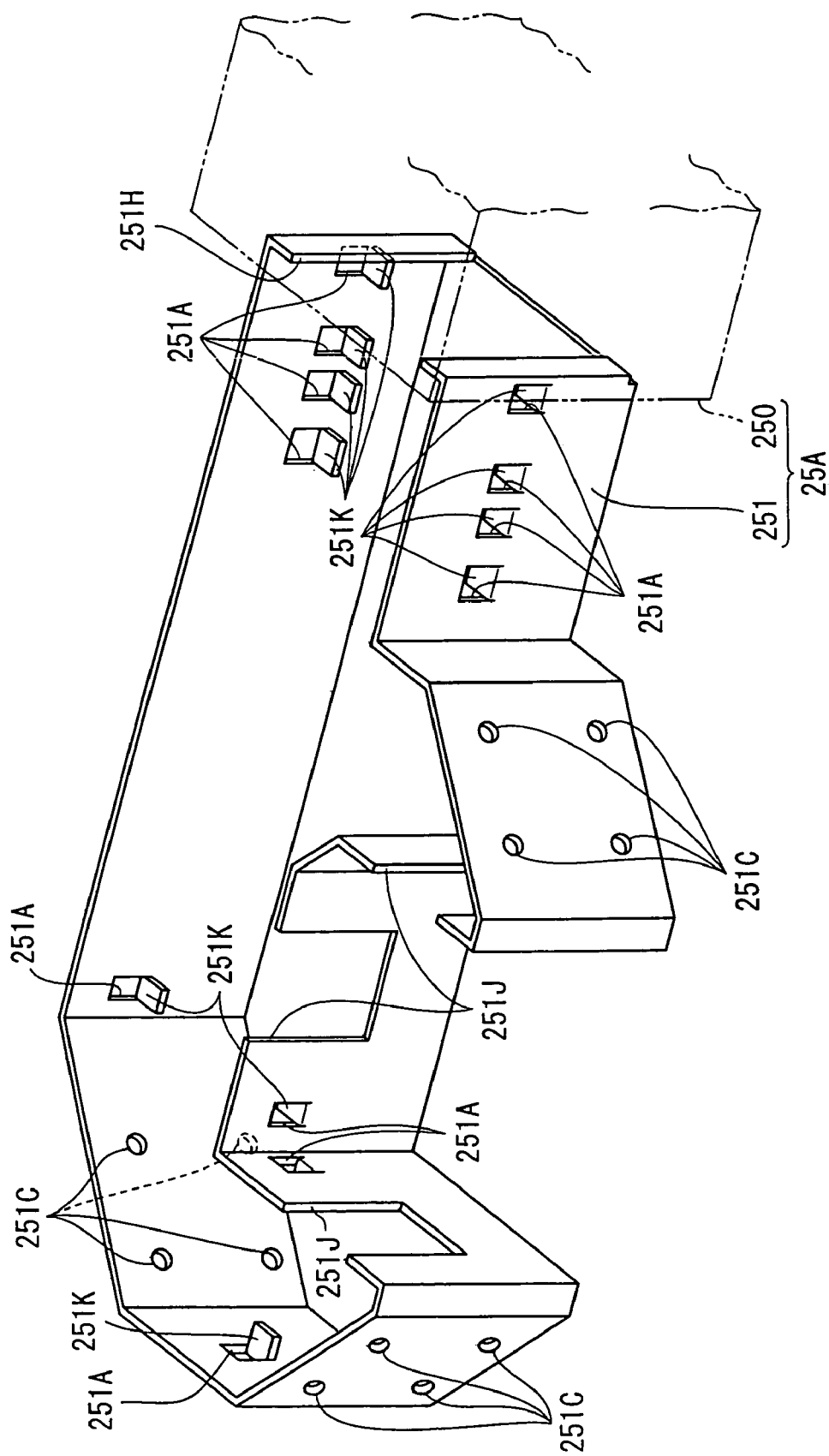
FIG. 3 is a perspective view showing structure of a container according to the aforesaid embodiment.

FIG. 3 is a perspective view showing structure of the container 25A.

As shown in FIGS. 1 to 3, the container 25A made of an aluminum plate by sheet metal processing includes a light source housing 250 for housing the light source device 211, and a component housing 251 for housing the optical components of the optical systems 21, 22 and 23 (FIG. 2) excluding the light source device 211. The light source housing 250 and the component housing 251 are formed in a container-shape by drawing with the lower side of the light source housing 250 being opened and the upper side of the component housing 251 being opened. An opening 251H (FIG. 3) is formed on a connection of the light source housing 250 with the component housing 251 by cutting etc. so that the light beam irradiated by the light source device 211 passes through the opening 251H.

Incidentally, the light source housing 250 and the component housing 251 may be formed with a single plate by drawing. Further, the light source housing 250 and the component housing 251 may be respectively formed with two plates by drawing so that the two housings are mechanically joined by a screw etc. or by welding.

The light source housing 250 houses and arranges the light source device 211 (FIG. 2) from the opening (not shown) on the lower side. Though not shown, a slit-shaped opening is formed on a lateral side of the light source housing 250 by cutting etc. so that the air heated by the heat generated at the light source device 211 does not stay inside the light source housing 250.

As shown in FIG. 3, an end of the component housing 251 is connected to the light source housing 250, and the other end thereof is formed in an approximately planarly-viewed C-shaped container to which the head 26 is connected.

In the component housing 251, a plurality of holes 251A are formed on the lateral side by cutting and folding parts of the lateral side to the inside of the component housing 251 corresponding to the positions of the optical components 212 to 215, 231 and 233 (FIG. 2). Further, a plurality of circular holes 251C are formed on the lateral side to penetrate toward the inside corresponding to the positions of the optical components 223, 232 and 234 (FIG. 2). Cutouts 251J are formed on an inner lateral side of the approximately planarly-viewed C-shape by cutting etc. so that the three color lights irradiated by the light source device 211 (FIG. 2) and separated by the color-separating optical system 22 (FIG. 2) can pass through the cutouts 251J toward the electric optical device 24 (FIG. 2).

Though not shown, a plurality of burring holes with screw grooves are formed on a bottom side and an upper end of the component housing 251.

As shown in FIG. 1, the lid 25B is an aluminum plate, which is formed by cutting etc. to close an upper opening of the component housing 251 of the container 25A. Though not shown, a plurality of holes are formed on the lid 25B so that the lid 25B is fixed to the container 25A by screws etc. through the holes and burring holes (not shown) formed on the container 25A.

The inner sides of the light source housing 250 and the component housing 251 of the above-described container 25A and the lower side of the lid 25B are coated with anodized black-aluminum.

As shown in FIG. 1 or 2, the positioning member 253 include first positioning members 253A as orthogonal arrangement positioning members for respectively positioning the first lens array 212, the second lens array 213, the polarization converter 214, the superposing lens 215, the incident-side lens 231 and the relay lens 233, second positioning members 253B (FIG. 2) as inclined arrangement positioning members for respectively positioning the dichroic mirrors 221 and 222, and third positioning members 253C as parallel arrangement positioning members for respectively positioning the reflection mirrors 223, 232 and 234. The positioning member 253 will be described at the same time when holding structure of the optical component is described. The rework members 254X, 254Y and 254Z will be described in detail after the holding structure of the optical component is described.

(1-4) Structure of Head

The head 26 is made of magnesium alloy, which is formed in an approximately L shape-sided portion. As shown in FIG. 2, the head 26 integrates the projection lens 3 and a plurality of optical elements. The head 26 includes a lens supporter 261 formed on an outer vertical side of the approximately L shape-sided portion, a mount face 262 formed on an upper horizontal side of the approximately L shape-sided portion, and field lens holders 263 projected on the mount face 262.

Note that, the head 26 may be made of aluminum, magnesium and titanium or alloy containing the above metal as main components without limiting to the magnesium alloy.

As shown in FIG. 1 or 2, the lens supporter 261 is formed in a rectangular shape, on which fixing female screw holes (not shown) are formed on four corners of the rectangular shape by penetrating through it in order to fix the projection lens 3. The lens supporter 261 supports and fixes the projection lens 3 by screwing screws etc. into the fixing female screw holes via holes (not shown) of the projection lens 3.

As shown in FIG. 2, the mount face 262 is formed in an approximately planarly-viewed rectangular shape. The prism unit is mounted and fixed on the mount face 262 at the approximate center in a horizontal direction near the lens supporter 261. The prism unit is fixed on the mount face 262 through the mount. Three cutouts 262A for circulating the cooling air blown from the cooling unit (not shown) are formed on the mount face 262 at the side of the liquid crystal panels 241R, 241G and 241B.

The field lens holders 263 extends upward from corners of the cutouts 262A formed on the mount face 262 to support and fix the field lens 224.

For instance, a plurality of holes (not shown) are formed on the mount face 262 of the above-described head 26 so that the head 26 is fixed on the container 25A by screws etc. through the holes and the burring holes (not shown) formed on the container 25A.

Though not particularly shown, fixing structure of the incident-side polarization plate 242 may employ a configuration that a polarization film is attached to the light-irradiation side of the field lens 224 or structure that holds and fixes the incident-side polarization plate 242 on a member projected upward from the mount face 262 in the same manner as the field lens holder 263.

(1-5) Holding Structure of Optical Component

Next, holding structure of the optical components of the optical systems 21, 22 and 23 (FIG. 2) excluding the light source device 211 on the optical component casing 25 will be described.

The holding structures of the optical components can be classified into three holding structures by grouping similar structures. In other words, the holding structures can be classified into a lens holding structure for holding the first lens array 212, the second lens array 213, the polarization converter 214, the superposing lens 215, the incident-side lens 231 and the relay lens 233, a dichroic mirror holding structure for holding the dichroic mirrors 221 and 222, and a reflection mirror holding structure for holding the reflection mirrors 223, 232 and 234. In the following, the above three holding structures will be sequentially described.

(1-5-1) Lens Holding Structure

Figure 4:
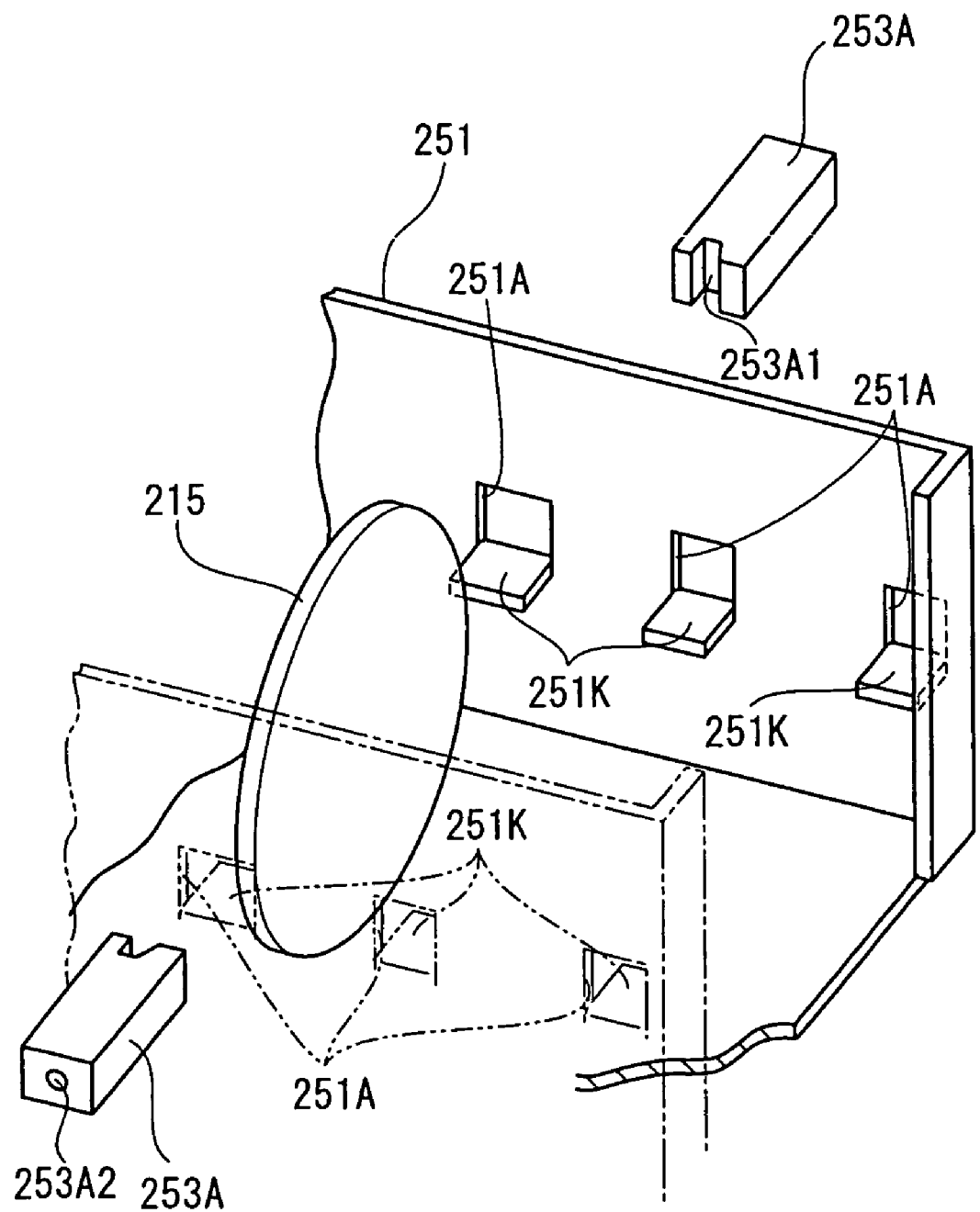
FIG. 4 is an illustration to explain a lens holding structure according to the aforesaid embodiment.

FIG. 4 is an illustration to explain the lens holding structure. As mentioned above, since the holding structures of the optical components 212 to 215, 231 and 233 have similar structures, the holding structure of the superposing lens 215 will mainly be described here.

As shown in FIG. 4, the planarly-viewed circular superposing lens 215 is a convex lens, of which a light-incident side and a light-irradiation side are spherically bulged. Two first positioning members 253A out of the above-described plurality of first positioning members 253A are used as members for holding the superposing lens 215.

The first positioning member 253A is made of synthetic resin (acrylic material) transmitting ultraviolet ray and formed in a quadratic prism member which is inserted through the hole 251A formed on the lateral side of the container 25A. A groove 253A1 having an approximately V-shaped cross-section is formed on an end of the quadratic prism of the first positioning member 253A. The groove 253A1 is formed to have the approximately same shape as a cross-section of an outer periphery of the superposing lens 215. Further, a rework screw hole 253A2 is formed on the other end of the first positioning member 253A with the rework screw hole 253A2 extending toward the end.

In the holes 251A of the container 25A, the cut and folded part of the lateral side serves as a support portion 251K of the first positioning member 253A.

The first positioning members 253 sandwich the superposing lens 215 from left and right directions by the grooves 253A1 abutting on the outer periphery of the superposing lens 215 through the holes 251A formed on the lateral side of the container 25A. At this time, an ultraviolet curing adhesive is filled between the first positioning member 253 and the support portion 251K, and between the groove 253A1 of the first positioning member 253 and the outer periphery of the superposing lens 215, so that the superposing lens 215 is held and fixed on the optical component casing 25 by curing the adhesive.

Incidentally, other holding structures of the optical components 212 to 214, 231 and 233 are similar to the above-described holding structure of the superposing lens 215.

(1-5-2) Dichroic Mirror Holding Structure

Figure 5:
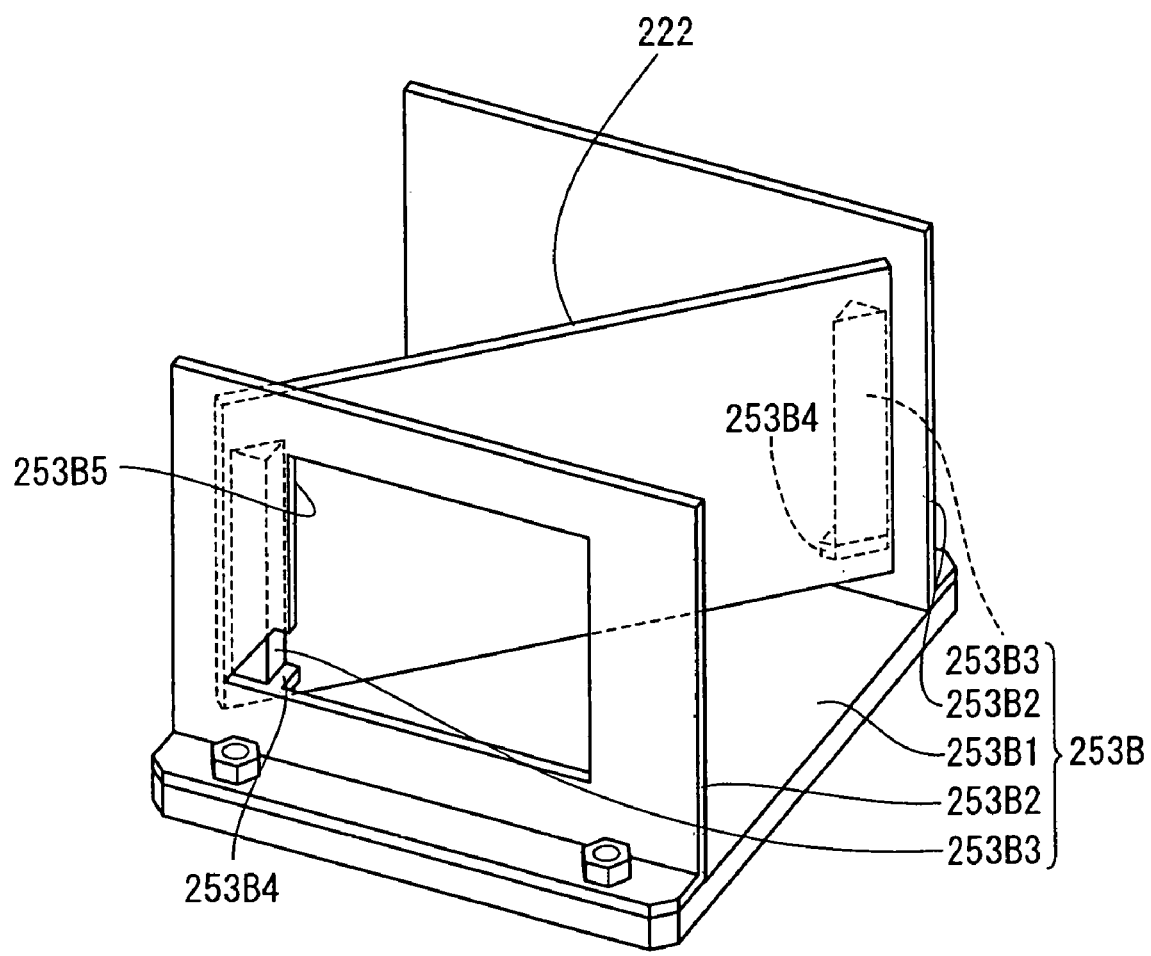
FIG. 5 is an illustration to explain a dichroic mirror holding structure according to the aforesaid embodiment.

FIG. 5 is an illustration to explain the dichroic mirror holding structure. As mentioned above, since the holding structures of the dichroic mirrors 221 and 222 have similar structures, the holding structure of the dichroic mirror 222 will mainly be described here.

As shown in FIG. 5, the dichroic mirror 222 is an approximately planarly-viewed rectangular shape, which is held by the second positioning member 253B.

As shown in FIG. 5, the second positioning member 253B includes a plate-shaped mount 253B1 fixed on a bottom side of the component housing 251 of the container 25A, a pair of plate members 253B2 fixed on an upper side of the mount 253B1 and having an L-shaped cross-section, and spacers 253B3 interposed between the pair of plate members 253B2 and left and right ends of the dichroic mirror 222.

The pair of plate members 253B2 opposes to the lateral side of the component housing 251 of the container 25A in approximately parallel, with an end of the L-shaped cross-sectional shape being fixed on the upper side of the mount 253B1 and the other end thereof extending upward the mount 253B1. The dichroic mirror 222 is arranged between the pair of plate members 253B2 in an inclined manner so that left and right ends of the dichroic mirror 222 opposes to the other ends of the plate members 253B2.

In the pair of plate members 253B2, a part of the other end is cut and folded toward the opposing plate member 253B2 in a triangular shape, which serves as a support portion 253B4 for supporting the spacer 253B3.

An opening 253B5 is formed on the other end near the field lens 224 (FIG. 2) out of the other ends of the pair of plate members 253B2 so that the green light reflected by the dichroic mirror 222 is passed through the opening 253B5.

The spacer 253B3 is a triangular prism member made of synthetic resin (acrylic material) transmitting ultraviolet ray in the same manner as the first positioning member 253A. A rework screw hole 253B6 (not shown) is formed on an upper end of the spacer 253B3 with the rework screw hole 253B6 extending toward a lower end thereof. The spacer 253B3 is supported by the support portion 253B4 and interposed between the left or right end of the dichroic mirror 222 and the plate member 253B2. At this time, an inclined direction of a slanted face of the triangular prism of the spacer 253B3 is configured to be the approximately same direction as an inclined direction of the dichroic mirror 222. The ultraviolet curing adhesive is filled between the spacer 253B3 and the support portion 253B4, and between the slanted face of the spacer 253B3 and an outer periphery of the dichroic mirror 222, so that the dichroic mirror 222 is held and fixed on the optical component casing 25 by curing the adhesive.

Incidentally, the other holding structure of the dichroic mirror 221 is similar to the above-described holding structure of the dichroic mirror 222.

(1-5-3) Reflection Mirror Holding Structure

Figure 6:
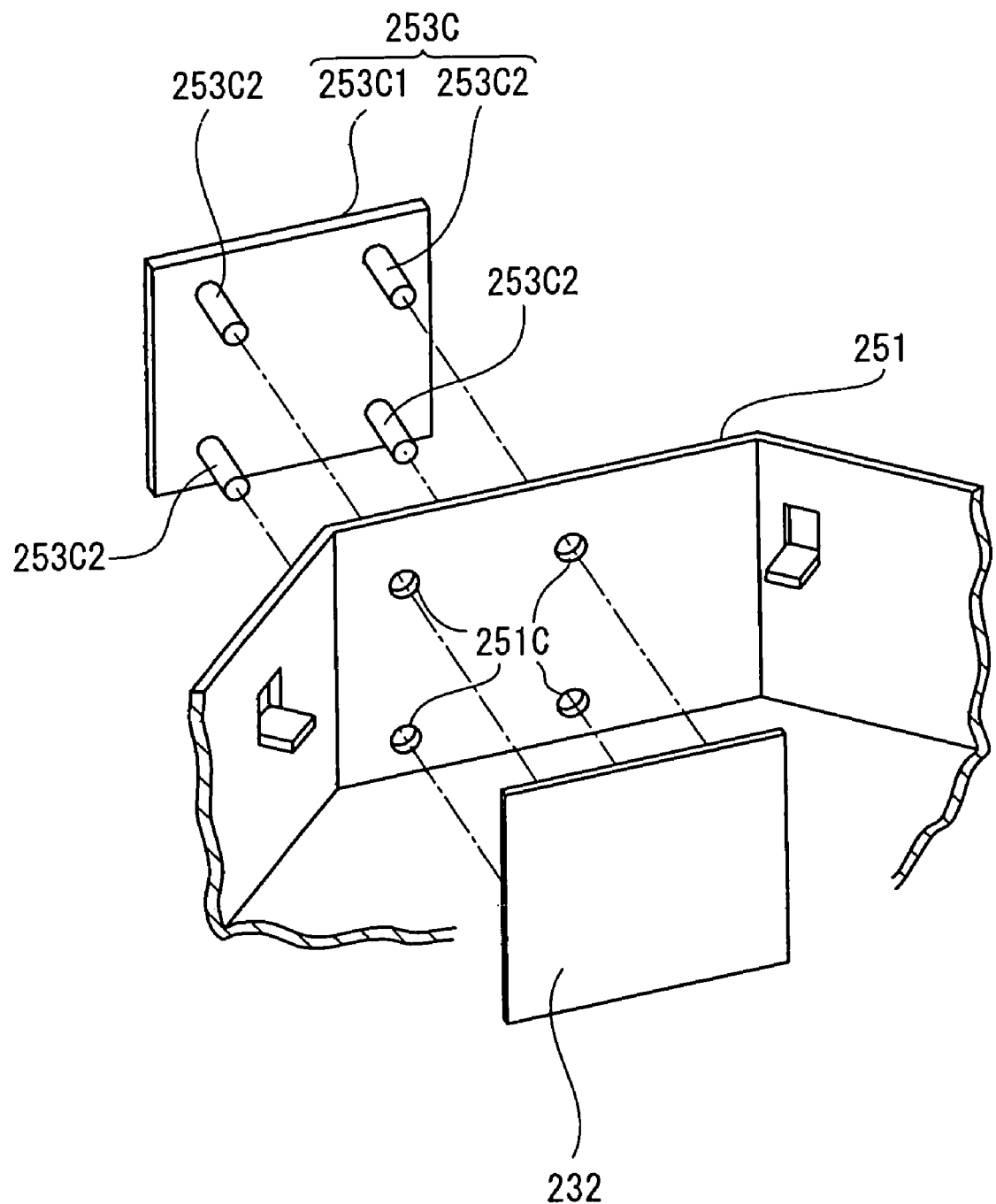
FIG. 6 is an illustration to explain a reflection mirror holding structure according to the aforesaid embodiment.

FIG. 6 is an illustration to explain the reflection mirror holding structure. As mentioned above, since the holding structures of the reflection mirrors 223, 232 and 234 have similar structures, the holding structure of the reflection mirror 232 will mainly be described here.

As shown in FIG. 6, the reflection mirror 232 is an approximately planarly-viewed rectangular shape, of which an end has a reflection face depositing highly reflective aluminum etc. The above-described third positioning member 253C is used as a member for holding the reflection mirror 232.

The third positioning member 253C made of synthetic resin (acrylic member) transmitting ultraviolet ray includes a plate body 253C1 and cylindrical four pins 253C2 projected from four corners of an end of the plate body 253C1 with the pins 253C2 being orthogonal to the end.

Though not shown, a rework screw hole 253C3 extending inside the pin 253C2 is formed on a back side of the plate body 253C1.

The pin 253C2 is inserted to the third positioning member 253C through a hole 251C formed on the lateral side of the container 25A so that an tip end of the pin 253C2 abuts on a back side of a reflection face of the reflection mirror 232. At this time, an ultraviolet curing adhesive is filled between the pin 253C2 and the back side of the reflection face of the reflection mirror 232, and between a periphery of the pin 253C2 and the hole 251C, so that the reflection mirror 232 is held and fixed on the optical component casing 25 by curing the adhesive.

Incidentally, other holding structures of the reflection mirrors 223 and 234 are similar to the above-described holding structure of the reflection mirror 232.

Though the above-described first positioning member 253A, the spacer 253B3 and the third positioning member 253C are made of acrylic material, they may be made of other synthetic resins transmitting ultraviolet ray or, alternatively, may be made of optical glass, crystal, sapphire glass, quartz or the like.

Further, though the ultraviolet curing adhesive is used for the lens holding structure, the dichroic mirror holding structure and the reflection mirror holding structure may employ a wide variety of adhesives, preferably, the main component is acrylate and its viscosity is 17000P.

(1-6) Structure of Rework Member

Figure 7:
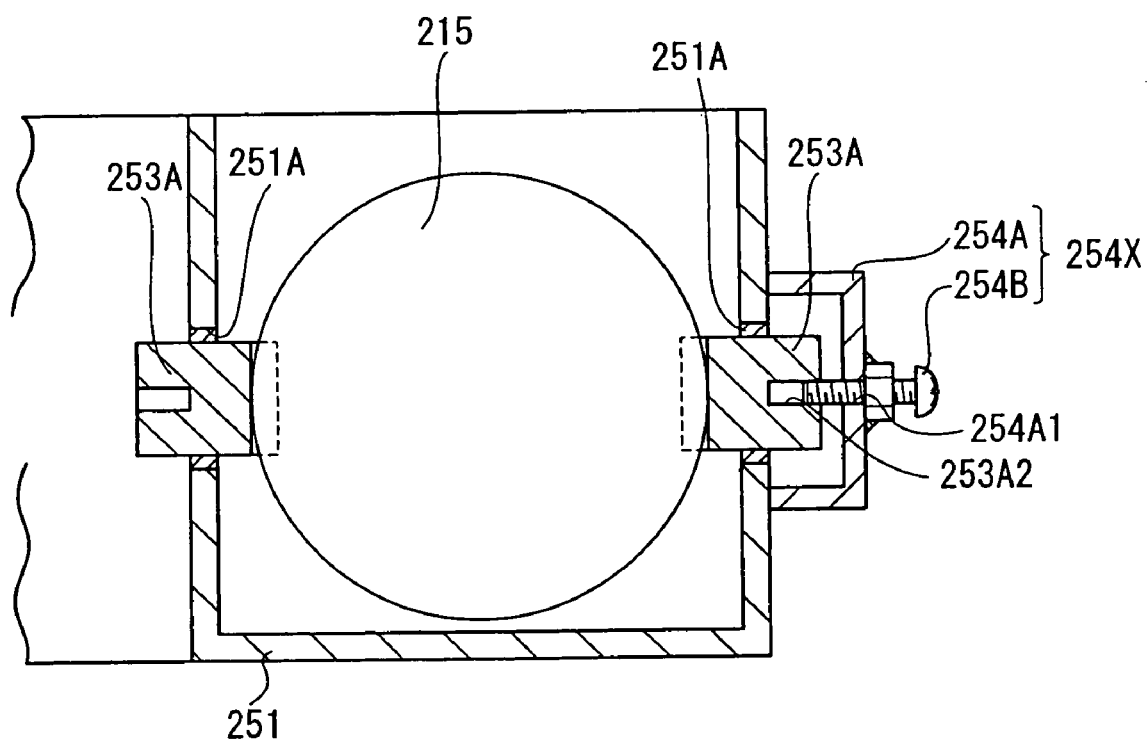
FIG. 7 is a cross-sectional view showing structure of a rework member according to the aforesaid embodiment.
Figure 8:
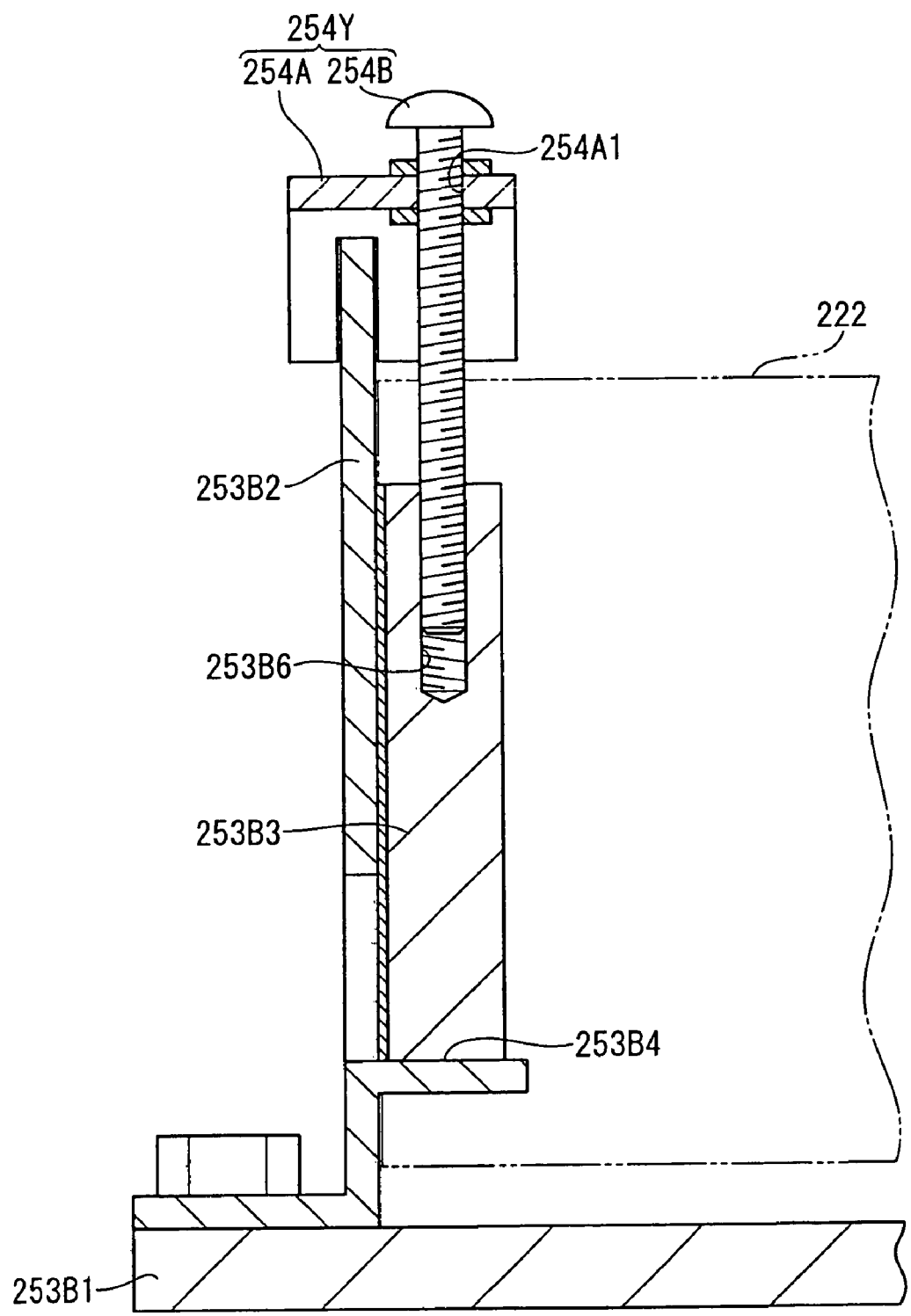
FIG. 8 is a cross-sectional view showing structure of a rework member according to the aforesaid embodiment.
Figure 9:
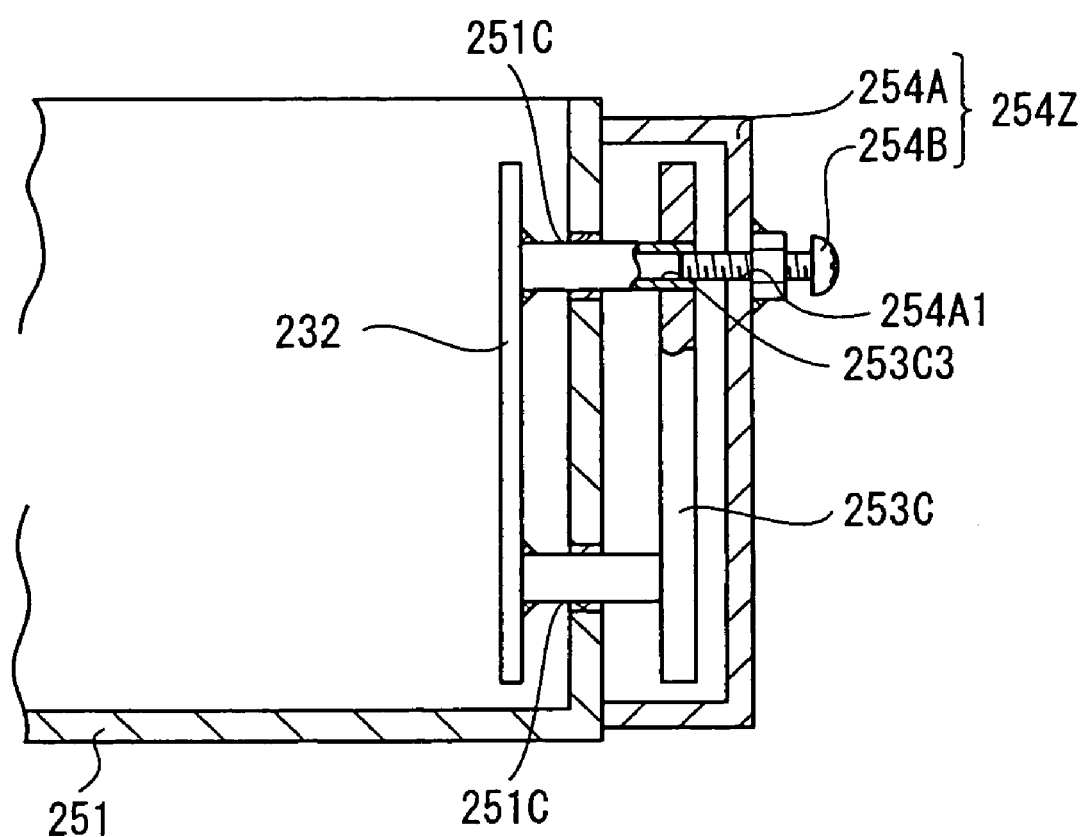
FIG. 9 is a cross-sectional view showing structure of a rework member according to the aforesaid embodiment.

FIGS. 7 to 9 are perspective views respectively showing structures of the rework members 254X, 254Y and 254Z.

When the various optical components 212 to 215 held by the above-described holding structures shown in FIG. 4 are replaced and so on, the rework member 254X releases the adhered and fixed state on the optical component casing 25. As shown in FIG. 7, the rework member 254X is formed in a shape having an approximately c-shaped cross-section by bending an aluminum plate, and includes a support member 254A of which a hole 254A1 is formed on an end opposite to an opening side, and a rework screw 254B disposed on the hole 254A1 of the support member 254A to screw into the rework screw hole 253A2 of the first positioning member 253A.

When the various optical components 221 and 222 held by the above-described holding structures shown in FIG. 5 are replaced and so on, the rework member 254Y releases the adhered and fixed state on the optical component casing 25. As shown in FIG. 8, the rework member 254Y is formed in a shape having an approximately c-shaped cross-section by bending an aluminum plate, and includes a support member 254A of which a hole 254A1 is formed on an end opposite to an opening side, and a rework screw 254B disposed on the hole 254A1 of the support member 254A to screw into the rework screw hole 253B6 of the spacer 253B3.

When the various optical components 223, 232 and 234 held by the above-described holding structures shown in FIG. 6 are replaced and so on, the rework member 254Z releases the adhered and fixed state on the optical component casing 25. As shown in FIG. 9, the rework member 254Z is formed in a shape having an approximately c-shaped cross-section by bending an aluminum plate, and includes a support member 254A of which a hole 254A1 is formed on an end opposite to an opening side, and a rework screw 254B disposed on the hole 254A1 of the support member 254A to screw into the rework screw hole 253C3 of the plate body 253C1.

(1-7) Manufacturing Method of Optical Unit

Figure 10:
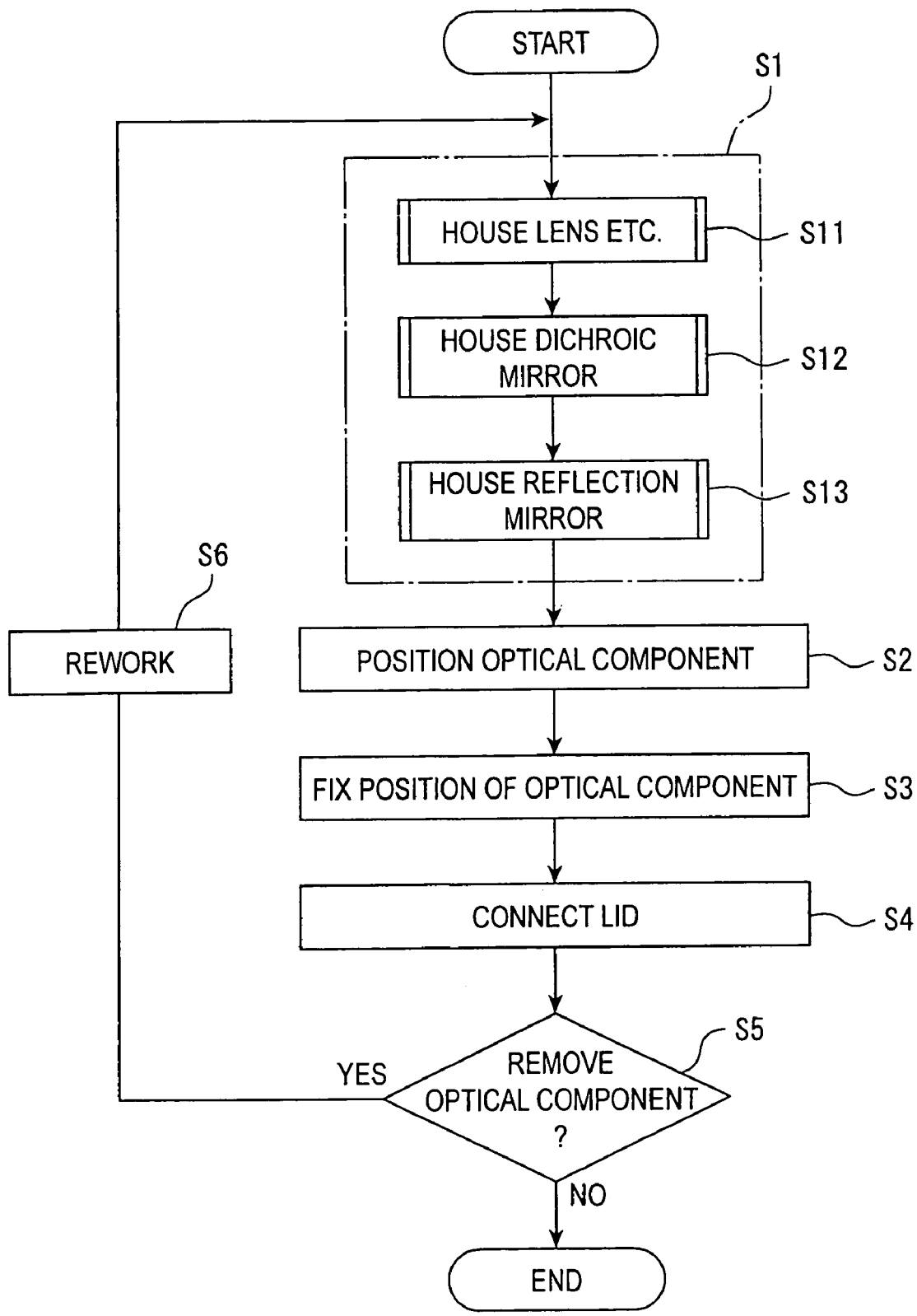
FIG. 10 is a flowchart explaining a manufacturing method of the optical unit according to the aforesaid embodiment.

FIG. 10 is a flowchart explaining the manufacturing method of the optical unit 2 according to the present embodiment. Referring to FIG. 10, a manufacturing method of the optical unit 2 will be described below.

Firstly, the light source device 211 is housed and arranged in the light source housing 250 of the container 25A. Then, the projection lens 3 is placed on the lens supporter 261 of the head 26, the electric optical device 24 is mounted and fixed on the mount face 262, and the field lens 224 is held and fixed on the field lens holder 263. The head 26 is connected to the component housing 251 of the container 25A by a screw (not shown) etc.

Secondly, the optical components 212 to 215, 221 to 223 and 231 to 234 are housed and arranged in the component housing 251 of the container 25A (step S1). As mentioned above, since the holding structures of the optical components can be classified into the three holding structures of the lens holding structure, the dichroic mirror holding structure and the reflection mirror holding structure by grouping similar structures, hereinafter, a lens housing arrangement method, a dichroic mirror housing arrangement method and a reflection mirror housing arrangement method are sequentially described.

(1-7-1) Lens Housing Arrangement Method (Step S11)

Figure 11:
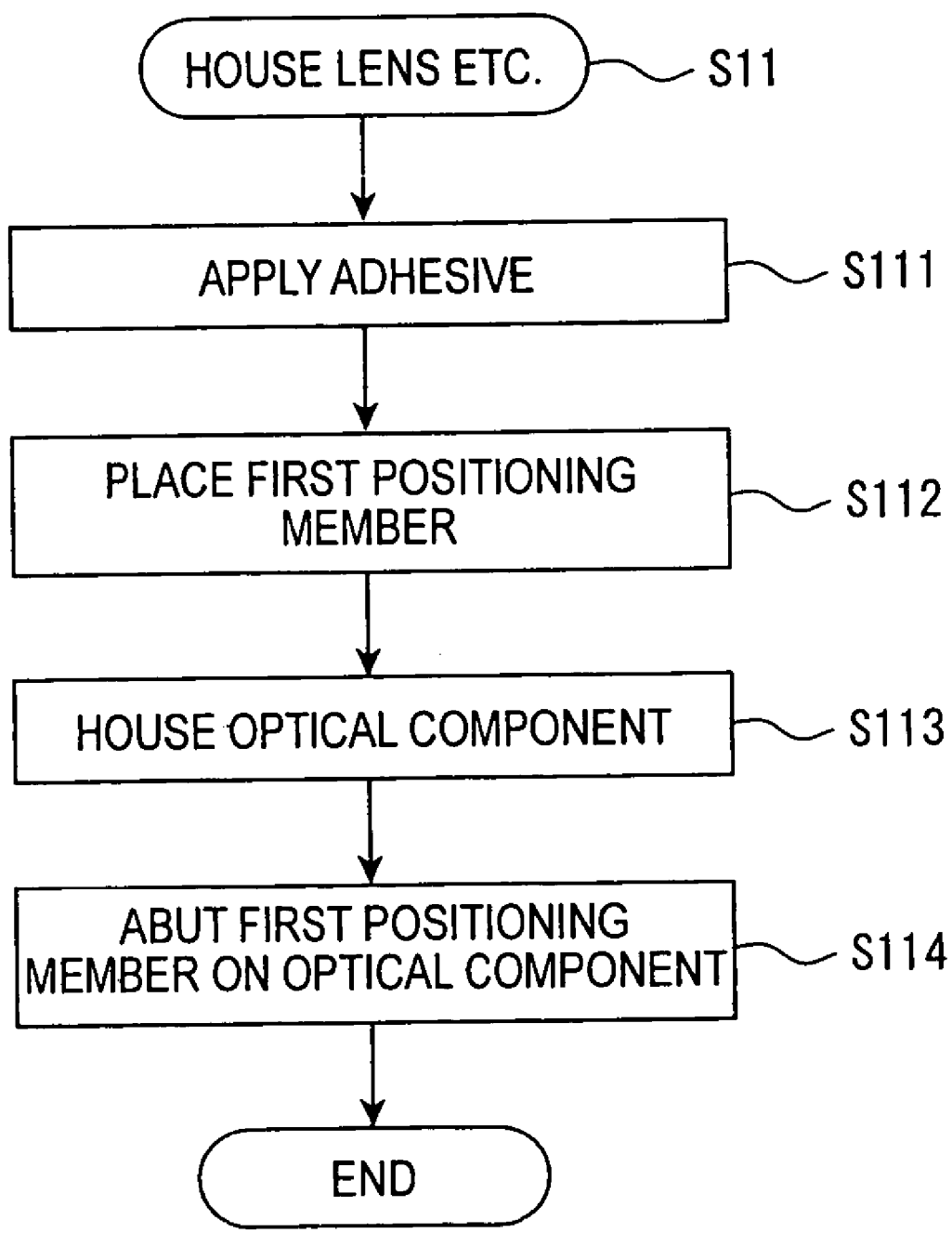
FIG. 11 is a flowchart explaining a lens housing arrangement method according to the aforesaid embodiment.

FIG. 11 is a flowchart to explain the lens housing arrangement method.

As described above, since the housing arrangement methods of the optical components 212 to 215, 231 and 233 are similar, the housing arrangement method of the superposing lens 215 will mainly be described here with reference to FIGS. 4 and 11. Note that, similar housing arrangement methods are applied to other optical components 212 to 214, 231 and 233.

Firstly, an ultraviolet curing adhesive is applied on the grooves 253A1 and the peripheries of the two first positioning members 253A. (step S111).

The first positioning members 253 with the adhesive applied are inserted into the holes 251A formed on the lateral side of the container 25A to place the superposing lens 215 so as to be sandwiched between both left and right sides thereof (step S112). At this time, the first positioning members 253 are held by the support portions 251K.

The superposing lens 215 is housed in the component housing 251 from the upper side of the component housing 251 to be arranged between the two first positioning members 253 placed in the step S112 (step S113), and the outer periphery of the superposing lens 215 abuts on the grooves 253A1 of the first positioning members 253 (step S114).

(1-7-2) Dichroic Mirror Housing Arrangement Method (Step S12)

Figure 12:
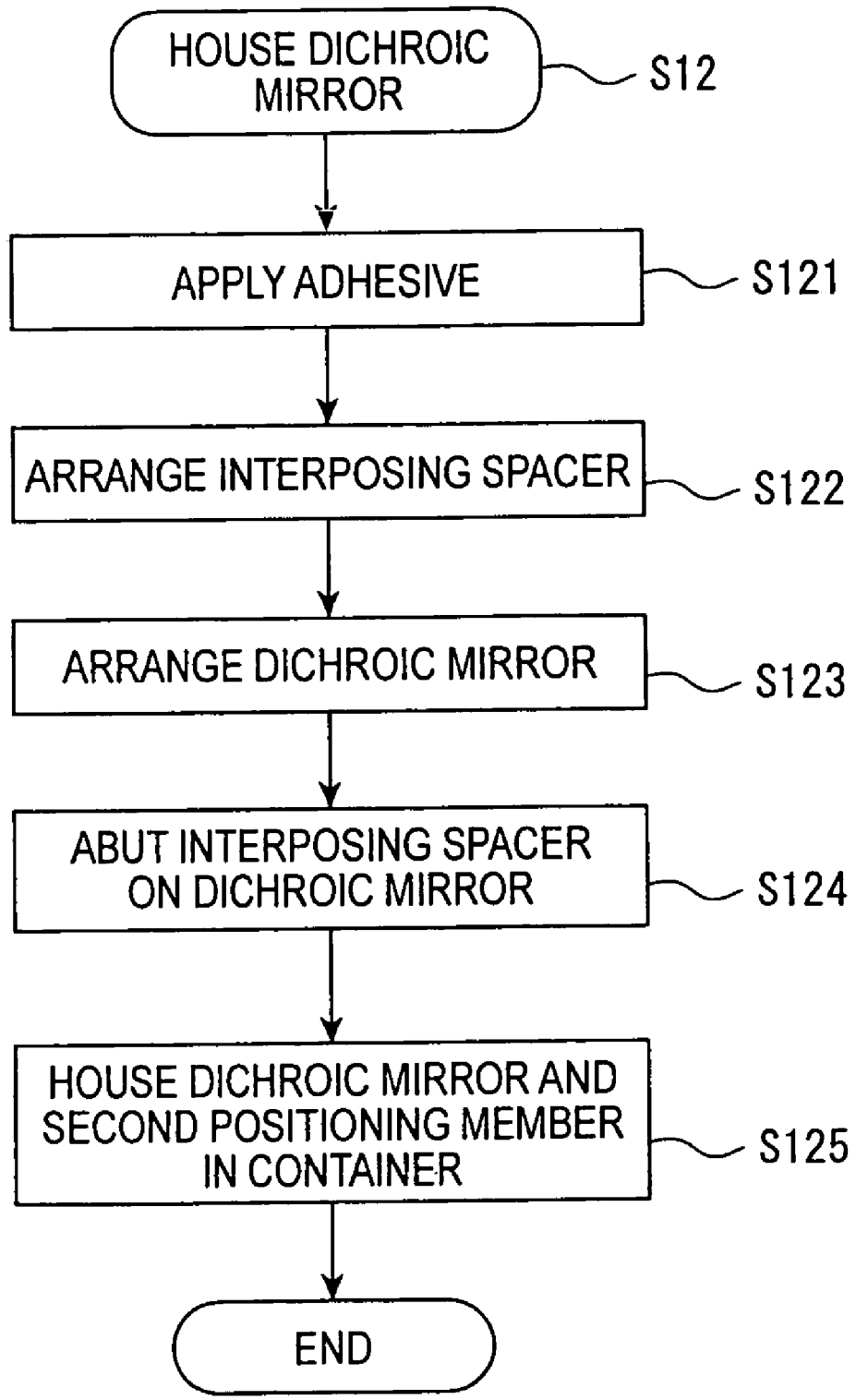
FIG. 12 is a flowchart to explain a dichroic mirror housing arrangement method according to the aforesaid embodiment.

FIG. 12 is a flowchart explaining the dichroic mirror housing arrangement method.

As described above, since the housing arrangement methods of the dichroic mirrors 221 and 222 are similar, the housing arrangement method of the dichroic mirror 222 will mainly be described here with reference to FIGS. 5 and 12. Note that, a similar housing arrangement method is applied to the dichroic mirror 221.

Firstly, the ultraviolet curing adhesive is applied on the peripheries of the two spacers 253B3 (step S121).

The spacers 253B3 with the adhesive applied are respectively mounted on the support portions 253B4 of the pair of plate members 253B2 (step S122).

The dichroic mirror 222 is arranged between the pair of plate members 253B2 in an inclined manner relative to the end of the plate members 253B2 (step S123) to abut on the spacers 253B3 mounted on the support portions 253B4 in the step S122 (step S124).

Then, in the steps S121 to S124, the second positioning member 253B in which the dichroic mirror 222 is held is housed in the component housing 251 of the container 25A to fix the mount 253B1 on the bottom side of the component housing 251 (step S125).

(1-7-3) Reflection Mirror Housing Arrangement Method (Step S13)

Figure 13:
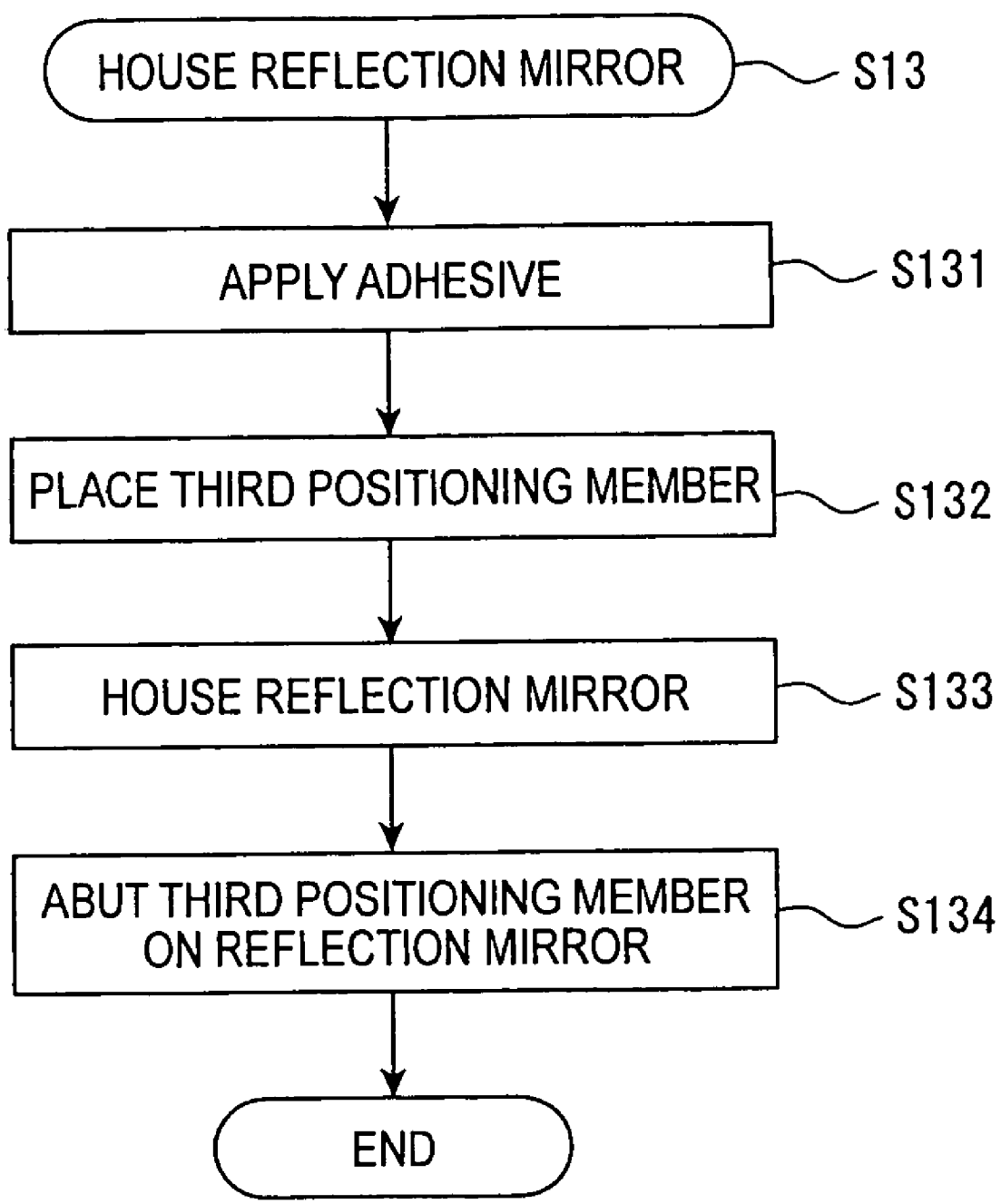
FIG. 13 is a flowchart explaining a reflection mirror housing arrangement method according to the aforesaid embodiment.

FIG. 13 is a flowchart explaining the reflection mirror housing arrangement method.

As described above, since the housing arrangement methods of the reflection mirrors 223, 232 and 234 are similar, the housing arrangement method of the reflection mirror 232 will mainly be described here with reference to FIGS. 6 and 13. Note that, similar housing arrangement methods are applied to other reflection mirrors 223 and 234.

Firstly, the ultraviolet curing adhesive is applied on tip ends and the peripheries of the four pins 253C2 of the third positioning member 253C (step S131).

The pins 253C2 of the third positioning member 253C with the adhesive applied are inserted into the holes 251C formed on the lateral side of the container 25A (step S132).

Then, the reflection mirror 232 is housed in the component housing 251 from the upper side of the component housing 251 to oppose the pins 253C2 of the third positioning member 253C placed in the step S132 (step S133), and the back side of the reflection face of the reflection mirror 232 abuts on the tip ends of the pins 253C2 of the third positioning member 253C (step S134).

(1-7-4) Positioning Method of Optical Component

After the above-described steps SI, while the ultraviolet curing adhesive is uncured, the optical components 212 to 215, 221 to 223 and 231 to 234 are adjusted to be positioned at the predetermined positions (step S2).

More specifically, the light source device 211 is operated to irradiate the light beam of white light, an image light, which is the irradiated light beam after passing through the various optical components, is projected on a screen (not shown) through the projection lens 3, the positions of the various optical components are adjusted while the projected image is checked, and the optical components are positioned at the predetermined positions.

If the positions of the optical axis among the various optical components 212 to 215, 221 to 223 and 231 to 234 are misaligned, shade is displayed on the projected image on account of a deviation at the positions of the optical components. In such situation, the various optical components are positioned at the predetermined positions on the illumination optical axis of the light beam irradiated by the light source device 211 to eliminate the shade in the projected image.

For example, at the positioning of the optical components 212 to 215, 231 and 233, an optical axis adjustment fixture (not shown) is engaged with the optical components 212 to 215, 231 and 233 from the outside of the optical component casing 25. While the projected image is checked, the optical axis adjustment fixture is operated so that the positions of the optical components 212 to 215, 231 and 233 are adjusted according to five axes respectively in a horizontal direction, a vertical direction, a cross direction, an out-plane rotary direction around the horizontal direction as its axis, and an out-plane rotary direction around the vertical direction as its axis of the optical components. At this time, on account of the surface tension of the ultraviolet curing adhesive, the first positioning members 253A follow when the optical components 212 to 215, 231 and 233 shift, so that the first positioning members 253A position the optical components 212 to 215, 231 and 233 at the predetermined positions.

For another example, at the positioning of the dichroic mirrors 221 and 222, an optical axis adjustment fixture (not shown) is also engaged with the dichroic mirrors 221 and 222. While the projected image is checked, the optical axis adjustment fixture is operated so that the positions of the dichroic mirrors 221 and 222 are adjusted according to five axes respectively in a horizontal direction, a vertical direction, a cross direction, an out-plane rotary direction around the horizontal direction as its axis, and an out-plane rotary direction around the vertical direction as its axis of the dichroic mirrors. At this time, on account of the surface tension of the ultraviolet curing adhesive, the spacers 253B3 follow when the dichroic mirrors 221 and 222 shift, so that the spacers 253B3 position the dichroic mirrors 221 and 222 at the predetermined positions.

For further example, at the positioning of the reflection mirrors 223, 232 and 234, an optical axis adjustment fixture (not shown) is also engaged with the plate bodies 253C1 of the third positioning members 253C. While the projected image is checked, the optical axis adjustment fixture is operated to shift the plate bodies 253C1. At this time, on account of the surface tension of the ultraviolet curing adhesive, the reflection mirrors 223, 232 and 234 follow when the plate bodies 253C1 shift, so that the positions of the reflection mirrors 223, 232 and 234 are adjusted according to five axes respectively in a horizontal direction, a vertical direction, a cross direction, an out-plane rotary direction around the horizontal direction as its axis, and an out-plane rotary direction around the vertical direction as its axis of the reflection mirrors. At this time, on account of the surface tension of the ultraviolet curing adhesive, the third positioning members 253C hold the reflection mirrors 223, 232 and 234 at the predetermined positions so that the third positioning members 253C position the reflection mirrors 223, 232 and 234 at the predetermined positions.

(1-7-5) Position Fixing Method of Optical Component

In the step S2, after positioning the various optical components 212 to 215, 221 to 223 and 231 to 234, the positions of the various optical components are fixed on the optical component casing 25 by irradiating ultraviolet ray among the components to cure the ultraviolet curing adhesive (step S3).

Specifically, for example, at the positioning of the optical components 212 to 215, 231 and 233, ultraviolet ray is irradiated from the lateral side of the container 25A toward the first positioning members 253A. The irradiated ultraviolet ray passes through the first positioning member 253A to cure the ultraviolet curing adhesive applied between the first positioning member 253A and the support portion 251K as well as the ultraviolet curing adhesive applied between the groove 253A1 of the first positioning member 253A and the peripheral ends of the optical components 212 to 215, 231 and 233.

For another example, at the positioning of the dichroic mirrors 221 and 222, ultraviolet ray is irradiated from the upper side of the container 25A toward the spacers 253B3. The irradiated ultraviolet ray passes through the spacer 253B3 to cure the ultraviolet curing adhesive applied between the spacer 253B3 and the support portion 253B4. The irradiated ultraviolet ray also cures the ultraviolet curing adhesive applied between the peripheries of the spacers 253B3 and the plate members 253B2 as well as the ultraviolet curing adhesive applied between the spacers 253B3 and the left and right ends of the dichroic mirrors 221 and 222.

For further example, at the positioning of the reflection mirrors 223, 232 and 234, ultraviolet ray is irradiated from the lateral side of the container 25A toward the third positioning members 253C. The irradiated ultraviolet ray passes through the plate body 253C1 and the pins 253C2 to cure the ultraviolet curing adhesive applied between the peripheries of the pins 253C2 and the holes 251C as well as the ultraviolet curing adhesive applied between the tip ends of the pins 253C2 and the back sides of the reflection faces of the reflection mirrors 223, 232 and 234.

After the operation of the above steps S1 to S3, the lid 25B is connected to the container 25A by a screw etc. (step S4) to manufacture the optical unit 2.

Incidentally, a hole for engaging the optical axis adjustment fixture (not shown) with the optical components housed inside and a hole for irradiating ultraviolet ray toward the spacers 253B3 may be formed on the lid 25B so that the lid 25B is connected to the container 25A after the step S1, and the steps S2 and S3 are performed in the above state.

(1-7-6) Rework Method of Optical Component

As shown in FIG. 10, in the optical unit 2 manufactured according to the operation of the above-described steps S1 to S4, when the optical component requires to be replaced etc. and the optical component is removed from the optical component casing 25 (step S5), a rework operation (step S6) is performed. In the rework operation (step S6), since the above-described rework members 254X, 254Y and 254Z are used, refer to FIGS. 7 to 9 appropriately when the rework operation (step S6) is described.

When the optical components 212 to 215, 231 and 233 are removed, the following will be performed. As mentioned above, since the holding structures of the optical components 212 to 215, 231 and 233 have similar structures, the rework method of the superposing lens 215 will mainly be described here.

Firstly, as shown in FIG. 7, the opening side of the support member 254A of the rework member 254X abuts on a position corresponding to the hole 251A on the lateral side of the container 25A. The rework screw 254B arranged on the hole 254A1 of the support member 254A is screwed to the rework screw hole 253A2 formed on the first positioning member 253A. The rework screw 254B is then rotated in a direction screwing into the rework screw hole 253A2 to change the screwing state. Accordingly, since the first positioning member 253A is moved toward the rework member 254X, the adhered state between the first positioning member 253A and the support portion 251K is released, as is the adhered state between the groove 253A1 of the first positioning member 253A and the outer periphery of the superposing lens 215, so that the superposing lens 215 is removed from the optical component casing 25.

When the reflection mirrors 223, 232 and 234 are removed, the following will be performed. As mentioned above, since the holding structures of the reflection mirrors 223, 232 and 234 have similar structures, the rework method of the reflection mirror 232 will mainly be described here.

Firstly, as shown in FIG. 9, the opening side of the support member 254A of the rework member 254Z abuts on the lateral side of the container 25A so that the third positioning member 253C is positioned inside the c-shaped support member 254A. The rework screw 254B arranged on the hole 254A1 of the support member 254A is screwed to the rework screw hole 253C3 formed on the plate body 253C1 of the third positioning member 253C. The rework screw 254B is then rotated in a direction screwing into the rework screw hole 253C3 to change the screwing state. Accordingly, since the third positioning member 253C is shifted toward the rework member 254Z, the adhered state between the peripheries of the pins 253C2 of the third positioning member 253C and the holes 251C of the container 25A is released, as is the adhered state between the tip ends of the pins 253C2 and the back side of the reflection face of the reflection mirror 232, so that the reflection mirror 232 is removed from the optical component casing 25.

Further, when the dichroic mirrors 221 and 222 are removed, the following will be performed.

Firstly, the rework member 254Y is inserted into a hole (not shown) of the lid 25B to be attached on an upper end of the plate member 253B2 of the second positioning member 253B. The rework screw 254B arranged on the hole 254A1 of the support member 254A is screwed to the rework screw hole 253B6 formed on the spacer 253B3 of the second positioning member 253B. The rework screw 254B is then rotated in a direction screwing into the rework screw hole 253B6 to change the screwing state. Accordingly, since the spacer 253B3 is moved toward the lid member 25B, the adhered state between the spacer 253B3 and the support portion 253B4 is released, as is the adhered state between the spacer 253B3 and the plate member 253B2, and also between the spacer 253B3 and the left and right ends of the dichroic mirrors 221 and 222, so that the dichroic mirrors 221 and 222 are removed from the second positioning member 253B.

After performing the above-described rework operation S6, the step S1 is taken to sequentially perform housing, positioning and fixing of the replaced optical component.

(1-8) Advantages of First Embodiment

According to the above-described first embodiment, following advantages can be obtained.

(1-8-1) The optical component casing 25 includes the container 25A, the lid 25B and the positioning member 253. The container 25A and the lid 25B are made of an aluminum plate by sheet metal processing. The positioning member 253 positions the various optical components 212 to 215, 221 to 223 and 231 to 234 housed in the container 25A. Accordingly, as compared to the conventional optical component casing having an external position reference face therein and requiring highly accurate manufacturing, the optical component casing 25 can easily be manufactured and the production cost can be reduced.

(1-8-2) The container 25A and the lid 25B are made of aluminum. Accordingly, the optical component casing 25 is well heat-conductive so as to radiate the heat generated by the optical systems 21, 22 and 23 and the electric optical device 24 due to irradiation of light beam irradiated by the light source device 211 to the optical component casing 25, thereby enhancing cooling efficiency of the optical component. Further, the intensity of the optical component casing 25 can be maintained.

(1-8-3) Since the various optical components 212 to 215, 221 to 223 and 231 to 234 are fixed on the optical component casing 25 with the positioning members 253, a member such as a holder frame for holding the optical components 212 to 215, 221 to 223 and 231 to 234 can be omitted, thereby reducing the production cost when the optical unit 2 is manufactured.

(1-8-4) The grooves 253A1 are formed on the end of the first positioning members 253A. The first positioning members 253A are inserted to the inside through the holes 251A formed on the lateral side of the container 25A so that the grooves 253A1 abuts on the outer peripheries of the optical components 212 to 215, 231 and 233 to suspend them. Accordingly, the first positioning members 253A can easily and accurately position the optical components 212 to 215, 231 and 233.

(1-8-5) Since the positions of the optical components 212 to 215, 231 and 233 are fixed on the optical component casing 25 with the outer peripheries of the optical components 212 to 215, 231 and 233 abutting on the grooves 253A1 of the first positioning members 253A, the first positioning members 253A reduce an external force so that the positions of the optical components 212 to 215, 231 and 233 can be fixed on the optical component casing 25 without displacement.

(1-8-6) The hole 251A formed on the lateral side of the container 25A is formed by cutting and folding the part of the lateral side inside the container 25A, and the cut and folded part of the lateral side defining the support portion 251K for supporting the first positioning member 253A. Accordingly, the shift of the first positioning members 253A accompanied with the shift of the optical components 212 to 215, 231 and 233 on account of the surface tension of the ultraviolet curing adhesive can be smoothly performed, thus accurately positioning the optical components 212 to 215, 231 and 233. Further, since the part of the lateral side of the container 25A is cut and folded, the hole 251A and the support portion 251K can easily be formed. Furthermore, by the first positioning members 253A and the support portions 251K for supporting the first positioning members 253A, the positions of the optical components 212 to 215, 231 and 233 can be securely fixed.

(1-8-7) The second positioning member 253B includes the mount 253B1, the pair of plate members 253B2 and the spacers 253B3. The dichroic mirrors 221 and 222 are arranged between the pair of plate members 253B2 in an inclined manner relative to the pair of plate members 253B2, and spacers 253B3 are interposed between the respective members defined by the left and right ends of the dichroic mirrors 221 and 222, and the plate members 253B2. Accordingly, after the positions of the dichroic mirrors 221 and 222 are adjusted, the dichroic mirrors 221 and 222 can easily be positioned at the predetermined positions on the illumination optical axis of the light beam irradiated by the light source device 211 by the spacers 253B3.

(1-8-8) When the dichroic mirrors 221 and 222 are housed in the component housing 251 of the container 25A, the dichroic mirrors 221 and 222 are arranged on the second positioning members 253B in advance, so that the second positioning members 253B in which the dichroic mirrors 221 and 222 are arranged are housed in the component housing 251. Accordingly, as compared to that the dichroic mirrors 221 and 222 are directly housed in the component housing 251 with the various optical components being closely arranged, the dichroic mirrors 221 and 222 can easily and accurately be housed in the component housing 251.

(1-8-9) Since the dichroic mirrors 221 and 222 are arranged in the second positioning members 253B, even when the profiles of the dichroic mirrors 221 and 222 are changed, the profile of the container 25A is not necessary to be changed, but the plate members 253B2 of the second positioning members 253B can correspond by changing the adjacent distances thereof.

(1-8-10) In the plate member 253B2, the part of the end is cut and folded toward the plate member 253B2 opposite thereto in a triangular shape, which serves as the support portion 253B4 for supporting the spacer 253B3. Accordingly, the shift of the spacers 253B3 accompanied with the shift of the dichroic mirrors 221 and 222 on account of the surface tension of the ultraviolet curing adhesive can be smoothly performed, thus accurately positioning the dichroic mirrors 221 and 222 by the spacers 253B3. Further, by the spacers 253B3 and the support portions 253B4, the positions of the dichroic mirrors 221 and 222 can be securely fixed.

(1-8-11) Since the spacers 253B3 are formed in a triangular prism, with the spacers 253B3 interposed between the plate members 253B2 and the left and right ends of the dichroic mirrors 221 and 222, the inclined direction of the slanted face of the triangular prism is configured to be the approximately same direction as the inclined direction of the dichroic mirrors 221 and 222. Accordingly, the spacers 253B3 can securely be abut on the left and right ends of the dichroic mirrors 221 and 222. Therefore, the spacers 253B3 can accurately position the dichroic mirrors 221 and 222. Further, the fixed state of the dichroic mirrors 221 and 222 on the optical component casing 25 can securely be maintained.

(1-8-12) The third positioning members 253C includes the plate body 253C1 and the pins 253C2, the pins 253C2 are inserted through the holes 251C formed on the lateral side of the container 25A, the tip ends of the pins 253C2 abut on the back side of the reflection face of the reflection mirrors 223, 232 and 234, the reflection mirrors are shifted to adjust the positions thereof, and the reflection mirrors are positioned at the predetermined positions by the third positioning members 253C. Accordingly, the reflection mirrors 223, 232 and 234 can easily be positioned while the light beam irradiated by the light source device 211 can be prevented from being shielded due to the third positioning members 253C.

(1-8-13) Since the third positioning members 253C each include the four pins 253C2, the positions of the reflection mirrors 223, 232 and 234 can smoothly be adjusted according to the five axes respectively in the horizontal direction, the vertical direction, the cross direction, the out-plane rotary direction around the horizontal direction as its axis, and the out-plane rotary direction around the vertical direction as its axis of the reflection mirrors 223, 232 and 234.

(1-8-14) Since the four pins 253C2 are integrated by the plate body 253C1, as compared to an arrangement that the positions of the reflection mirrors 223, 232 and 234 are adjusted according to the five axes by shifting the respective four pins 253C2, the four pins 253C2 can be shifted at once only by the plate body 253C1 being shifted in an arbitrary direction. Thus, the positions of the reflection mirrors 223, 232 and 234 are further easily adjusted according to the five axes.

(1-8-15) When the reflection mirrors 223, 232 and 234 are replaced and so on, the four pins 253C2 can be removed at once without a cumbersome work of removing the four pins 253C2 one by one, thus enhancing reworkability of the reflection mirrors 223, 232 and 234.

(1-8-16) Each of the rework members 254X, 254Y and 254Z attachable to the optical component casing 25 includes the support member 254A and the rework screw 254B. Further, the rework screw hole 253A2 or 253C3 capable of screwing with the rework screw 254B is formed on the first positioning member 253A, the spacer 253B3 and the third positioning member 253C. The opening side of the support member 254A abuts on the outer side of the optical component casing 25 so that the rework screw 254B is screwed into the rework screw hole 253A2 or 253C3. By changing the screwing state, the first positioning member 253A, the spacer 253B3 and the third positioning member 253C are shifted to release each fixed state of the optical components 212 to 215, 221 to 223 and 231 to 234 on the optical component casing 25 by the first positioning members 253A, the spacer 253B3 and the third positioning member 253C. Accordingly, after the positions of the optical components 212 to 215, 221 to 223 and 231 to 234 are fixed, even when the optical components are replaced and so on, each fixed state of the optical components 212 to 215, 221 to 223 and 231 to 234 on the optical component casing 25 can easily be released. Thus reworkability of the optical components 212 to 215, 221 to 223 and 231 to 234 can be enhanced.

(1-8-17) The inner side of container 25A and the lid 25B are coated with anodized black-aluminum. Accordingly, even when a part of the light beam irradiated by the light source device 211 is misaligned from the predetermined illumination optical axis, the light beam can be prevented from reflecting in the optical component casing 25, thus reducing the light beam leaking outside the optical component casing 25.

(1-8-18) Since the projector 1 includes the above-described optical component casing 25, the projector 1 can easily be manufactured and the production cost can also be reduced. Further, since the metallic container 25A and the lid 25B can efficiently radiate the heat generated at the optical systems 21, 22 and 23 and the electric optical device 24, the optical components can live longer so that the image light projected by the projector 1 can be maintained clear.

(1-9) Modifications of First Embodiment

Incidentally, the scope of the present invention is not restricted to the above embodiment but includes following modifications as long as an object of the present invention can be achieved.

In the above embodiment, as shown in FIG. 5, though the second positioning member 253B includes the plate-shaped mount 253B1, the pair of plate members 253B2 and the spacers 253B3, the second positioning member 253B can be arranged only by the spacers 253B3. In such case, the bottom side of the container 25A substitutes the plate-shaped mount 253B1, and the pair of lateral sides of the container 25A substitutes the pair of plate members 253B2. Further, the housing operation of the dichroic mirror (step S12) described with reference to FIG. 12 would be an operation for housing the dichroic mirrors 221 and 222, the spacers 253B3 with the adhesive applied in the container 25A, in the above-listed order. With this arrangement, the structure of the second positioning member 253B can be facilitated, thus reducing the weight of the optical unit 2. Further, since the housing operation of the dichroic mirrors 221 and 222 (step S12) can be facilitated, the production cost can be reduced.

In the above embodiment, in order to place the first positioning member 253A and the third positioning member 253C on the optical component housing 25, though the holes 251A and 253C are respectively formed on the lateral side of the container 25A, it is not limited thereto. For example, holes can be formed on the lid 25B or the bottom side of the container 25A so that the first positioning member 253A and the third positioning member 253C are placed through the holes.

In the above embodiment, though the third positioning member 253C includes the plate body 253C1 and the four pins 253C2 projected from the plate body 253C1, it is not limited thereto. For instance, the arrangement may only have pins 253C2 without the plate body 253C1, and two, three or more than five pins 253C2 can be projected without limiting to the four pins 253C2.

In the above embodiment, though the optical components 212 to 215, 231 and 233 are respectively held by each two first positioning members 253A, one or more than three first positioning members can hold the optical components.

In the above embodiment, though the spacer 253B3 of the second positioning member 253B has a triangular prism shape, for instance, may be a columnar shape, a quadratic prism shape or the like.

In the above embodiment, though the support portion 251K formed on the component housing 251 of the container 25A has the structure extending from the lower edge of the hole 251A to be orthogonal to the lateral side of the container 25A, the structure may extends from the upper, left or right edge of the hole 251A to be orthogonal to the lateral side of the container 25A.

In the above embodiment, though the ultraviolet curing adhesive is used for fixing the positions of the optical components 212 to 215, 221 to 223 and 231 to 234, a heat curing adhesive can be used when the positions of the optical components 212 to 215, 221 to 223 and 231 to 234 are fixed by curing with hot air. Further, the adhesive is not limited to the ultraviolet curing adhesive nor the heat curing adhesive, and may be any adhesive as long as the shift of the various optical components 212 to 215, 221 to 223 and 231 to 234 can follow the first positioning members 253A, the spacers 253B3 of the second positioning members 253B and the plate bodies 253C1 of the third positioning members 253C on account of the surface tension of the ultraviolet curing adhesive.

(2) Second Embodiment

Next, a second embodiment of the present invention will be described below with reference to the attached drawings. In the following description and drawings, the same reference numerals will be attached to the same components as the components according to the first embodiment and FIGS. 1 to 13 to omit the description thereof.

(2-1) Structure of Projector and Configuration of Optical System

Figure 14:
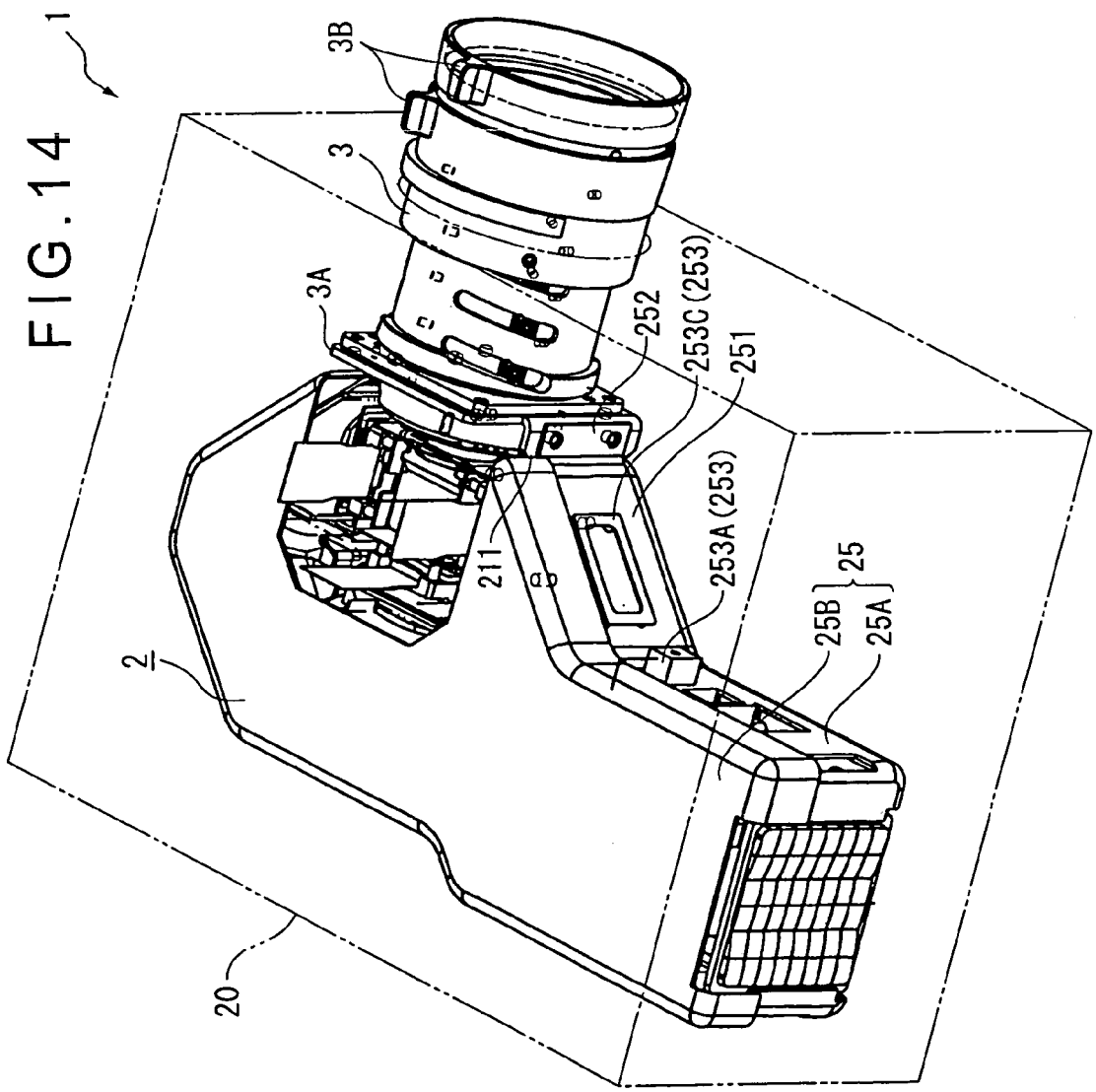
FIG. 14 is a perspective view showing structure of a projector including an optical component casing according to a second embodiment.
Figure 15:
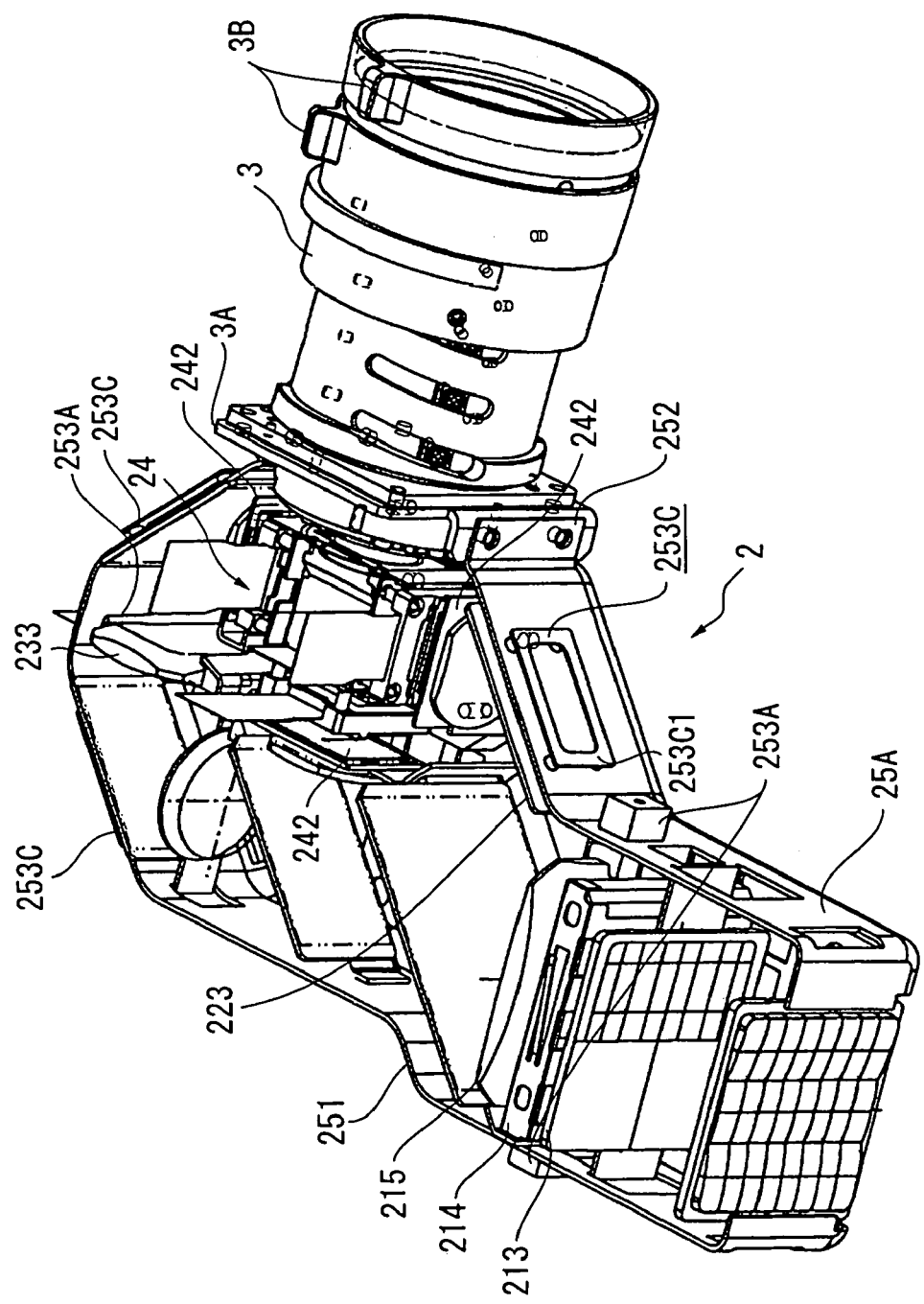
FIG. 15 is an illustration where a lid of the optical unit is removed according to the aforesaid embodiment.
Figure 16:
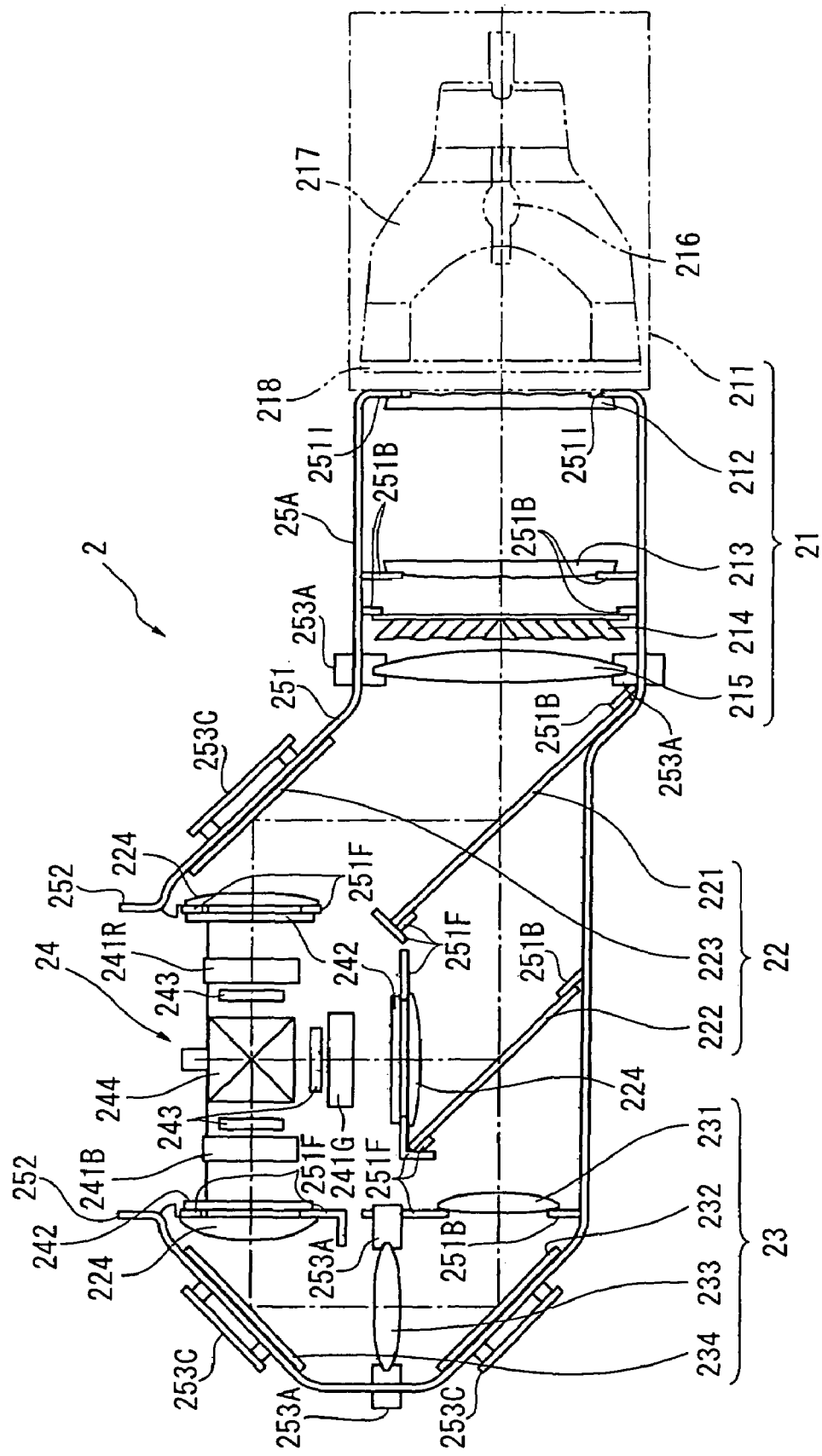
FIG. 16 is an illustration to explain an optical system according to the aforesaid embodiment.

FIG. 14 is a perspective view showing structure of a projector 1 including an optical component casing according to a second embodiment. FIG. 15 is an illustration of the optical unit 2 with the lid 25B of FIG. 14 being removed. FIG. 16 is an illustration to explain an optical system. Structure of the projector and configuration of the optical system according to the present embodiment are approximately the same as the structure of the projector and the configuration of the optical system according to the first embodiment except that the structure of the optical component casing and that the electric optical device 24 are not supported by the head 26.

(2-2) Structure of Optical Component Casing

As shown in FIG. 14 or 15, the optical component casing 25 includes the various optical components of the above-described optical systems 21, 22 and 23 excluding the light source device 211, the container 25A for housing the electric optical device 24, the lid 25B for closing the upper opening of the container 25A, and the first positioning members 253A and the third positioning members 253C for fixing the optical components 215, 223 and 232 to 234 at the predetermined positions of the container 25A.

Figure 17:
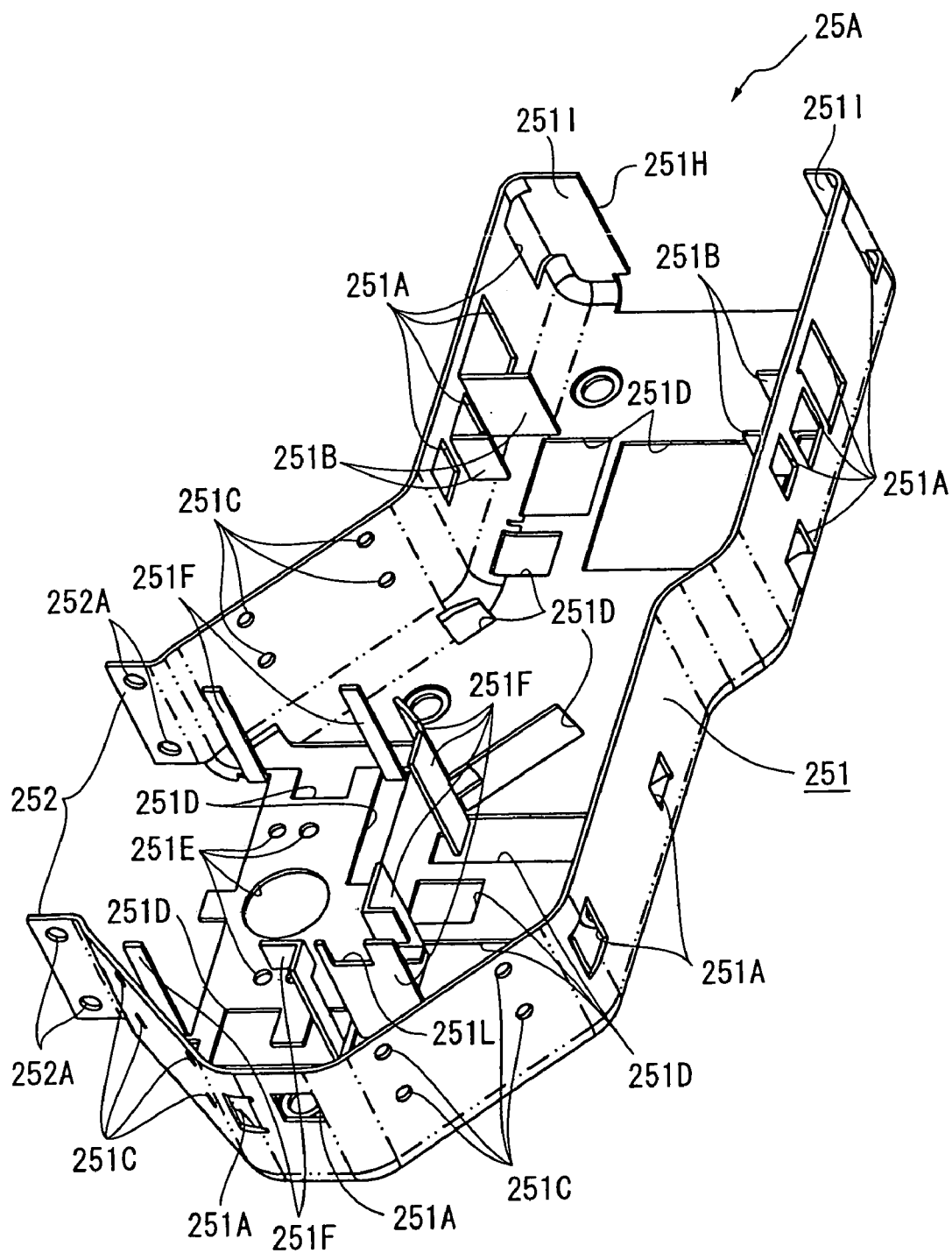
FIG. 17 is a perspective view showing an upper side of the container according to the aforesaid embodiment.
Figure 18:
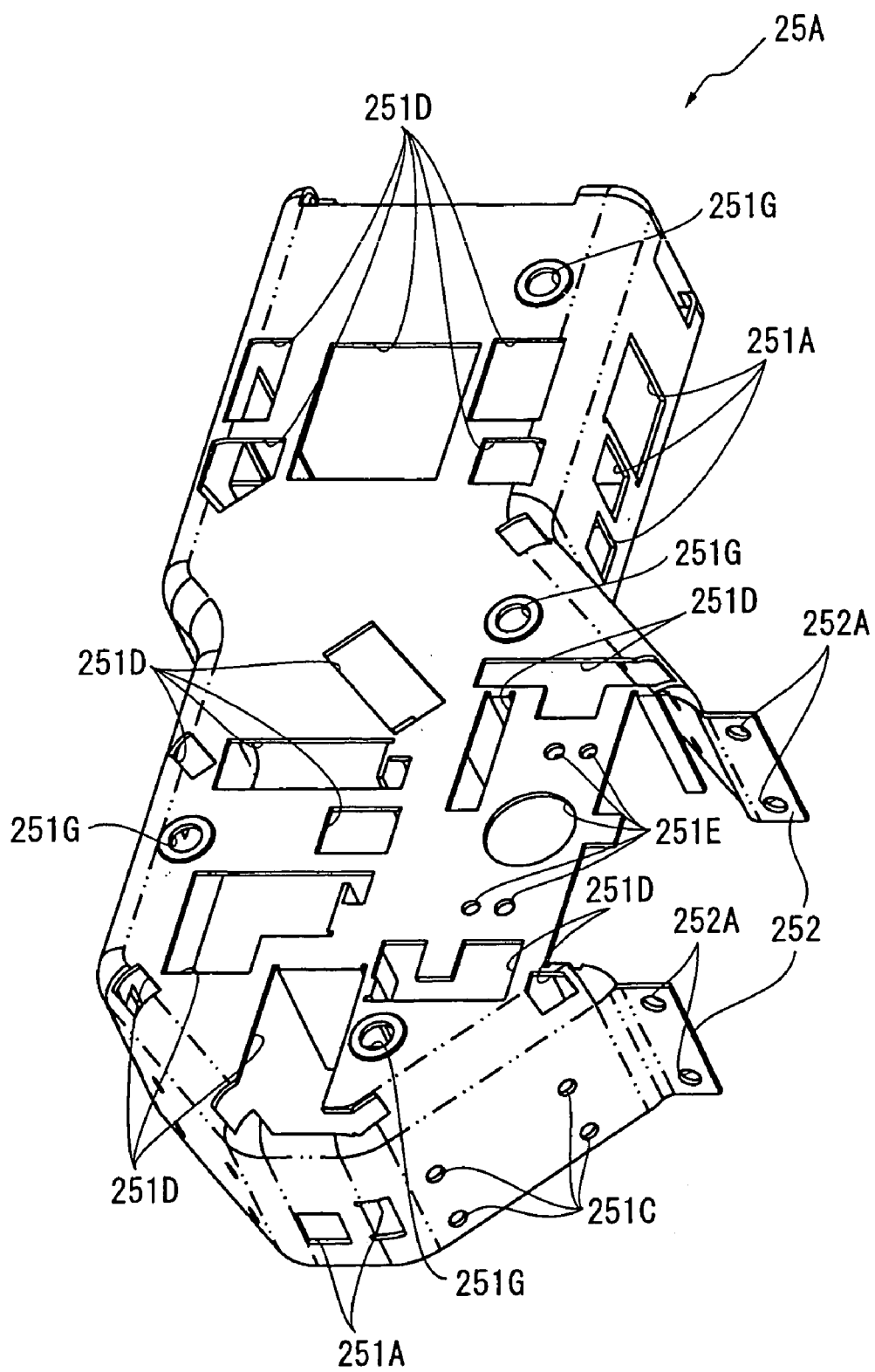
FIG. 18 is a perspective view showing a lower side of the container according to the aforesaid embodiment.

FIG. 17 is a perspective view showing an upper side of the container 25A. FIG. 18 is a perspective view showing a lower side of the container 25A.

As shown in FIGS. 14 to 18, the container 25A made of an aluminum plate by sheet metal processing includes the various optical components of the optical systems 21, 22 and 23 (FIGS. 16 and 17) excluding the light source device 211, the component housing 251 for housing the electric optical device 24 and a projection lens mount 252 on which the projection lens 3 is placed.

As shown in FIG. 17 or 18, the component housing 251 is formed in a container shape by drawing with an upper side thereof being opened. The projection lens mount 252 is provided on an end of the component housing 251, and the opening 251H for conducting the light beam irradiated by the light source device 211 and a support portion 251I for supporting the periphery of the optical component 212 are formed on the other end thereof.

As shown in FIG. 17, a plurality of holes 251A are formed on the lateral side of the component housing 251 corresponding to the positions of the optical components 212 to 215, 221, 222, 231 and 233 (FIGS. 15 and 16). A part of each hole 251A is formed by cutting and folding the part of the lateral side of the container 25A toward the inside. The cut and folded parts serve as support portions 251B for supporting the peripheries of the optical components 213, 214, 221, 222 and 231. Further, the plurality of circular holes 251C are formed on the lateral side to penetrate toward the inside corresponding to the positions of the optical components 223, 232 and 234 (FIGS. 15 and 16).

As shown in FIG. 18, a plurality of holes 251D, into which a part of the optical component positioning jig of a below-described manufacturing apparatus can be inserted, and positioning holes 251E for fixing the position of the prism unit are formed on the bottom side of the component housing 251. As shown in FIG. 17, some of the holes 251D provided near the positioning holes 251E out of the plurality of the holes 251D are formed by cutting and folding the parts of the bottom side which serve as the support portions 251F for supporting the peripheries of the optical components 221, 222, 224, 231 and 242. As shown in FIG. 18, four positioning holes 251G for placing the container 25A at the predetermined position of the below-described manufacturing apparatus are formed on a back side of the bottom side of the component housing 251.

Though not shown, the plurality of burring holes with the screw grooves are formed on the upper end of the component housing 251.

As shown in FIG. 17 or 18, the projection lens mount 252 formed by bending so that a lateral side on the end of the component housing 251 extends toward a front side thereof to support the projection lens 3 from both left and right sides via a flange 3A (FIG. 15 or 15). Screw holes 252A for fixing the projection lens 3 are formed on the projection lens mount 252, and the projection lens 3 is placed on the projection lens mount 252 by fixing screws (not shown) screwing into screw holes (not shown) formed on the flange 3A of the projection lens 3 through the screw holes 252A.

The lid 25B is made of an aluminum plate by sheet metal processing as is the above-described container 25A to connect the upper end of the container 25A. As shown in FIG. 14, the lid 25B is formed in a planarly-viewed F-shape that opens an upper side of the electric optical device 24 housed in the component housing 251 of the container 25A and closes the opening of the other opening part of the component housing 251. Though not shown, a plurality of holes are formed on the lid 25B so that the lid 25B is fixed to the container 25A by screws etc. through the holes and burring holes (not shown) formed on the container 25A.

Incidentally, the inner side of the component housing 251 of the above-described container 25A and the lower side of the lid 25B are coated with anodized black-aluminum.

(2-3) Holding Structure of Optical Component

Next, holding structure of the various optical components of the optical systems 21, 22 and 23 and the electric optical device 24 excluding the light source device 211 on the optical component casing 25 will be described.

The optical components 212 to 215, 231 and 233 (lenses etc.) are held by the optical component casing 25 via the first positioning members 253A according to the first embodiment, however, in the present embodiment, some of the first positioning members 253A are omitted except that for the superposing lens 215 and the relay lens 233. Further, the field lens 224 are held by the field lens holder 263 of the head 26 according to the first embodiment, however, in the present embodiment, the field lens is also held by the optical component casing 25.

As shown in FIG. 16, the optical components 212 to 214, 231, 224 and 242 are directly fixed on the support portions 251I, 251B and 251F formed by cutting and folding the lateral side or the bottom side of the container 25A with the use of the ultraviolet curing adhesive.

On the other hand, the superposing lens 215 and the relay lens 233 are held via the first positioning members 253A in the same manner as the first embodiment. Both two positioning members 253A for holding the superposing lens 215 are inserted through the holes 251A formed on the lateral side of the container 25A, and fixed by the ultraviolet curing adhesive. In the two positioning members 253A for holding the relay lens 233, the one is inserted to the hole 251A formed on the lateral side of the container 25A and the other is provided on a recess 251L (FIG. 17) of a holder 251F formed by cutting and folding the bottom side of the container 25A, both being fixed by the ultraviolet curing adhesive.

Further, the dichroic mirrors 221 and 222 are held by the optical component casing 25 via the second positioning members 253B according to the first embodiment, however, in the present embodiment, the second positioning members 253B are omitted. In the either dichroic mirrors 221 and 222, one of the pair of sides is directly fixed on the support portion 251B formed by cutting and folding the lateral side of the container 25A and the other thereof is directly fixed on the support portion 251F formed by cutting and folding the bottom side of the container 25A, both being fixed by the ultraviolet curing adhesive.

The reflection mirrors 223, 232 and 234 are held by the optical component casing 25 via the third positioning members 253C in the same manner as the first embodiment.

Further, the prism unit is fixed on the mount face 262 of the head 26 according to the first embodiment, however, in the present embodiment, the prism unit is fixed on the bottom side of the container 25A through a mount with screws. Positioning projections (not shown) are formed on a lower side of the mount to fit to the positioning holes 251E formed on the bottom side of the container 25A. Fixing between the mount and the container 25A may use an adhesive without limiting to screws.

(2-4) Manufacturing Apparatus of Optical Unit

Figure 19:
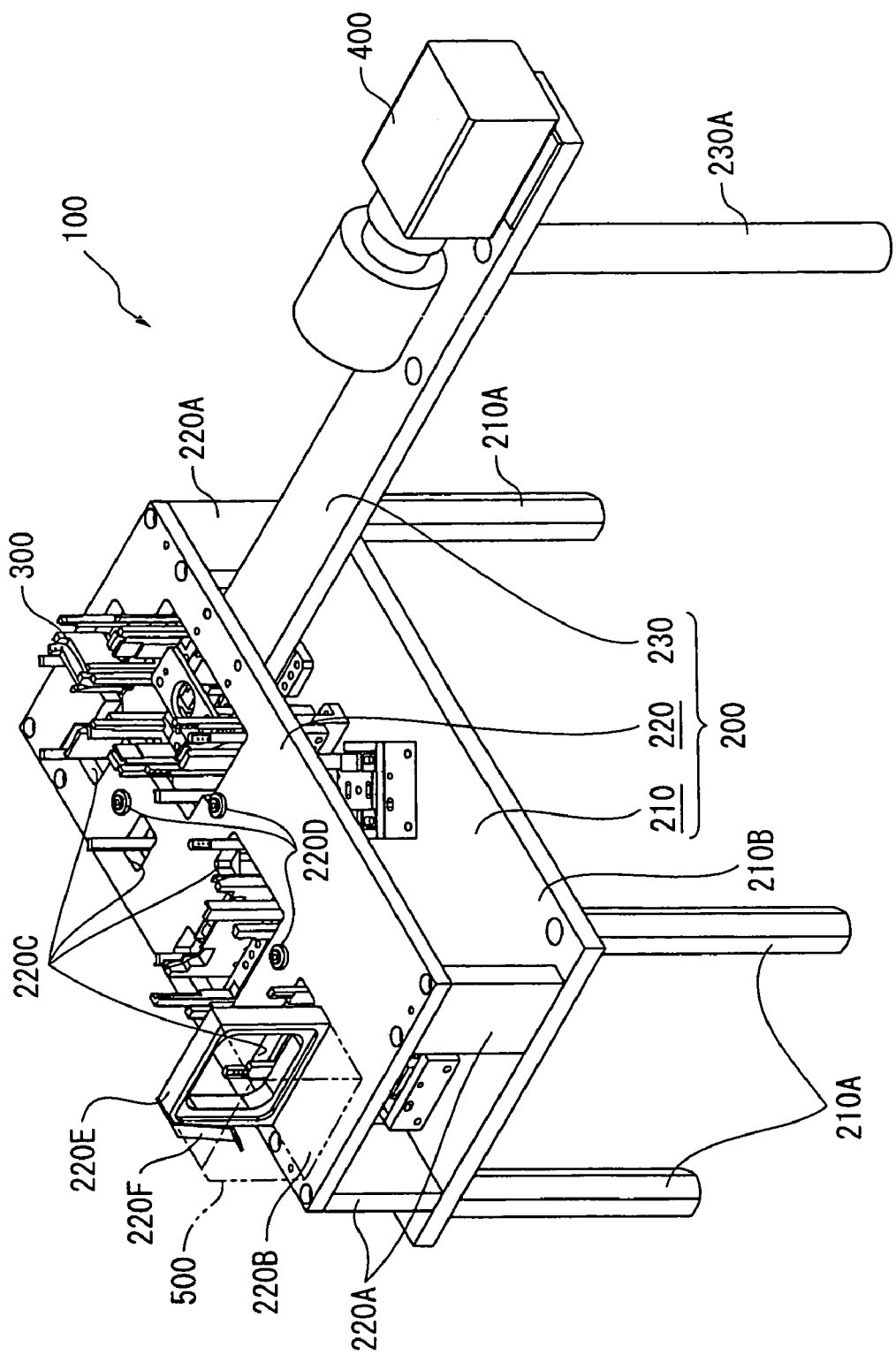
FIG. 19 is an entire perspective view showing brief structure of a manufacturing apparatus of the optical unit according to the aforesaid embodiment.

FIG. 19 is an entire perspective view showing brief structure of the manufacturing apparatus 100 of the optical unit 2 according to the present embodiment. Structure of the manufacturing apparatus 100 will be described as follows.

The manufacturing apparatus 100 is a device for positioning and fixing the optical components 212 to 215, 221 to 224, 231 to 234 and 242 at predetermined positions corresponding to the optical component casing 25 (FIG. 14). As shown in FIG. 19, the manufacturing apparatus 100 includes a table 200, an optical component positioning jig 300, an optical image detecting device 400, an adjustment light source device 500 and a control device 600 (not shown here).

(2-4-1) Table

The table 200 mounts and fixes the optical unit 2 (FIG. 14), the optical component positioning jig 300, the optical image detecting device 400 and the adjustment light source device 500. As shown in FIG. 19, the table 200 includes a first table 210, a second table 220 and a third table 230.

The first table 210 is formed in a table shape having legs 210A on four corners thereof, and the optical component positioning jig 300 and the second table 220 are mounted and fixed on an upper side 210B. Though not shown, a vacuum pump controllably driven by the below-described control device 600 and an ultraviolet irradiator etc. are placed below the first table 210.

The second table 220 is formed in a table shape having legs 220A on four corners thereof as is the first table 210, and the container 25A of the optical unit 2 and the adjustment light source device 500 are mounted on an upper side 220B. The second table 220 having a plurality of openings 220C is mounted and fixed on the first table 210 with parts of the optical component positioning jig 300 inserted to the plurality of openings 220C.

Positioning projections 220D are formed on the upper side 220B of the second table 220 for mounting the container 25A of the optical unit 2 at a predetermined position. The container 25A is then mounted at the predetermined position by the positioning projections 220D engaging with the positioning holes 251G (FIG. 18) formed on the bottom side of the above-described container 25A.

Further, a rectangular frame-shaped light source device mount 220E for placing the adjustment light source device 500 at a predetermined position is formed on the upper side 220B of the second table 220. A biasing portion 220F is attached to the light source device mount 220E so that the adjustment light source device 500 is biased and fixed on the light source device mount 220E by the biasing portion 220F.

The third table 230 is connected to the second table 220, which mounts the optical image detecting device 400 on the upper side. An end of the third table 230 is fixed on a lower side of the second table 220, and the other end thereof is supported by the legs 230A.

(2-4-2) Optical Component Positioning Jig

Figure 20:
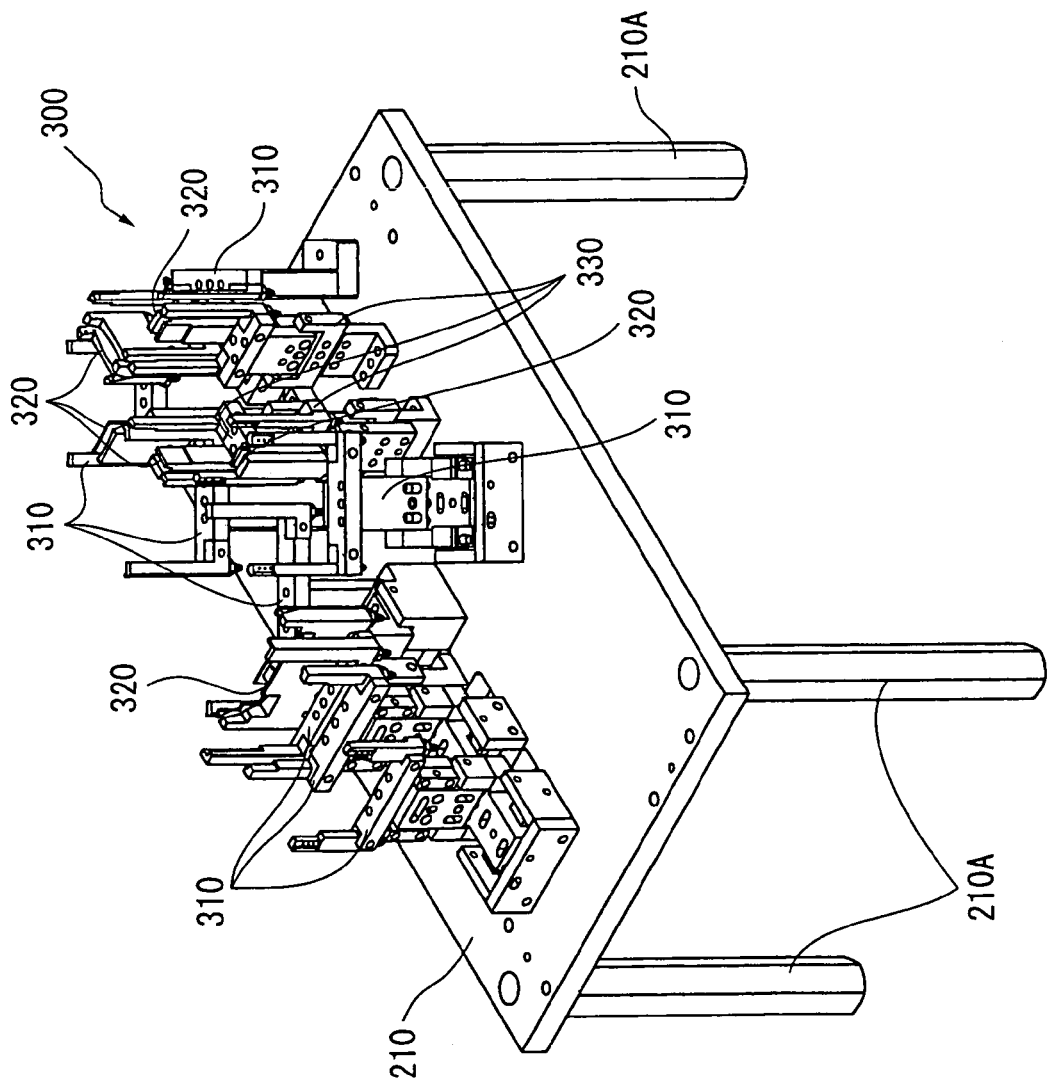
FIG. 20 is a perspective view showing brief structure of an optical component positioning jig according to the aforesaid embodiment.

FIG. 20 is a perspective view showing brief structure of the optical component positioning jig 300 according to the present embodiment.

Each optical component positioning jig 300 is placed on designed predetermined positions of the optical components 212 to 215, 221 to 224, 231 to 234 and 242 on the first table 210 to support the optical components 212 to 215, 221 to 224, 231 to 234 and 242 and also to adjust the positions of the optical components 213 to 215, 223, 233 and 242 which have the optical axis. As shown in FIG. 20, the optical component positioning jigs 300 can be classified broadly into first positioning jigs 310 for positioning the optical components 212 to 214, 221 to 223, 232 and 234, second positioning jigs 320 for positioning the optical components 215, 224, 231 and 233, and a third positioning jig 330 for positioning the optical component 242 by grouping similar structures. Incidentally, the optical positioning jig 300 will be described below with an XYZ orthogonal coordinate system in which the illumination optical axis of the light beam irradiated by the light source device 211 (FIG. 16) represents Z-axis, and directions orthogonal to the Z-axis represent X-axis and Y-axis.

(i) First Positioning Jig

Figure 21:
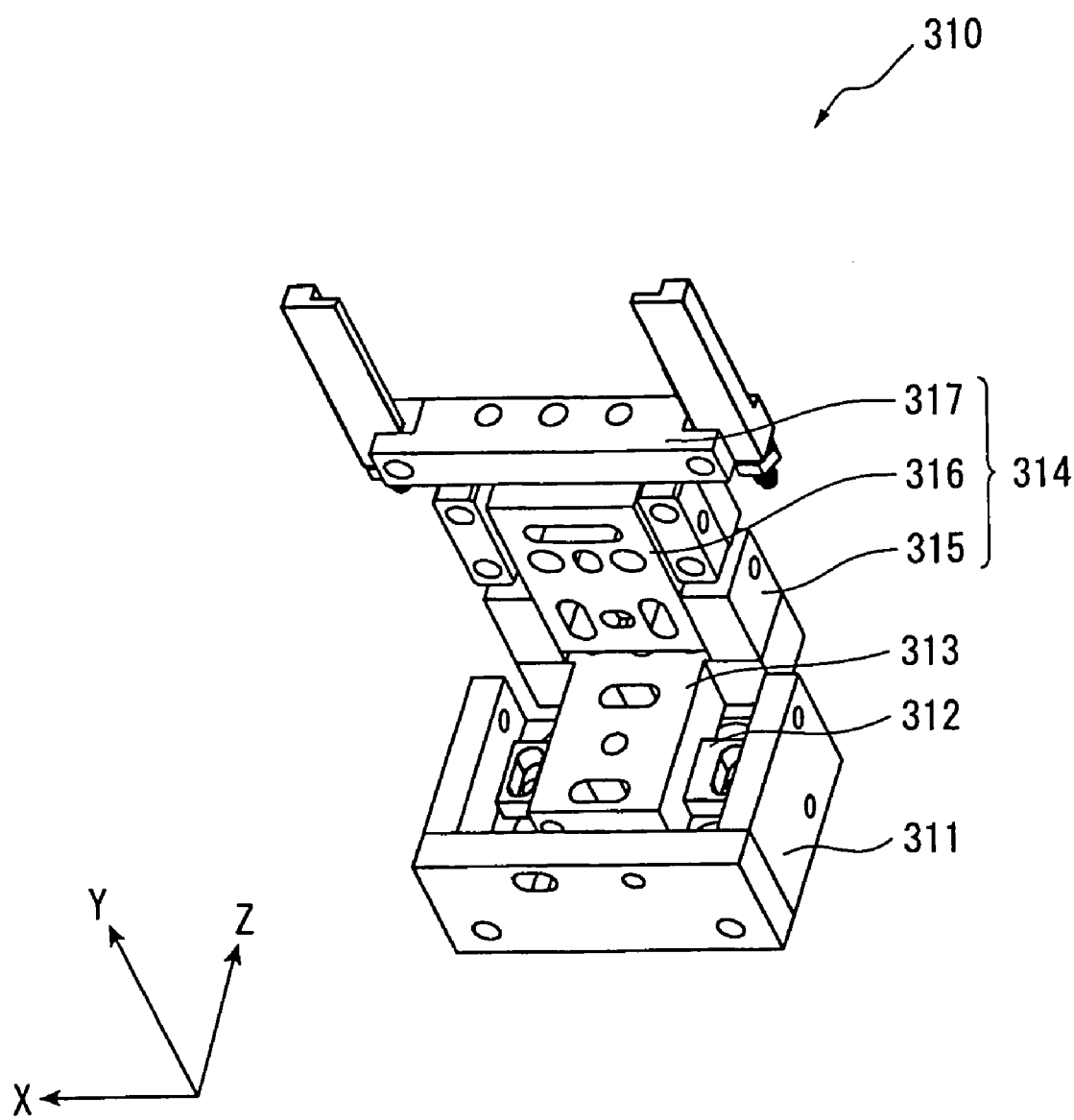
FIG. 21 is a perspective view showing structure of a first positioning jig according to the aforesaid embodiment.

FIG. 21 is a perspective view showing structure of the first positioning jig 310. As described above, since the first positioning jigs 310 for positioning the first lens array 212, the second lens array 213, the polarization converter 214, the dichroic mirrors 221 and 222, and the reflection mirrors 223, 232 and 234 have similar structures, the first positioning jig 310 for positioning the second lens array 213 will mainly be described here. The first positioning jigs 310 for positioning the optical components 212, 214, 221 to 223, 232 and 234 excluding the second lens array 213 have approximately the same structures.

As shown in FIG. 21, the first positioning jig 310 includes a base 311, a Z-axis shifter 312, an X-axis shifter 313 and a first optical component support portion 314.

The base 311 having an approximately planarly-viewed C-shape is fixed at a position corresponding to the second lens array 213 on the first table 210 so that a distal side of the C-shape faces Z-axis direction. In the base 311, an engaging groove (not shown) is formed on the inside of the planarly-viewed C-shape along the distal side of the C-shape to engage with the Z-axis shifter 312.

The Z-axis shifter 312 having an approximately parallel-epiped profile and being orthogonal to the distal side of the C-shape of the base 311 engages with the engaging groove (not shown) formed on the base 311 to shift in the Z-axis direction relative to the base 311. Further, the Z-axis shifter 312 serves as a rail of the X-axis shifter 313.

The X-axis shifter 313 extends in X-axis direction while the approximately center part thereof in the X-axis direction has a planarly-viewed T-shape extending in the Z-axis direction. An engaging groove (not shown) is formed on a lower side of the end thereof extending in the Z-axis direction to engage with the Z-axis shifter 312 to shift in the X-axis direction relative to the Z-axis shifter 312.

The first optical component support portion 314 is connected to the end of the X-axis shifter 313 extending in the X-axis direction and formed to extend from the end in Y-axis direction for supporting the second lens array 213. As shown in FIG. 21, the first optical component support portion 314 has a base 315, a shifter 316 and a first holder 317.

The base 315 has an approximately planarly-viewed C-shape fixed on an upper side of an end of the X-axis shifter 313 extending in the X-axis direction so that a distal side of the C-shape extends in the Z-axis direction. In the base 315, an engaging groove (not shown) is formed on the inside of the planarly-viewed C-shape along the Y-axis direction to engage with the shifter 316.

The shifter 316 extends from the inside of the base 315 in the Y-axis direction and has a planarly-viewed T-shape, of which the distal end in the extending direction extends in the X-axis direction. The shifter 316 engages with the engaging groove (not shown) formed on the base 315 so as to shift in the Y-axis direction relative to the base 315 and to turn in a rotation direction around the Y-axis.

Figure 22:
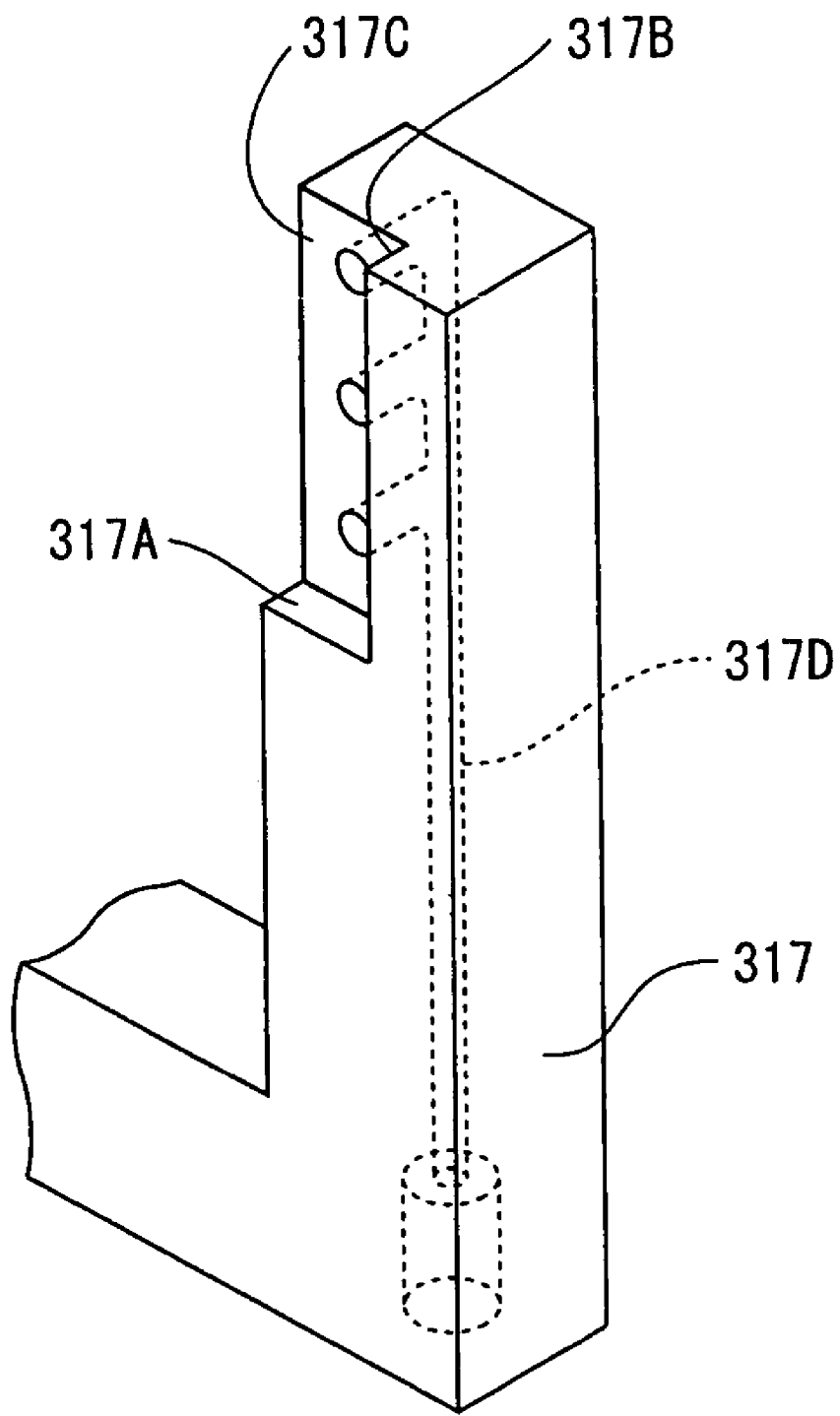
FIG. 22 is an illustration showing holding structure of a first holder for the optical component according to the aforesaid embodiment.

FIG. 22 is an illustration showing holding structure of the optical component by the first holder 317.

The first holder 317 has an approximately planarly-viewed C-shape of which a base end is fixed on an end of the shifter 316 in +Y-axis direction to support the second lens array 213 by the tip ends of the planarly-viewed C-shape. As shown in FIG. 22, a first support face 317A for supporting the lower side of the second lens array 213, a second support face 317B for supporting the lateral side of the second lens array 213 and a third support face 317C for supporting the light-incident side of the second lens array 213 are formed on each tip end of the first holder 317. The first support face 317A, the second support face 317B and the third support face 317C are arranged as external position reference faces of the second lens array 213.

As shown in FIG. 22, a communication hole 317D is formed inside the first holder 317 along the distal side of the planarly-viewed C-shape so that an end of the communication hole 317D connects the third support face 317C with the end being split into three, and the other end thereof connects the lower side of the first holder 317. The second lens array 213 can stick to the third support face 317C by intake of air from the side of the other end with a vacuum pump (not shown) placed below the first table 210 through a tube (not shown). With such sticking, the second lens array 213 is held by the first holder 317.

In the above-described first positioning jig 310, pulse motors (not shown) are fixed on the Z-axis shifter 312, the X-axis shifter 313 and the shifter 316 so that the pulse motors are driven under the control of the control device 600 (not shown here) to appropriately shift the Z-axis shifter 312, the X-axis shifter 313 and the shifter 316. Incidentally, without limiting to the control of the control device 600, the Z-axis shifter 312, the X-axis shifter 313 and the shifter 316 can be shifted by a manual operation of an operator.

(ii) Second Positioning Jig

Figure 23:
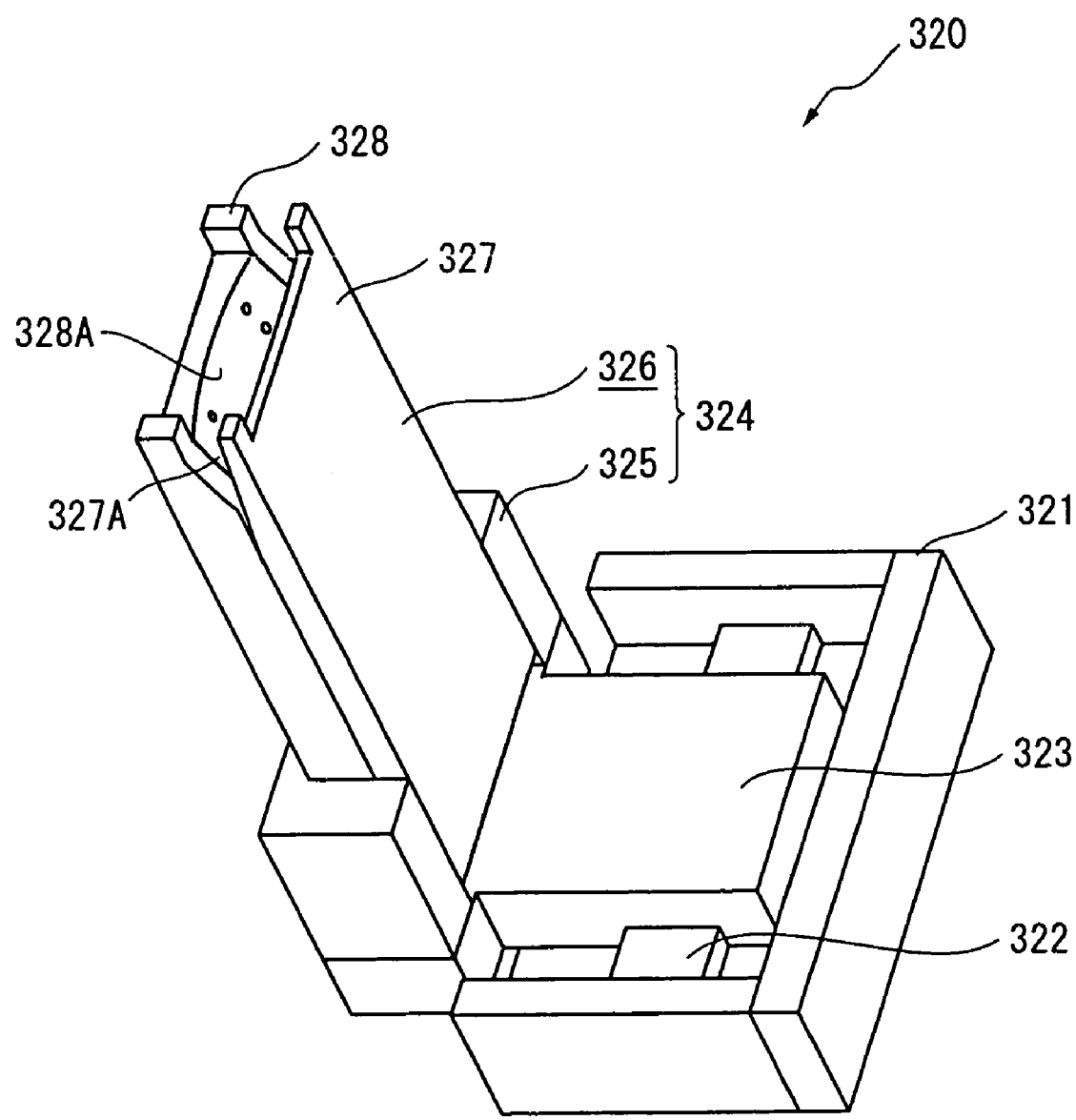
FIG. 23 is a perspective view showing structure of a second positioning jig according to the aforesaid embodiment.

FIG. 23 is a perspective view showing structure of the second positioning jig 320. As described above, since the second positioning jigs 320 for positioning the superposing lens 215, the field lens 224, the incident-side lens 231 and the relay lens 233 have similar structures, the second positioning jig 320 for positioning the relay lens 233 will mainly be described here. The second positioning jigs 320 for positioning the optical components 215, 224 and 231 other than the relay lens 233 have approximately the same structures.

As shown in FIG. 23, the second positioning jig 320 includes a second optical component support portion 324 in addition to a base 321, a Z-axis shifter 322 and an X-axis shifter 323 having approximately the same structures as the above-described base 311, the Z-axis shifter 312 and the X-axis shifter 313 of the first positioning jig 310. Note that, since the structures of the base 321, the Z-axis shifter 322 and the X-axis shifter 323 are approximately the same as that of the base 311, the Z-axis shifter 312 and the X-axis shifter 313 of the first positioning jig 310, the description will be omitted.

The second optical component support portion 324 is connected to an end of the X-axis shifter 323 extending in the X-axis direction and formed to extend from the end in the Y-axis direction for supporting the relay lens 233. As shown in FIG. 23, the second optical component support portion 324 has a base 325 and a second holder 326.

The base 325 having an approximately planarly-viewed C-shape is fixed on the end of the X-axis shifter 323 extending in the X-axis direction so that distal side of the C-shape extends in the Z-axis direction. An engaging groove (not shown) is formed on the inside of the approximately planarly-viewed C-shape of the base 325 along the Y-axis direction to engage with the second holder 326.

The second holder 326 has an approximately parallelepiped profile extending from the inside of the C-shape of the base 325 in the Y-axis direction to hold the relay lens 233 at tip ends thereof and to engage with the engaging groove (not shown) formed on the base 325 so as to shift in the Y-axis direction relative to the base 325.

As shown in FIG. 23, the second holder 326 includes a first support member 327 and a second support member 328, the first support member 327 and the second support member 328 being integrated each other.

The first support member 327 has an approximately parallelepiped profile with the thickness of an end thereof opposite to the second support member 328 being formed taper to be smaller toward the side of the end in the +Y-axis direction. The taper part serves as a first support face 327A for supporting the light-irradiation side of the relay lens 233.

The second support member 328 has an approximately parallelepiped profile on which a recess corresponding to the profile of the periphery of the relay lens 233 is formed on the end opposite to the first support member 327 at the side of the end in the +Y-axis direction. The recess serves as a second support face 328A for supporting the light-incident side of the relay lens 233.

Figure 24:
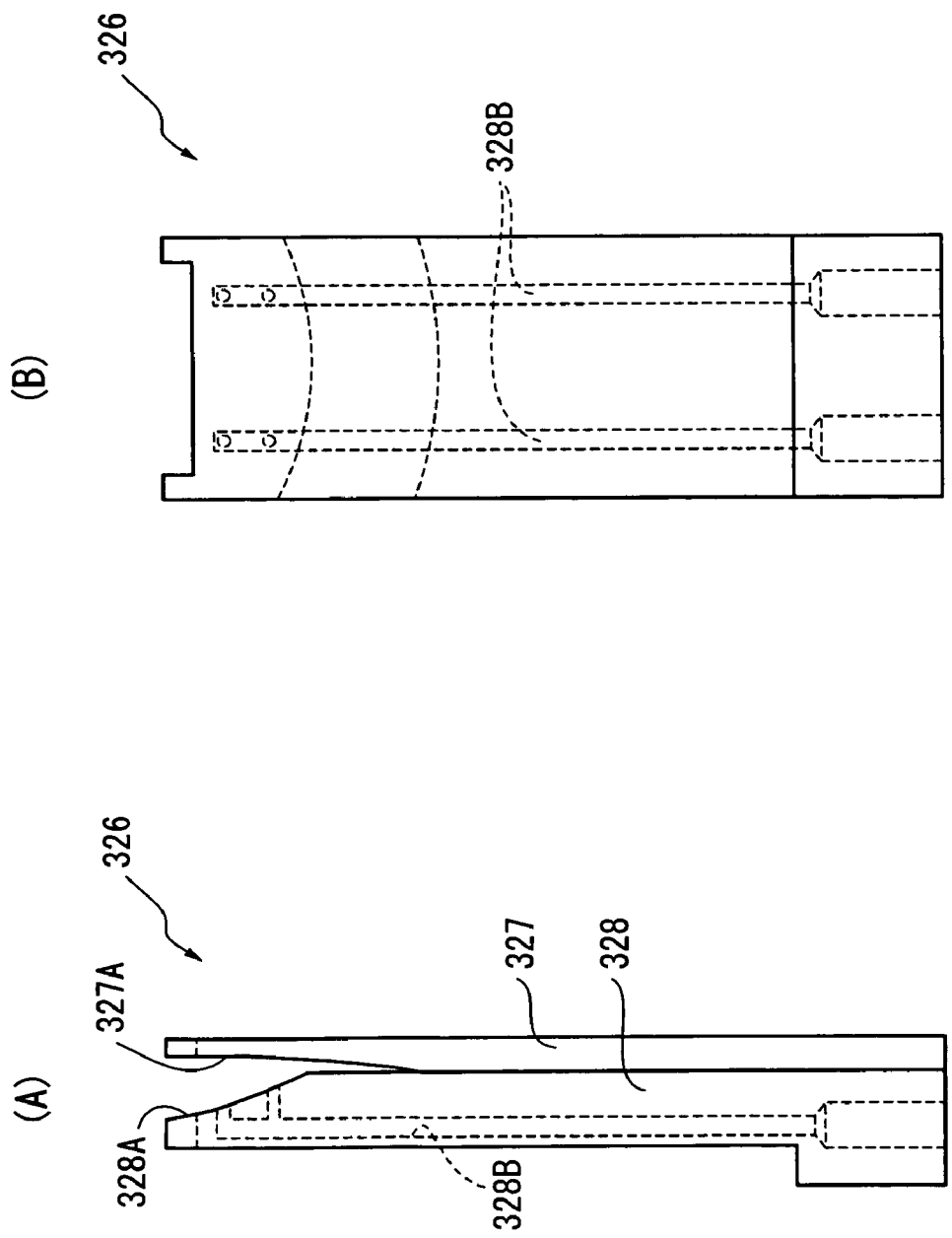
FIG. 24 is an illustration showing holding structure of a second holder for the optical component according to the aforesaid embodiment.

FIG. 24 is an illustration showing holding structure of the optical component by the second holder 326.

As shown in FIG. 24(B), two communication holes 328B are formed inside the second support member 328 of the second holder 326 in parallel along the Y-axis direction. As shown in FIG. 24(A), the communication holes 328B connects the second support face 328A at ends thereof with each end being split into two, and connects the lower side of the second support member 328 at other ends thereof. The relay lens 233 can stick to the second support face 328A by intake of air from the side of other ends with the vacuum pump (not shown) placed below the first table 210 through the tube (not shown). With such sticking, the relay lens 233 is held by the second holder 326.

In the above-described second positioning jig 320, pulse motors (not shown) are fixed on the Z-axis shifter 322, the X-axis shifter 323 and the second holder 326 so that the pulse motors are driven under the control of the control device 600 (not shown here) to appropriately shift the Z-axis shifter 322, the X-axis shifter 323 and the second holder 326. Incidentally, without limiting to the control of the control device 600, the Z-axis shifter 322, the X-axis shifter 323 and the second holder 326 can be shifted by a manual operation of an operator.

(iii) Third Positioning Jig

Figure 25:
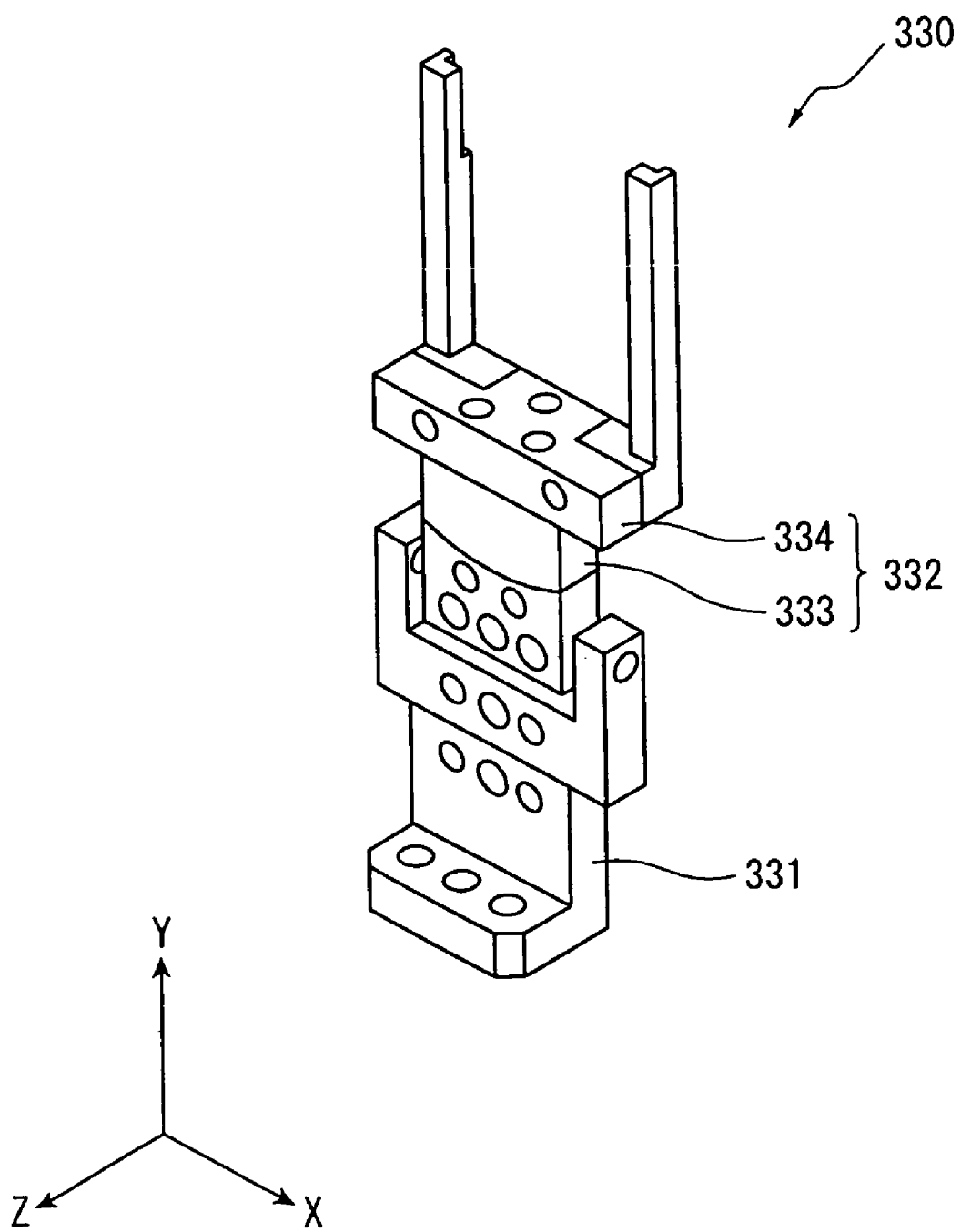
FIG. 25 is a perspective view showing structure of a third positioning jig according to the aforesaid embodiment.

FIG. 25 is a perspective view showing structure of the third positioning jig 330.

The third positioning jig 330 positions the incident-side polarization plate 242. Specifically, the third positioning jigs 330 are respectively placed at the positions corresponding to the three incident-side polarization plates 242 on the first table 210. As shown in FIG. 25, the third positioning jig 330 has a base 331 and a third optical component support portion 332.

The base 331 is a plate having a laterally-viewed L-shape connecting to a position corresponding to the incident-side polarization plate 242 on the first table 210 at an end thereof and extending in the Y-axis direction at the other end. A circular groove (not shown) is formed on the other end of the base 331 around the center of the incident-side polarization plate 242 held by the third optical component support portion 332 to engage with the third optical component support portion 332.

The third optical component support portion 332 holds the incident-side polarization plate 242 and also engages with an engaging groove (not shown) of the base 331 so as to be turnable around the Z-axis relative to the base 331. As shown in FIG. 25, the third optical component support portion 332 has a turning portion 333 and a third holder 334.

The turning portion 333, which is formed in an approximately parallelepiped profile extending in the X-axis direction, has an engaging portion (not shown) corresponding to the circular engaging groove (not shown) formed on the base 331. The turning portion 333 is turnable around the center of the incident-side polarization plate 242 held by the third holder 334 relative to the base 331 by changing the engaging state with the base 331.

The third holder 334 has an approximately planarly-viewed C-shape of which a base end of the C-shape is fixed on an end of the turning portion 333 in the +Y-axis direction to support the incident-side polarization plate 242 at tip ends of the planarly-viewed C-shape.

Though not shown, the structure of the third holder 334, which is approximately the same as the above-described first holder 317 of the first positioning jig 310, includes a first support face, a second support face and a third support face respectively corresponding to the first support face 317A, the second support face 317B and the third support face 317C of the first holder 317.

Though not shown, a communication hole is formed inside the third holder 334 as an intake of which an end connects the third support face with the end splitted into three and the other end connects a lower side of the third holder 334 in the same manner as the first holder 317. The incident-side polarization plate 242 can stick to the third support face by intake of air from the side of the other end with the vacuum pump (not shown) placed below the first table 210 through the tube (not shown). With such sticking, the incident-side polarization plate 242 is held by the third holder 334.

In the above-described third positioning jig 330, a pulse motor (not shown) is fixed on the turning portion 333 so that the pulse motor is driven under the control of the control device 600 (not shown here) to appropriately turn the turning portion 333. Incidentally, without limiting to the control of the control device 600, the turning portion 333 can be turned by a manual operation of an operator.

(2-4-3) Optical Image Detecting Device

Figure 26:
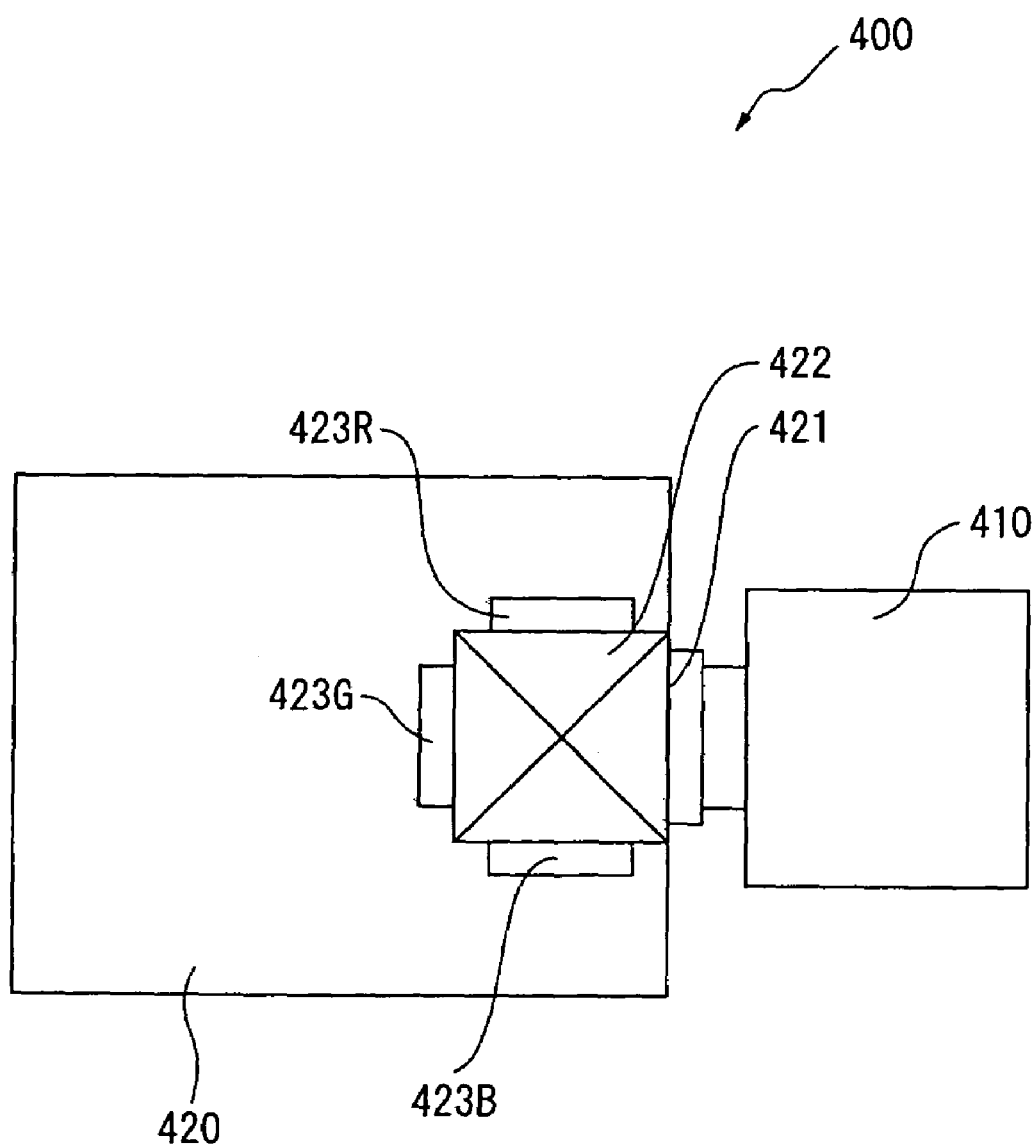
FIG. 26 is a schematic illustration showing structure of an optical image detecting device according to the aforesaid embodiment.

FIG. 26 is a schematic illustration showing structure of the optical image detecting device 400.

The optical image detecting device 400 placed on the above-described third table 230 detects the optical image irradiated by the below-described adjustment light source device 500 through the optical unit 2. As shown in FIG. 26, the optical image detecting device 400 includes a condenser lens 410 and an image pickup 420.

The condenser lens 410 is arranged by a plurality of group lenses to condense the optical image irradiated by the light-irradiation side of the cross dichroic prism 244 (FIG. 16) of the optical unit 2, in other words, the optical image formed by the respective liquid crystal panels 241R, 241G and 241B of the optical unit 2, at the inside of the optical image detecting device 400.

The image pickup 420 includes an image plane 421 formed at a back-focus position of the condenser lens 410, the dichroic prism 422 for separating the image on the image plane 421 into the three colors of red, blue and green, and three CCDs 423R, 423G and 423B placed on the light-irradiation side of the dichroic prism 422 for superposing the respective irradiated color lights.

Figure 27:
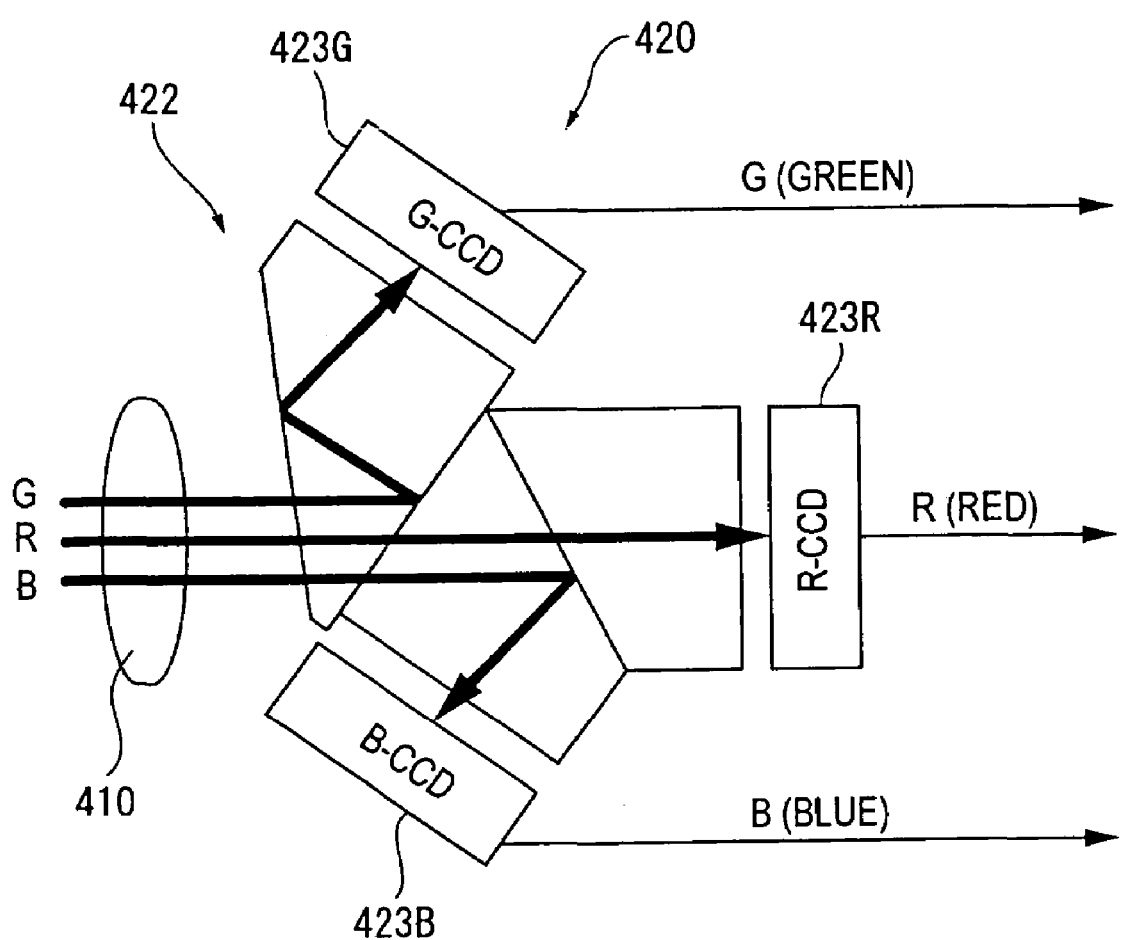
FIG. 27 is an illustration showing a modification of the optical image detecting device according to the aforesaid embodiment.

Incidentally, the image pickup 420 is not limited to such arrangement, and may employ an arrangement as shown in FIG. 27. More specifically, the dichroic prism 422 has three prisms. A blue light reflection film and a green light reflection film are formed among the three prisms. Accordingly, the light beam incident at the three prisms are separated into the respective color lights of R, G and B. Though the blue light reflection film and the green light reflection film are formed among the three prisms in this embodiment, a set of a blue light reflection film and a red light reflection film, or a set of a red light reflection film and a green light reflection film may be formed alternatively.

The three CCDs 423R, 423G and 423B are electrically connected to the control device 600 so that image signal (R, G or B signal) per each color light picked by the CCDs 423R, 423G and 423B is output to the control device 600.

(2-4-4) Adjustment Light Source Device

Figure 33:
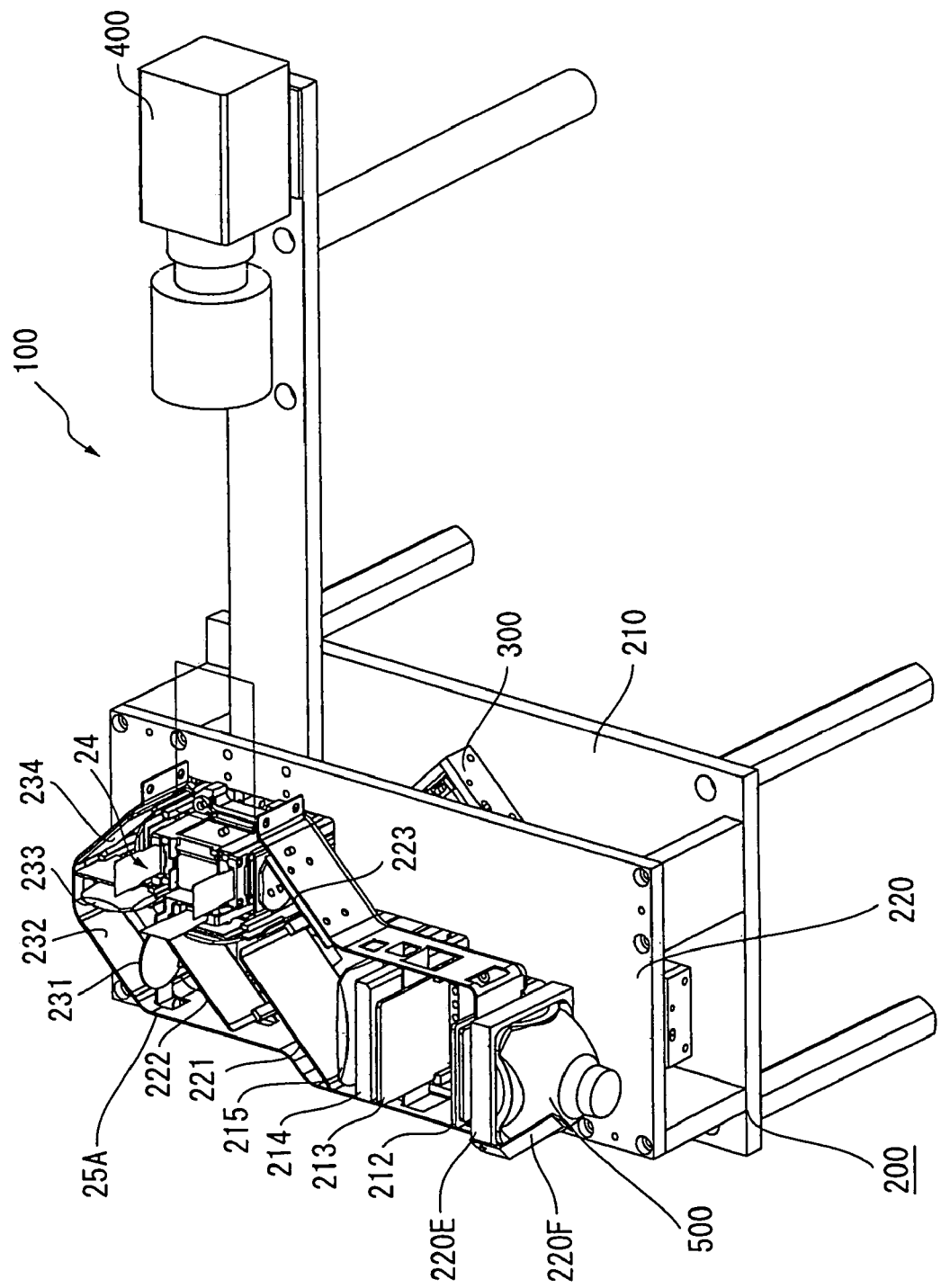
FIG. 33 is an illustration showing the state that the container and the optical component are placed on the manufacturing apparatus according to the aforesaid embodiment.

Referring to FIG. 33, the adjustment light source device 500 has a light source lamp and a reflector (both not shown) as the above-described light source device 211 of the projector 1, which is placed on the light source device mount 220E formed on the second table 220. The adjustment light source device 500 irradiates the light beam inside the optical unit 2 placed on the second table 220 on account of the electric power supplied by a power source device and a light source drive circuit (both not shown) placed below the first table 210 by way of a cable (not shown).

(2-4-5) Control Device

Figure 28:
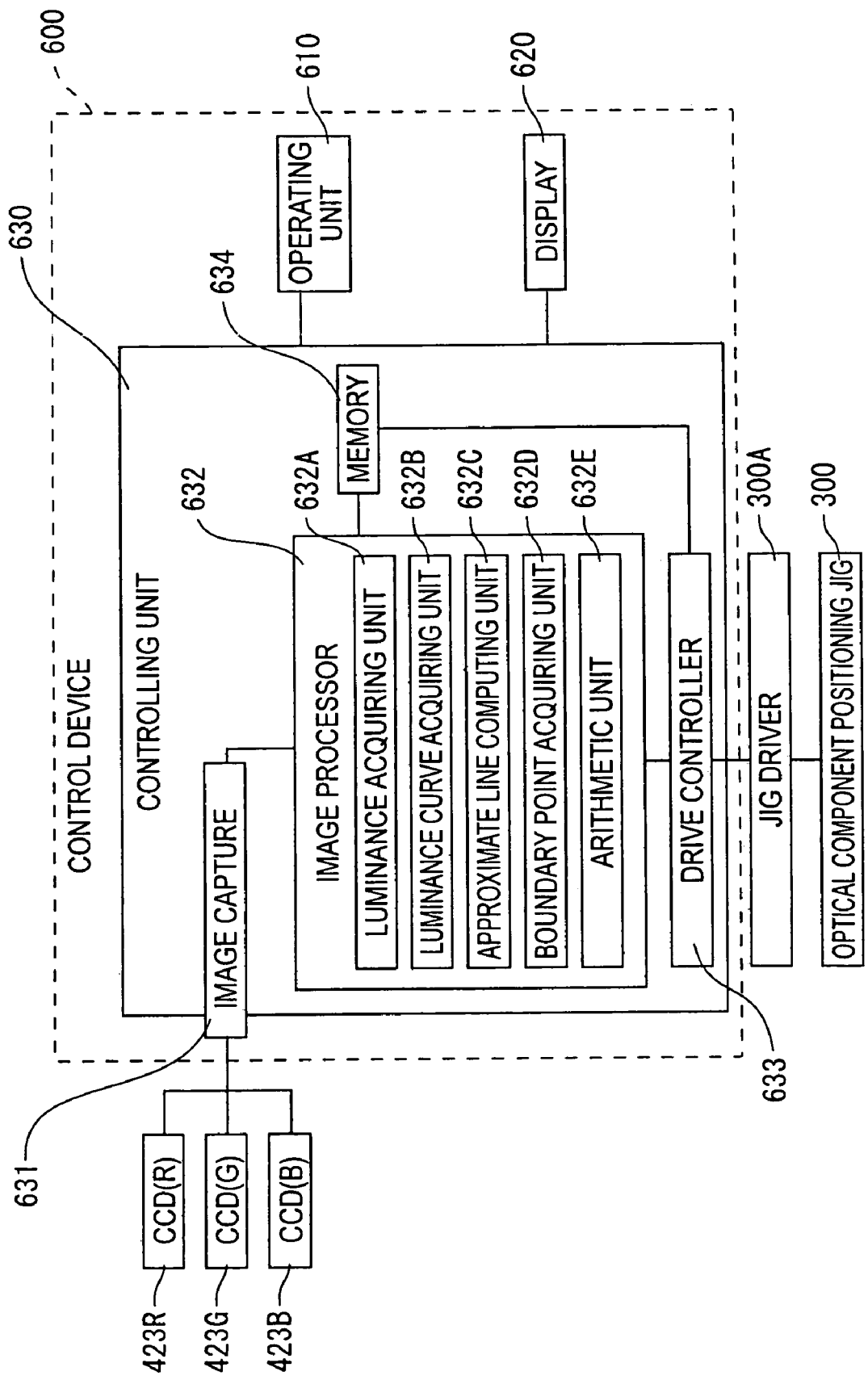
FIG. 28 is a block diagram schematically showing control structure of a control device according to the aforesaid embodiment.

FIG. 28 is a block diagram schematically showing control structure of the control device 600.

The control device 600 has a computer equipped with a CPU (Central Processing Unit) and a hard disk to entirely control the manufacturing apparatus 100 by executing various programs. As shown in FIG. 28, the control device 600 includes an operating unit 610, a display 620 and a controlling unit 630.

The operating unit 610 has, for instance, various operation buttons (not shown) input and operated by way of a keyboard, a mouse or the like. According to the input operation of the operation buttons etc., the control device 600 is operated and the operation of the control device 600 is configured for information displayed on the display 620 for example. Based upon the input operation of the operating unit 610 by an operator, a predetermined operation signal is output from the operating unit 610 to the controlling unit 630.

Note that, the input operation of the operating unit 610 is not limited to by way of the operation buttons. For instance, various requirements can be set and input by way of a touch panel, voice or the like.

The display 620 is controlled by the controlling unit 630 to display a predetermined image. For example, when displaying of an image processed by the controlling unit 630 or the input operation of the operating unit 610 causes setting or updating information stored in a below-described memory of the controlling unit 630, data in the memory output from the controlling unit 630 is appropriately displayed. The display 620 employs, for instance, a liquid crystal panel, an organic EL (electroluminescence), a PDP (Plasma Display Panel) or a CRT (Cathode-Ray Tube) etc.

The controlling unit 630, which is a program running on an OS (Operating System) for controlling the CPU, processes an image by capturing the image picked by the optical image detecting device 400 in response to the operation signal input from the operating unit 610, and controllably drives the optical component positioning jig 300 based on the processed image. As shown in FIG. 28, the controlling unit 630 includes an image capture 631, an image processor 632, a drive controller 633 and a memory 634.

For example, the image capture 631 has a video capture board etc. to input R, G and B signals output from the three CCDs 423R, 423G and 432B of the optical image detecting device 400 and to output the input R, G and B signals to the image processor 632 after being converted into an image signal.

The image processor 632 reads the image signal output from the image capture 631, processes the image corresponding to the read image signal and outputs a predetermined signal to the drive controller 633. As shown in FIG. 28, the image processor 632 includes a luminance acquiring unit 632A, a luminance curve acquiring unit 632B, an approximate line computing unit 632C, a boundary point acquiring unit 632D and an arithmetic unit 632E.

The luminance acquiring unit 632A acquires a luminance value of the image corresponding to the read image signal and relates the acquired luminance value to a coordinate value (plan position X and Y) corresponding to the luminance value to store in the memory 634.

The luminance curve acquiring unit 632B reads out the information stored in the memory 634 and acquires a luminance curve that represents variation of the luminance value on a predetermined line (in X or Y direction) according to the read coordinate value.

The approximate line computing unit 632C computes an approximate line of the variation of the luminance value based on the luminance curve acquired by the luminance curve acquiring unit 632B.

The boundary point acquiring unit 632D acquires a boundary point of an illumination area included in the image corresponding to the read image signal, and each boundary point of the image formation areas of the liquid crystal panels 241R, 241G and 241B, the boundary point being included in the image corresponding to the read image signal, based on the approximate line computed by the approximate line computing unit 632C. The acquired boundary point is then stored in the memory 634.

The arithmetic unit 632E reads out the information stored in the memory 634 to compute each position adjustment amount of the respective optical components based on the read boundary points (of the illumination area and the image formation area) or the luminance value. Then, the computed position adjustment amount is output to the drive controller 633 after being converted into a predetermined signal.

The drive controller 633 outputs a control signal to a jig driver 300A in response to a predetermined control program and the signal output from the image processor 632 so that the jig driver 300A is operated to drive the optical component positioning jig 300.

The memory 634 stores the predetermined control program as is the information output from the image processor 632.

(2-5) Manufacturing Method of Optical Unit

A manufacturing method of the optical unit 2 by way of the above-described manufacturing apparatus 100 will be described below with reference to FIGS. 19, 28 and 29.

All of the optical components 212 to 215, 221 to 223 and 231 to 234 are housed in the container 25A and then, the positions thereof are adjusted according to the first embodiment, however, in the present embodiment, a group of the optical components do not need the position adjustment.

Figure 29:
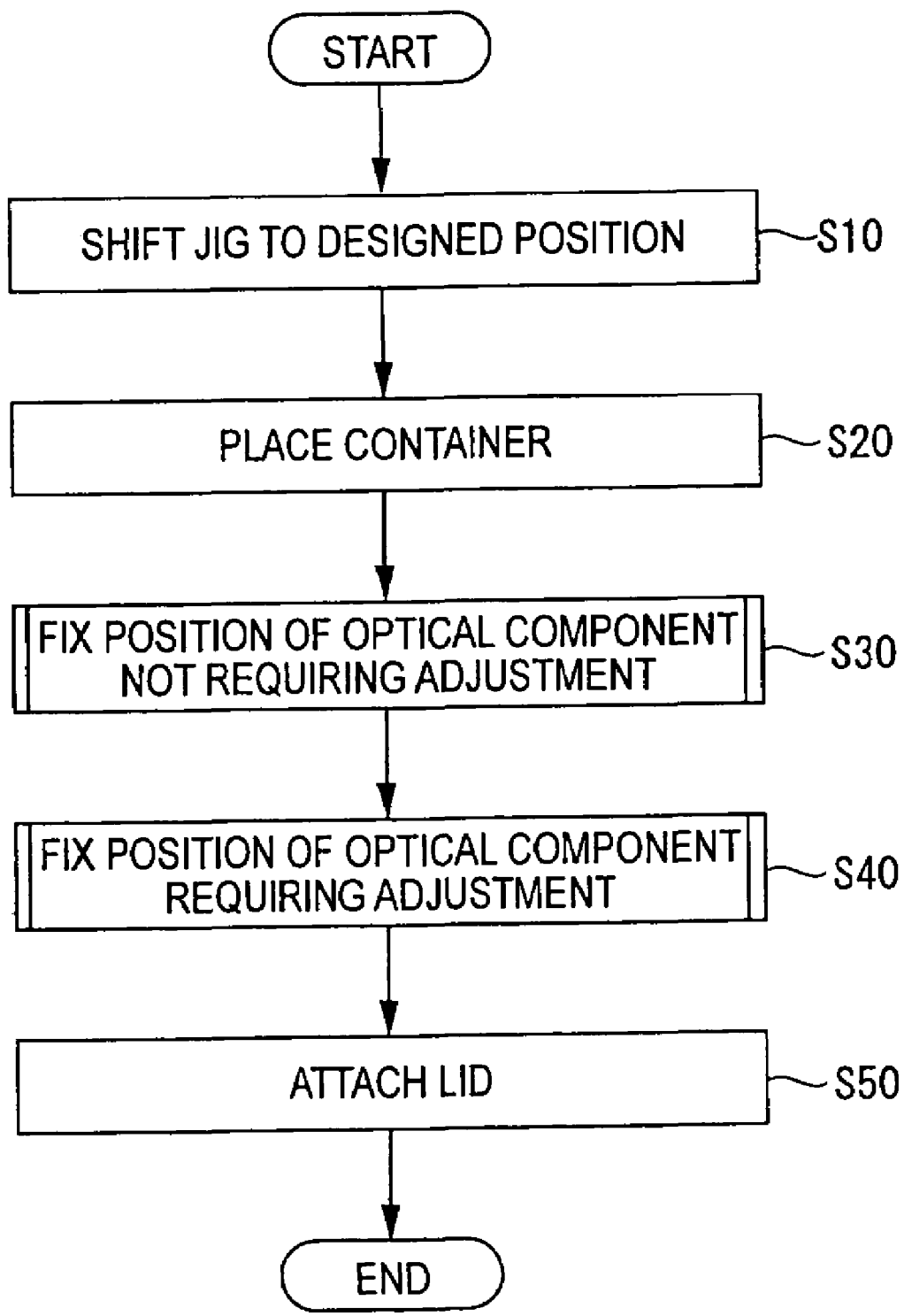
FIG. 29 is a flowchart explaining a manufacturing method of the optical unit according to the aforesaid embodiment.

FIG. 29 is a flowchart explaining the manufacturing method of the optical unit 2.

Firstly, an operator operates the operating unit 610 of the control device 600 to call up a predetermined program corresponding to the specifications of the optical unit 2 to be manufactured. The drive controller 633 of the control device 600 reads out the program stored in the memory 634 to output the control signal to the jig driver 300A, the signal requesting to shift the optical component positioning jig 300 to the designed predetermined position. Then, the pulse motors (not shown) are driven by the jig driver 300A to shift the Z-axis shifter 312, the X-axis shifter 313 and the shifter 316 of the first positioning jig 310; the Z-axis shifter 322, the X-axis shifter 323 and the second holder 326 of the second positioning jig 320; and the turning portion 333 of the third positioning jig 330 so that the optical component positioning jig 300 is arranged on the designed predetermined position (step S10).

Secondly, the container 25A is placed on the second table 220 of the manufacturing apparatus 100 (step S20).

Specifically, the operator shifts the container 25A so that the part of the optical component positioning jig 300 projecting from the upper side of the second table 220 is inserted to the hole 251D formed on the bottom side of the container 25A. Further, the positioning projection 220D formed on the upper side of the second table 220 is engaged with the positioning hole 251G formed on the bottom side of the container 25A so that the container 25A is placed at the predetermined position on the second table 220.

(2-5-1) Fixing Position of Optical Component Not Requiring Adjustment

Figure 30:
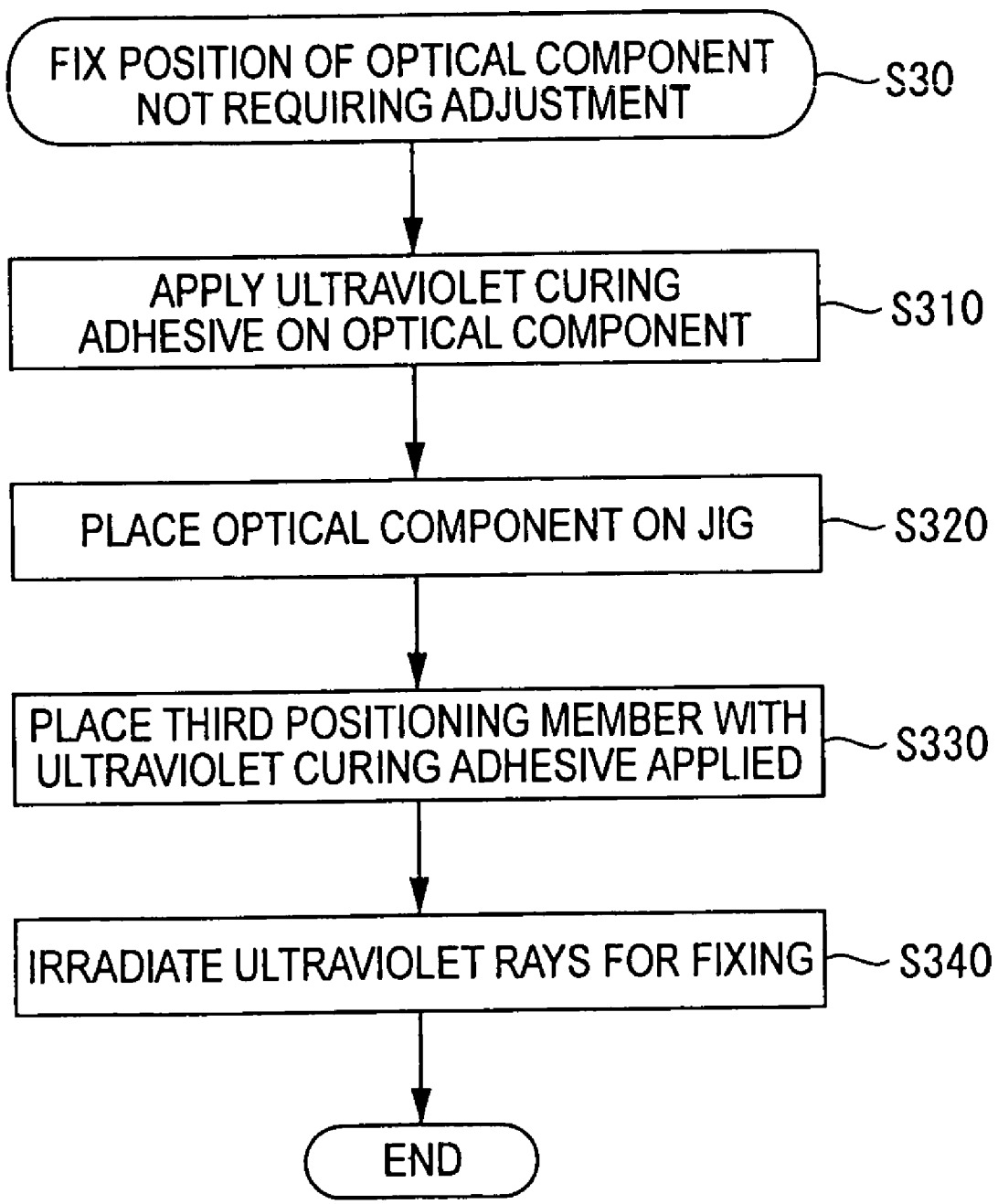
FIG. 30 is a flowchart explaining a manufacturing method of the optical unit according to the aforesaid embodiment.

After the step S20, the positions of the optical components 212, 221, 222, 224, 231, 232 and 234 not requiring the adjustment are fixed at the predetermined positions on the container 25A (step S30). In other words, the above procedure is performed according to a flowchart shown in FIG. 30.

Firstly, the operator applies the ultraviolet curing adhesive on the peripheries of the first lens array 212, the dichroic mirrors 221 and 222, the three field lenses 224 and the incident-side lens 231 (step S310).

The step S310 is necessary only for the optical components 212, 221, 222, 224 and 231. The step S310 is unnecessary for the reflection mirrors 232 and 234.

Then, the first lens array 212, the dichroic mirrors 221 and 222, the three field lenses 224 and the incident-side lens 231 each of which the ultraviolet curing adhesive is applied, and the reflection mirrors 232 and 234 each of which the ultraviolet curing adhesive is not applied are respectively placed on the corresponding optical component positioning jigs 300 (step S320).

Figure 31:
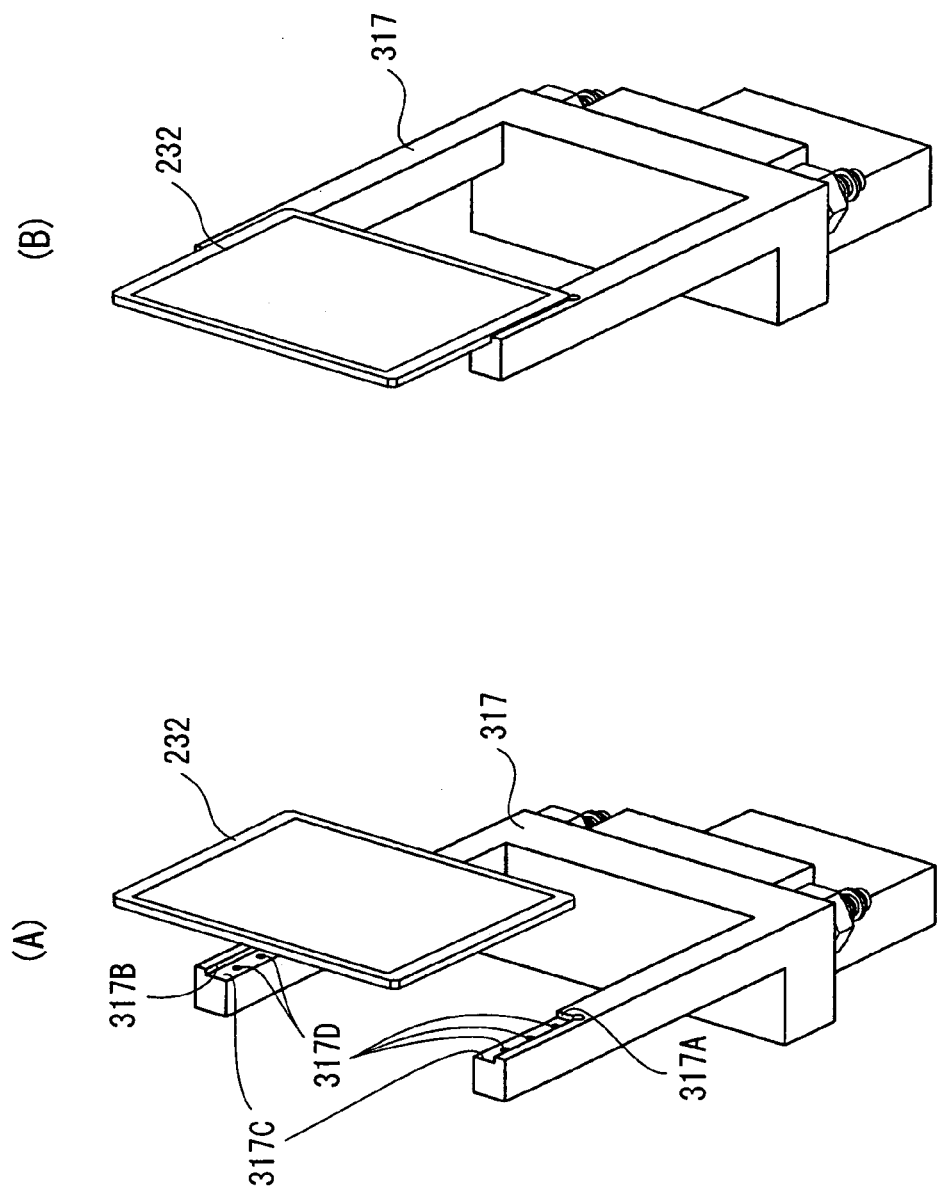
FIG. 31 is an illustration to explain a method for placing the optical component on the optical component positioning jig according to the aforesaid embodiment.

FIG. 31 is an illustration to explain a placing method of the optical component on the optical component positioning jig 300. FIG. 31 shows a placing method of the reflection mirror 232 on the first holder 317 of the first positioning jig 310. Other than the above, since the first lens array 212, the dichroic mirrors 221 and 222, the three field lenses 224, the incident-side lens 231 and the reflection mirror 234 can be placed on the optical component jigs 300 in the approximately same manner as the above, the description will be omitted.

Specifically, as shown in FIG. 31(A), the operator places the reflection mirror 232 on the first holder 317 so that the outer periphery of the reflection mirror 232 abuts on the corresponding first support face 317A, the second support face 317B and the third support face 317C of the first positioning jig 310. At this time, the operator operates the operating unit 610 of the manufacturing apparatus 100 to output the operation signal for driving the vacuum pump (not shown) to the controlling unit 630. Based upon the input of the operation signal, the controlling unit 630 drives the vacuum pump (not shown) for intake of air in the communication hole 317D of the first positioning jig 310. As shown in FIG. 31(B), the reflection mirror 232 then sticks to the third support face 317C of the first holder 317 to be held by the first holder 317.

In this state, the first lens array 212, the dichroic mirrors 221 and 222, the three field lenses 224, the incident-side lens 231 and the reflection mirrors 232 and 234 have been positioned on the designed predetermined positions on the container 25A. Further, the peripheries of the first lens array 212, the dichroic mirrors 221 and 222, the three field lenses 224 and the incident-side lens 231 abut on the support portions 251I, 251B and 251F (FIGS. 16 and 17) of the component housing 251 of the container 25A via the applied ultraviolet curing adhesive.

After the step S320, the ultraviolet curing adhesive is applied on the tip ends and the peripheries of the pins (not shown) of the third positioning member 253C. The pins (not shown) of the third positioning member 253C each of which the ultraviolet curing adhesive is applied are inserted to the holes 251C (FIGS. 17 and 18) formed on the lateral side of the container 25A so that the tip ends of the pins abut on the back side of the reflection face of the reflection mirrors 232 and 234 (step S330).

The step S330 is necessary only for the positioning operation of the reflection mirrors 232 and 234. The step S330 is unnecessary for other optical components 212, 221, 222, 224 and 231.

As described above, after positioning the optical components 212, 221, 222, 224, 231, 232 and 234 not requiring the adjustment, the ultraviolet curing adhesive is irradiated by ultraviolet ray so that the optical components 212, 221, 222, 224, 231, 232 and 234 are fixed on the container 25A (step S340).

More specifically, the operator operates the operating unit 610 of the manufacturing apparatus 100 to output the operation signal for driving the ultraviolet irradiator (not shown) to the controlling unit 630. Based upon the input of the operation signal, the controlling unit 630 drives the ultraviolet irradiator (not shown). The ultraviolet ray is irradiated from the upper side of the container 25A on the ultraviolet curing adhesive filled between the peripheries of the first lens array 212, the dichroic mirrors 221 and 222, the three field lenses 224 and the incident-side lens 231; and the respective support portions 251I, 251B and 251F (FIGS. 16 and 17) of the component housing 251 to cure the ultraviolet curing adhesive. Further, the ultraviolet ray is irradiated toward the third positioning members 253C from the lateral side of the container 25A. The irradiated ultraviolet ray passes through the plate body 253C1 (FIG. 15) and the pins (not shown) to cure the ultraviolet curing adhesive applied between the peripheries of the pins and the holes 251C as well as the one applied between the tip ends of the pins and the back sides of the reflection faces of the reflection mirrors 232 and 234. According to the above manner, the optical components 212, 221, 222, 224, 231, 232 and 234 not requiring the adjustment are fixed on the container 25A.

(2-5-2) Fixing Position of Optical Component Requiring Adjustment

Figure 32:
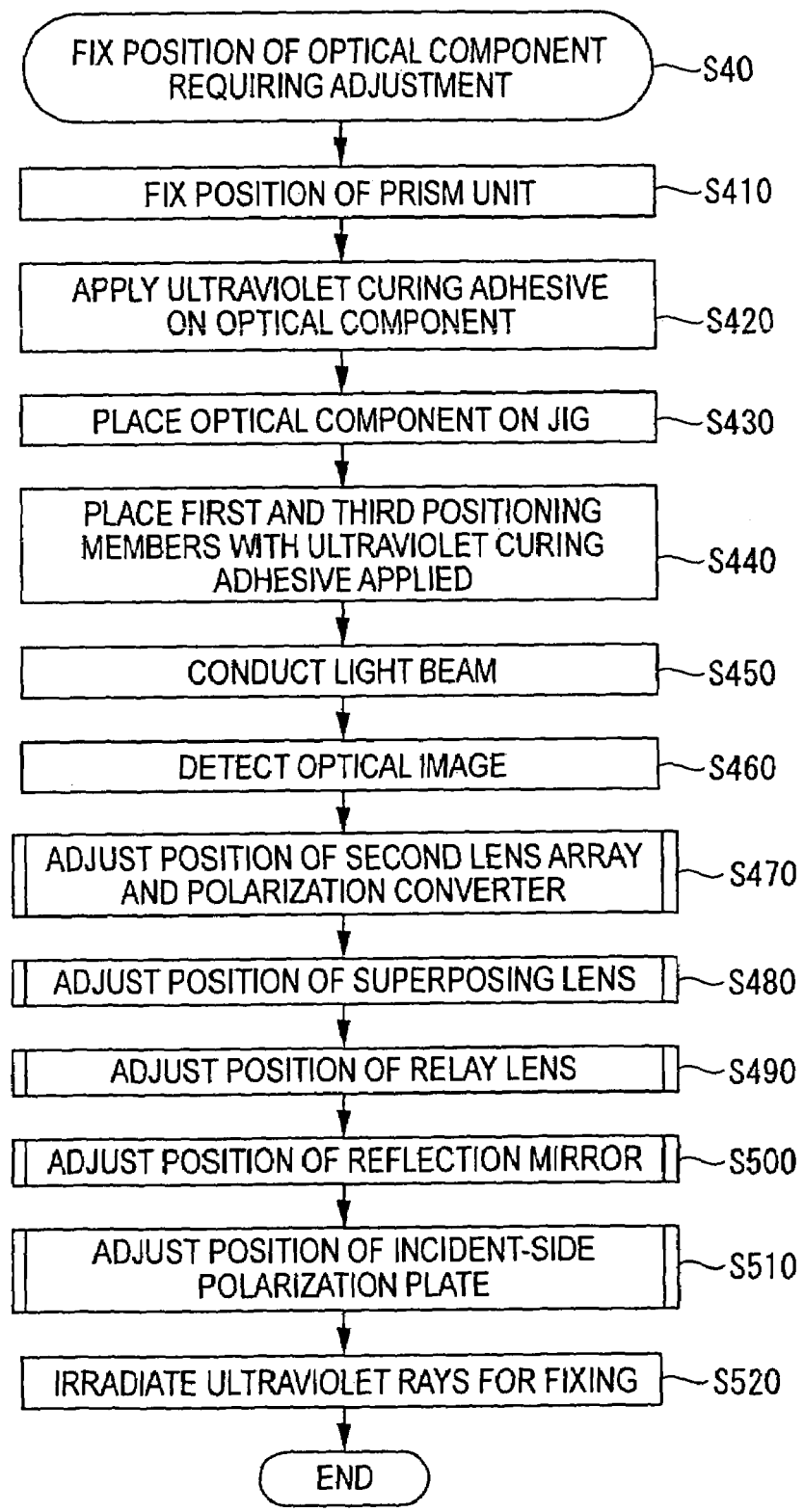
FIG. 32 is a flowchart explaining a manufacturing method of the optical unit according to the aforesaid embodiment.

After the step S30, the positions of the optical components 213 to 215, 223, 233 and 242 requiring the adjustment are fixed at the predetermined positions on the container 25A (step S40). In other words, the above procedure is performed according to a flowchart shown in FIG. 32.

Firstly, the operator fits the positioning projection formed on the mount to the positioning hole 251B formed on the bottom side of the container 25A to fix the position of the prism unit on the container 25A by way of a screw (not shown) (step S410).

After step S410, the operator applies the ultraviolet curing adhesive on the peripheries of the second lens array 213, the polarization converter 214 and the incident-side polarization plate 242 (step S420). The step S420 is necessary only for the second lens array 213, the polarization converter 214 and the incident-side polarization plate 242. The step S420 is unnecessary for the superposing lens 215, the reflection mirror 223 and the relay lens 233.

Then, the second lens array 213, the polarization converter 214 and the incident-side polarization plate 242 each of which the ultraviolet curing adhesive is applied, and the superposing lens 215, the relay lens 233 and the reflection mirror 223 each of which the ultraviolet curing adhesive is not applied are respectively placed on the corresponding optical component positioning jigs 300 (step S430) Further, the peripheries of the second lens array 213, the polarization converter 214 and the incident-side polarization plate 242 abut on the support portions 251B and 251F (FIGS. 16 and 17) of the component housing 251 on the container 25A via the applied ultraviolet curing adhesive. Since the placing method of the optical components 213 to 215, 233 and 242 to the optical component positioning jig 300 is the approximately same manner as the above-described step S320, the description will be omitted.

After the step S430, the ultraviolet curing adhesive is applied on the grooves (not shown) and the peripheries of the first positioning members 253A. Then, the first positioning members 253A with the ultraviolet curing adhesive being applied are inserted to the holes 251A formed on the lateral side of the container 25A so that the grooves (not shown) abut on the peripheries of the superposing lens 215 and the relay lens 233 at the left and right sides thereof. Further, in the same manner as the above-described step S330, the third positioning member 253C with the ultraviolet curing adhesive being applied is placed on the reflection mirror 223 (step S440). The step S440 is necessary only for the positioning operation of the superposing lens 215, the relay lens 233 and the reflection mirror 223. The step S440 is unnecessary for the second lens array 213, the polarization converter 214 and the incident-side polarization plate 242.

After the above-described operation, all of the optical components 212 to 215, 221 to 224, 231 to 234, 242 and the prism unit are placed on the designed predetermined positions of the container 25A (temporary positioning).

FIG. 33 shows the state that the container 25A, the various optical components of the optical systems 21, 22 and 23 excluding the light source device 211, and the prism unit have been placed on the manufacturing apparatus 100.

The operator operates the operating unit 610 of the control device 600 to call up a predetermined program for adjusting the positions of the optical components 213 to 215, 233 and 242. The control device 600 then reads out the predetermined program stored in the memory 634 to adjust the positions of the above optical components.

Firstly, the control device 600 operates a light source lamp of the adjustment light source device 500 to be lit so that light beam is conducted into the optical unit 2 (step S450). The control device 600 drives the optical image detecting device 400 to detect the optical image conducted into the optical unit 2 and formed by the liquid crystal panels 241R, 241G and 241B (step S460). When the optical image detecting device 400 detects the optical image, the image picked by the three CCDs 423R, 423G and 423B of the optical image detecting device 400 is separated into three colors of red, green and blue to output to the controlling unit 630 as R, G and B signals. The image capture 631 of the control device 600 inputs the three R, G and B signals and converts the R, G and B signals into the image signal to output to the image processor 632. The image processor 632 forms the picked image based on the input image signal.

Figure 34:
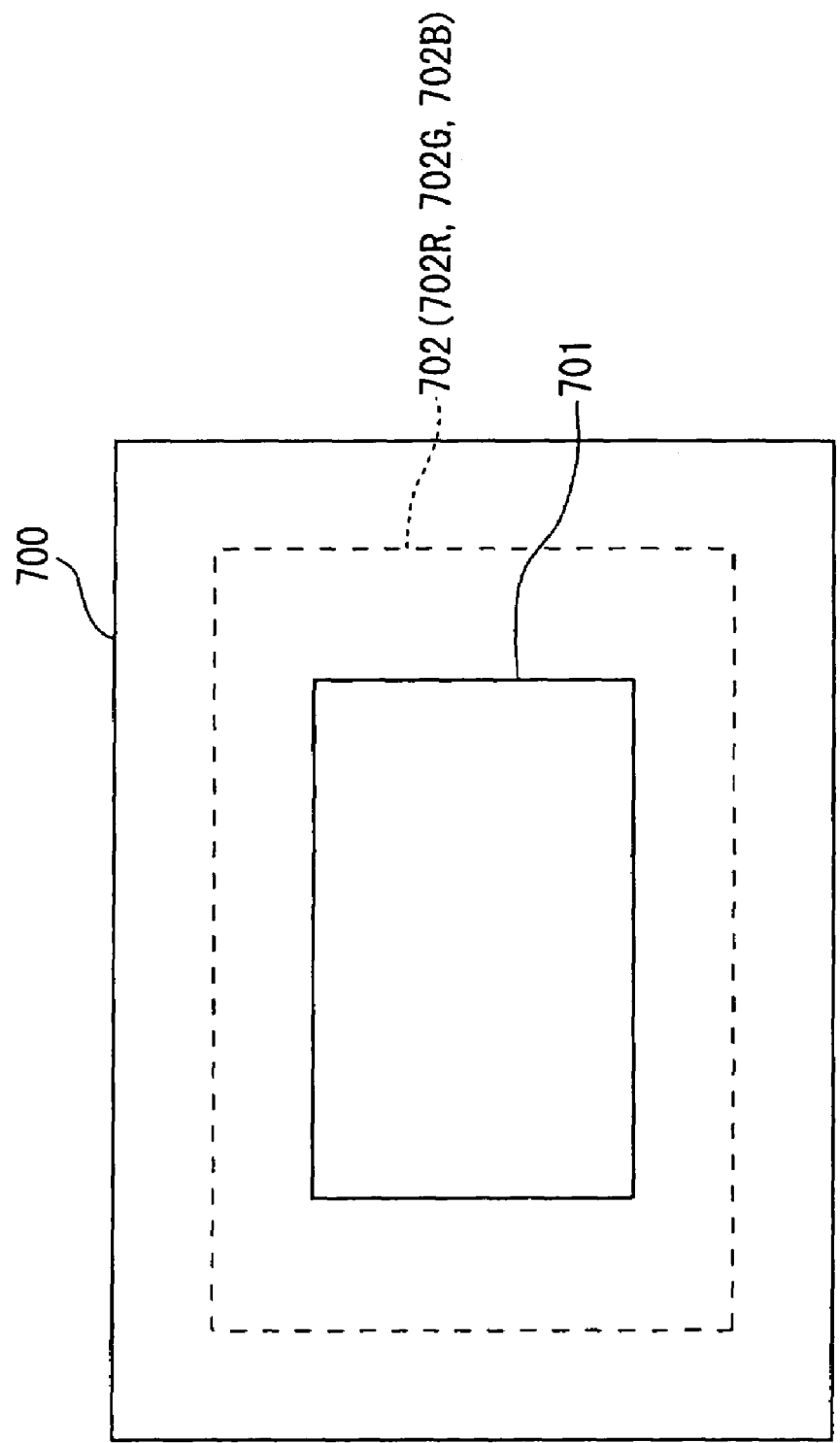
FIG. 34 is an illustration showing an example of an image captured by the control device, which is an optical image picked by the optical image detecting device, according to the aforesaid embodiment.

FIG. 34 is an illustration showing an example of the image captured by the control device 600, which is the optical image picked by the optical image detecting device 400. In FIG. 34, 700 denotes the picked image, 701 denotes an image formation area of the liquid crystal panels 241R, 241G and 241B, and 702 (702R, 702G and 702B) denotes each illumination area reached to the respective liquid crystal panels 241R, 241G and 241B through the optical components.

In fact, shade may be displayed on the respective illumination areas 702R, 702G and 702G shown in FIG. 34 or the illumination distribution of the illumination area 702 may be uneven. This is because the positions of the optical components 212 to 215, 223 and 233 are relatively deviated. Based on the picked image 700, the relative positions of the optical components 212 to 215, 223 and 233 are adjusted to the optimum positions below.

(i) Position Adjustment of Second Lens Array and Polarization Converter

Figure 35:
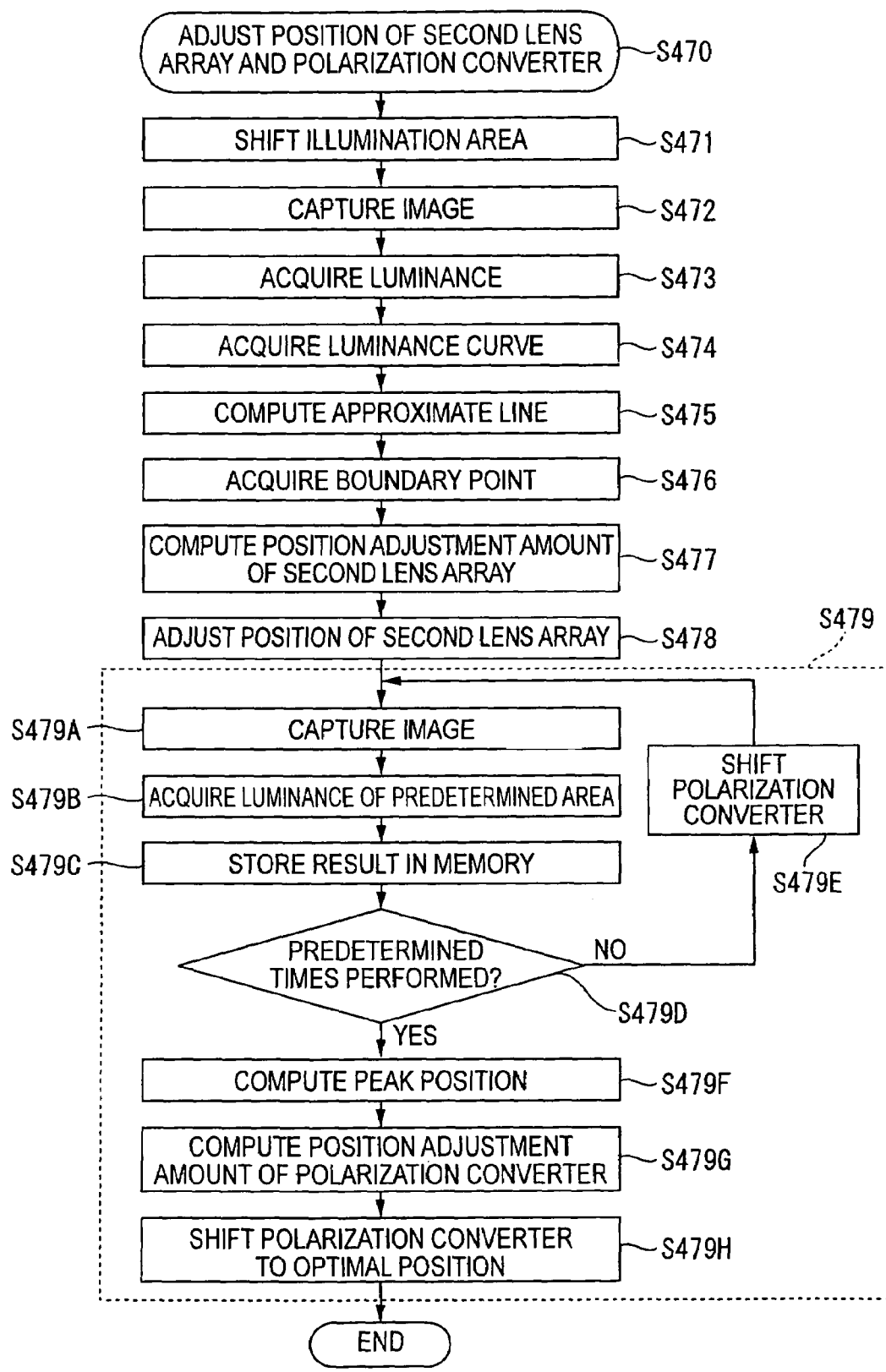
FIG. 35 is a flowchart explaining a manufacturing method of the optical unit according to the aforesaid embodiment.

After the step S460, the control device 600 adjusts the positions of the second lens array 213 and the polarization converter 214 based on the optical image picked by the CCD 423G (FIGS. 26 and 27) for green light (step S470). In other words, the above procedure is performed according to a flowchart shown in FIG. 35.

Firstly, the drive controller 633 of the control device 600 drives the jig driver 300A by outputting a predetermined control signal to the jig driver 300A. The pulse motors (not shown) are driven to shift the X-axis shifter 323 and the second holder 326 of the second positioning jig 320 for holding the superposing lens 215 for shifting the superposing lens 215 in X and Y directions only by a predetermined amount (step S471). At this time, on account of the surface tension of the ultraviolet curing adhesive, the first positioning members 253A suspending the superposing lens 215 follow when the superposing lens 215 shifts.

The image capture 631 of the controlling unit 630 inputs the G signal output from the CCD 423G for green light of the optical image detecting device 400 and converts the input signal into an image signal to output to the image processor 632 (step S472).

Figure 36:
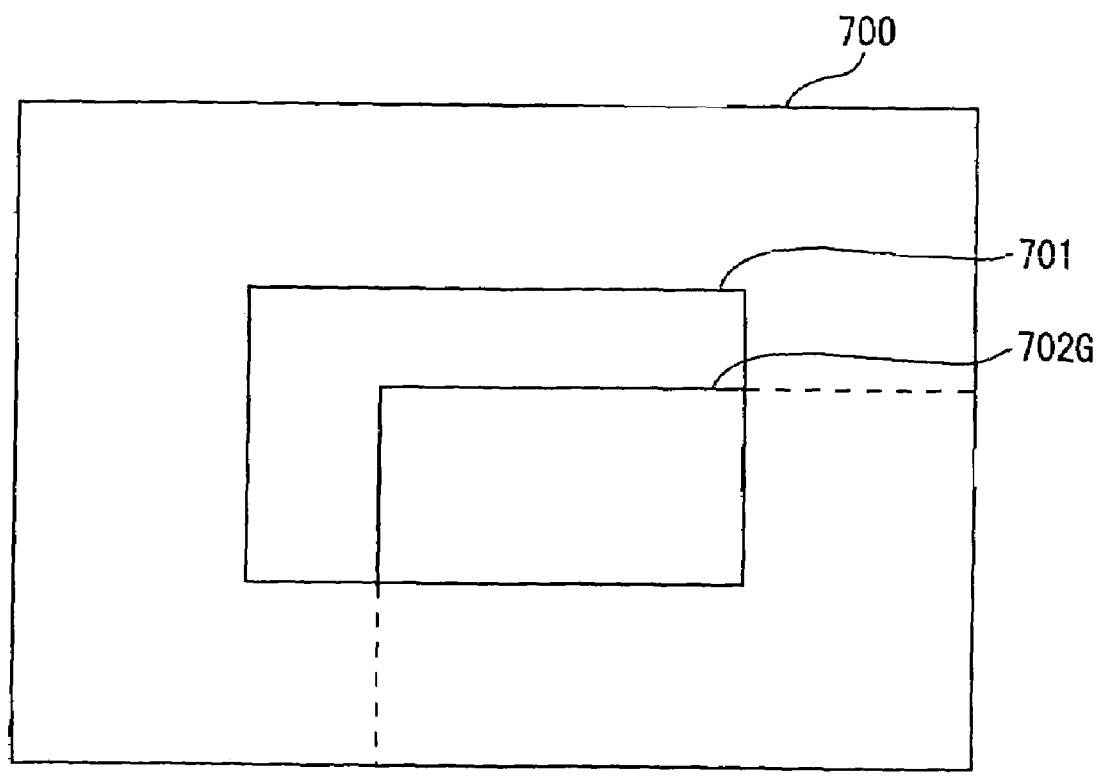
FIG. 36 is an illustration showing an example of an image captured by the control device, which is an optical image picked by the optical image detecting device, according to the aforesaid embodiment.

FIG. 36 is an illustration showing an example of the image captured by the control device 600, which is the optical image picked by the optical image detecting device 400.

In the step S471, as a result of that the superposing lens 215 is shifted in the X and Y directions only by the predetermined amount, the illumination area 702G shifts so that an upper left corner of the illumination area 702G is arranged inside the image formation area 701 as shown in FIG. 36.

Then, the luminance acquiring unit 632A of the control device 600 acquires the luminance value of the picked image 700 captured by the image capture 631 in the step S472 by dividing the luminance value into 256 gradations of 0 to 255 and relates the acquired luminance value to a coordinate value (plan position X and Y) corresponding to the luminance value to store in the memory 634 (step S473).

After the step S473, the luminance curve acquiring unit 632B of the control device 600 reads out the information stored in the memory 634 and acquires a luminance curve that represents variation of the luminance value on predetermined X-coordinate and Y-coordinate (step S474).

Specifically, FIG. 37 shows an example of an acquiring method of the luminance curve by the luminance curve acquiring unit 632B.

As shown in FIG. 37(A) for example, the luminance curve acquiring unit 632B reads out the luminance value (gradation) on a scan line 800X (800Y) of the predetermined X-coordinate (Y-coordinate) and a coordinate value corresponding to the luminance value from the memory 634. As shown in FIG. 37(B), the luminance curve acquiring unit 632B plots a vertical axis as a gradation of the corresponding luminance value and a horizontal axis as a coordinate value on the scan line 800X (800Y) to acquire a luminance curve 900X (900Y).

In FIG. 37(B), in order to simplify the description of the luminance curve 900X (900Y), there is a luminance curve 900X (900Y) extending from a position XB (YB) of the FIG. 37(A) as a base point to the front of the right end (lower end) of the image formation area 701.

As shown in FIG. 37(B), the luminance curve 900X (900Y) is acquired as a crank-shape or an S-shape extending from the outside of the illumination area 702G to the inside thereof at the boundary of the illumination area 702G. Though not shown in FIG. 37(B), a luminance curve acquired from the range between the XA (YA) and XB (YB) in FIG. 37(A) and a luminance curve acquired from the range between the inside of the image formation area 701 and the outside thereof in FIG. 37(A) are also crank-shaped at the boundary of the image formation area 701.

After the step S474, the approximate line computing unit 632C of the control device 600 approximates the variation part of the luminance value in the luminance curve 900X or 900Y acquired by the luminance curve acquiring unit 632B as a line to compute the approximate line (step S475).

Figure 38:
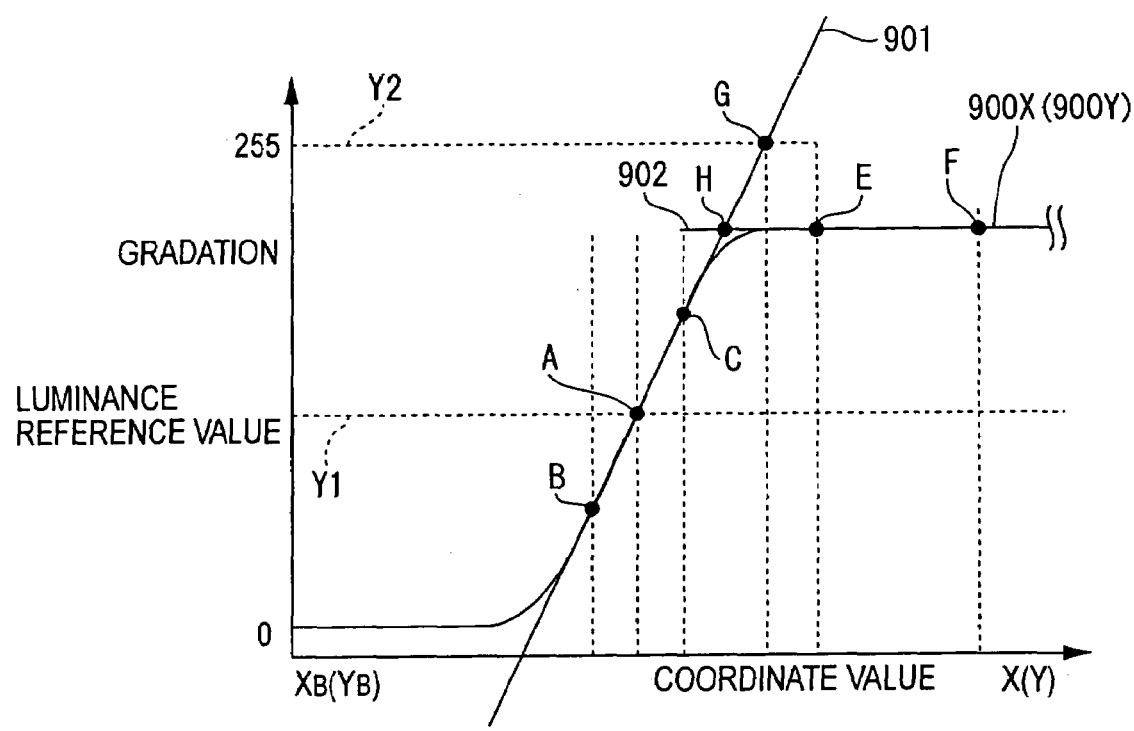
FIG. 38 is an illustration showing a part of the luminance curve in an enlarged manner according to the aforesaid embodiment.

FIG. 38 is an illustration in which a part of the luminance curve 900X (900Y) of FIG. 37(B) is enlarged Specifically, FIG. 38 is an example of a computing method of the approximate line by the approximate line computing unit 632C and also an example of an acquiring method of the boundary point by the boundary point acquiring unit 632D.

As shown in FIG. 38 for instance, the approximate line computing unit 632C acquires a coordinate of an intersection point A defined by a luminance reference line Y1 representing a luminance reference value which is a predetermined reference and the luminance curve 900X (900Y). Further, the approximate line computing unit 632C acquires points B and C respectively spaced apart forward and backward from the intersection point A only by a predetermined coordinate X (Y) on the luminance curve 900X (900Y). The approximates line computing unit 632C then approximate the variation part of the luminance value between the acquired points B and C as a line to compute a variation approximate line 901.

Incidentally, in FIG. 38 as well as FIG. 37(B), there is a luminance curve 900X (900Y) extending from a position XB (YB) of the FIG. 37(A) as a base point to the front of the right end (lower end) of the image formation area 701. A luminance curve acquired from the range between the XA (YA) and XB (YB) of FIG. 37(A) and an approximate line of a luminace curve acquired from the range between the inside of the image formation area 701 and the outside thereof in FIG. 37(A) are computed in the same manner.

After the step S475, the boundary point acquiring unit 632D of the control device 600 acquires the boundary point of the illumination area 702G and the boundary point of the image formation area 701 (step S476). The boundary point acquiring unit 632D stores the acquired boundary points in the memory 634.

The boundary point acquiring unit 632D acquires an intersection point G defined by the variation approximate line 901 computed in the step S483 and a 255 gradation line Y2. Further, the boundary point acquiring unit 632D acquires a point E as a reference on the illumination area 702G at the coordinate shifted from the acquired intersection point G toward the center of the illumination area 702G only by a predetermined coordinate value X (or a predetermined coordinate value Y when acquiring the boundary point in the Y direction). Further, the boundary point acquiring unit 632D acquires a point F on the illumination area 702G as the approximate center of the picked image 700. Furthermore, the boundary point acquiring unit 632D approximates the illumination area 702G between the acquired points E and F to compute an illumination area approximate line 902. The boundary point acquiring unit 632D acquires an intersection point H defined by the variation approximate line 901 computed in the step S483 and the computed illumination area approximate line 902. The acquired intersection point H represents the boundary point (in the X or Y direction) of the illumination area 702G.

Note that, in the image formation area 701, boundary points of a left end and an upper end are acquired as the boundary points, and boundary points of a right end and a lower end are acquired as other boundary points after shifting the superposing lens 215. When the boundary points of the image formation area 701 are acquired, the use of a gradation line lower than the 255 gradation line Y2 for acquiring the intersection point G is only a matter different from that for acquiring the above-described intersection point H of the illumination area. Other than the above difference, since the intersection point G can be acquired in the same manner as the boundary point H of the illumination area, the description thereof will be omitted.

Further, though the steps S473 to S476 are performed for acquiring the boundary points of the image formation area 701, a designed position of the image formation area 701 can be set in advance, or boundary points of the image formation area 701 can be set in advance. With this arrangement, the steps S473 to S476 related to the image formation area 701 can be omitted.

After the step S476, the arithmetic unit 632E of the control device 600 reads out the boundary points of the illumination area 702G stored in the memory 634 to compute a position adjustment amount of the second lens array 213 based on the read boundary points (step S477). The arithmetic unit 632E stores the computed position adjustment amount in the memory 634. Specifically, the arithmetic unit 632E computes the position adjustment amount as follows for example.

The arithmetic unit 632E compares the read boundary points in the X and Y directions and the designed optimum boundary positions in the X and Y directions to compute a deviation in the X and Y directions relative to the designed optimum boundary positions. The deviation is occurred between the boundary points computed in the step S476 and the designed optimum boundary positions, because the second lens array 213 is deviated from the predetermined position relative to the first lens array 212. In other words, the computed deviations in the X and Y directions respectively correspond to an X-direction position adjustment amount and a Y-direction position adjustment amount of the second lens array 213.

After the step S477, the drive controller 633 reads out the X-direction position adjustment amount and the Y-direction position adjustment amount of the second lens array 213 stored in the memory 634 to output a control signal to the jig driver 300A for shifting the second lens array 213 only by the read position adjustment amounts in the X and Y directions. Based upon the input control signal, the jig driver 300A drives the pulse motors (not shown) to shift the X-axis shifter 323 and the second holder 326 of the second positioning jig 320 holding the second lens array 213 so that the second lens array 213 is shifted in the X and Y directions only by the position adjustment amounts computed in the step S485 (step S478).

Next, the controlling unit 630 of the control device 600 adjusts the position of the polarization converter 214 as follows (step S479).

The image capture 631 of the controlling unit 630 inputs the G signal output from the CCD 423G (FIGS. 26 and 27) for green light of the optical image detecting device 400 and converts the input signal into an image signal to output to the image processor 632 (step S479A).

Figure 39:
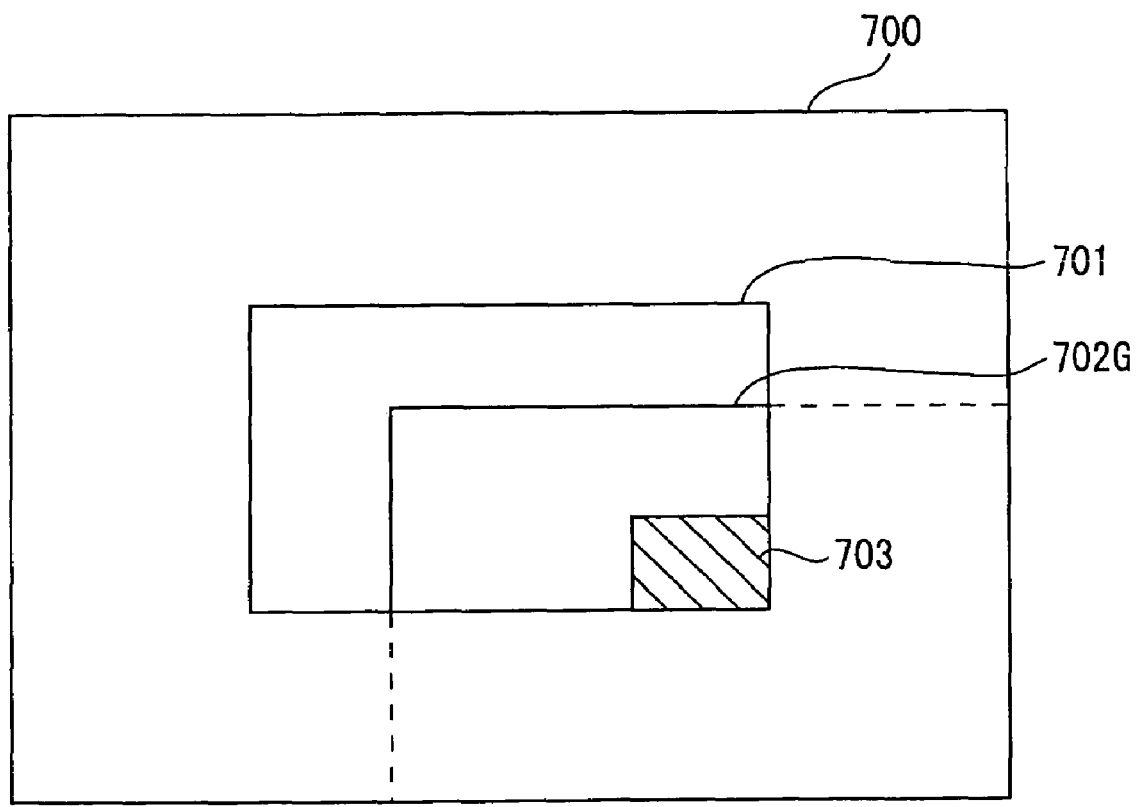
FIG. 39 is an illustration showing an example of an image captured by the control device, which is an optical image picked by the optical image detecting device, according to the aforesaid embodiment.

FIG. 39 is an illustration showing an example of the image captured by the control device 600, which is the optical image picked by the optical image detecting device 400.

Then, the luminance acquiring unit 632A of the control device 600 acquires a luminance value in a predetermined area 703 as shown in FIG. 39 in the picked image 700 captured by the image capture 631 in the step S479A (step S479B). The luminance acquiring unit 632A stores the acquired luminance value in the memory 634.

After the step S479B, the arithmetic unit 632E reads out the luminance value stored in the memory 634, equalizes and relates the luminance value to the position of the X-axis shifter 313 of the first positioning jig 310 holding the polarization converter 214 in the X direction to store in the memory 634 (step S479C).

The controlling unit 630 of the control device 600 determines where the above steps S479A to S479C are performed for a predetermined number of times according to the luminance value stored in the memory 634 (step S479D). If the controlling unit 630 determines "No", the drive controller 633 of the controlling unit 630 drives the jig driver 300A by outputting a predetermined control signal to the jig driver 300A. The pulse motor (not shown) is then driven to shift the X-axis shifter 313 of the first positioning jig 310 so that the polarization converter 214 is shifted in the X-axis direction by a predetermined amount (step S479E). Then, the above steps S479A to S479C are performed again.

As described above, the controlling unit 630 controls the jig driver 300A to shift the X-axis shifter 313 of the first positioning jig 310 holding the polarization converter 214 for shifting the polarization converter 214 by a predetermined amount in the X-axis direction so that the operation of acquiring the luminance value in the predetermined area 703 is repeated for the predetermined number of times.

Figure 40:
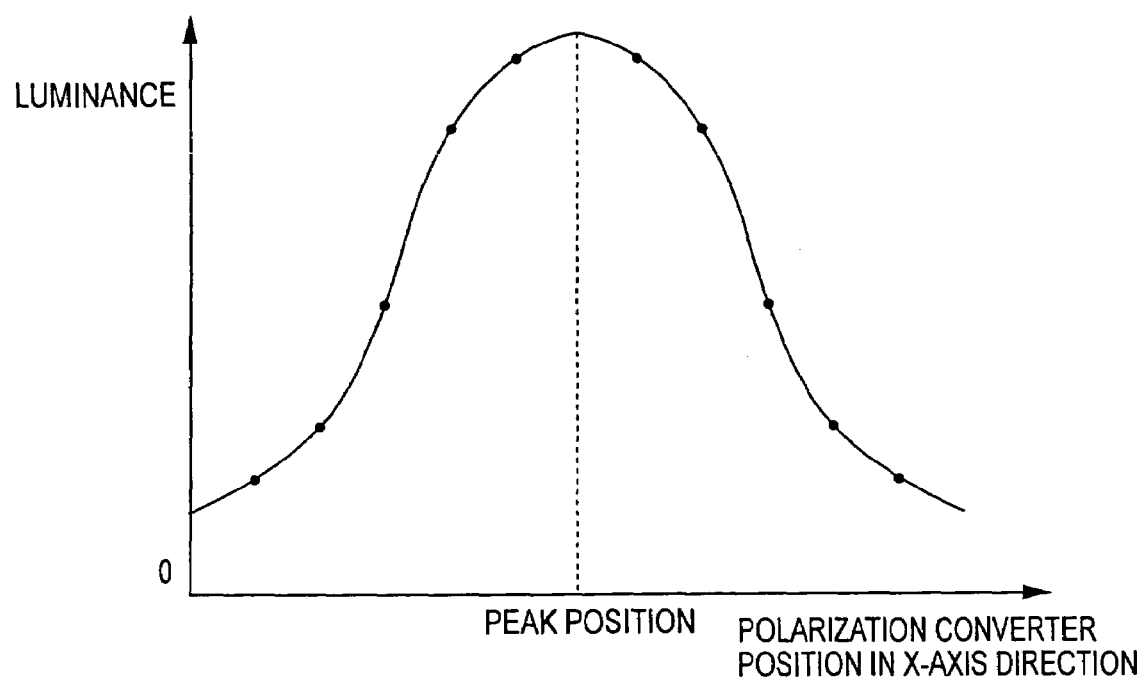
FIG. 40 is an illustration to explain a manufacturing method of the optical unit according to the aforesaid embodiment.

According to such operation, as shown in FIG. 40, a relationship between the position of the polarization converter 214 in the X-axis direction and the luminance value can be acquired.

On the other hand, when the controlling unit 630 determines "Yes" in the step S479D, or the above operation has been performed for the predetermined number of times, the arithmetic unit 632E of the controlling unit 630 reads out the luminance value corresponding to the position of the polarization converter 214 in the X-axis direction stored in the memory 634 to compute a peak position of the luminance value relative to the position of the polarization converter 214 in the X-axis direction (step S479F). In other words, the computed peak position represents the optimum position of the polarization converter 214 relative to the first lens array 212 and the second lens array 213.

After the step S479F, the arithmetic unit 632E computes a deviation between the current position of the X-axis shifter 313 of the first positioning jig 310 holding the polarization converter 214 in the X-axis direction and the computed peak position (step S479G). The deviation is then stored in the memory 634. The computed deviation corresponds to a position adjustment amount of the polarization converter 214.

After the step S479G, the drive controller 633 drives the jig driver 300A by outputting a predetermined control signal to the jig driver 300A based on the deviation stored in the memory 634. The pulse motor (not shown) is then driven to shift the X-axis shifter 313 of the first positioning jig 310 holding the polarization converter 214 so that the polarization converter 214 is shifted to the optimum position (step S479H).

By performing the above step S470, the illumination distribution of the illumination area 702 is equalized.

(ii) Position Adjustment of Superposing Lens

Figure 41:
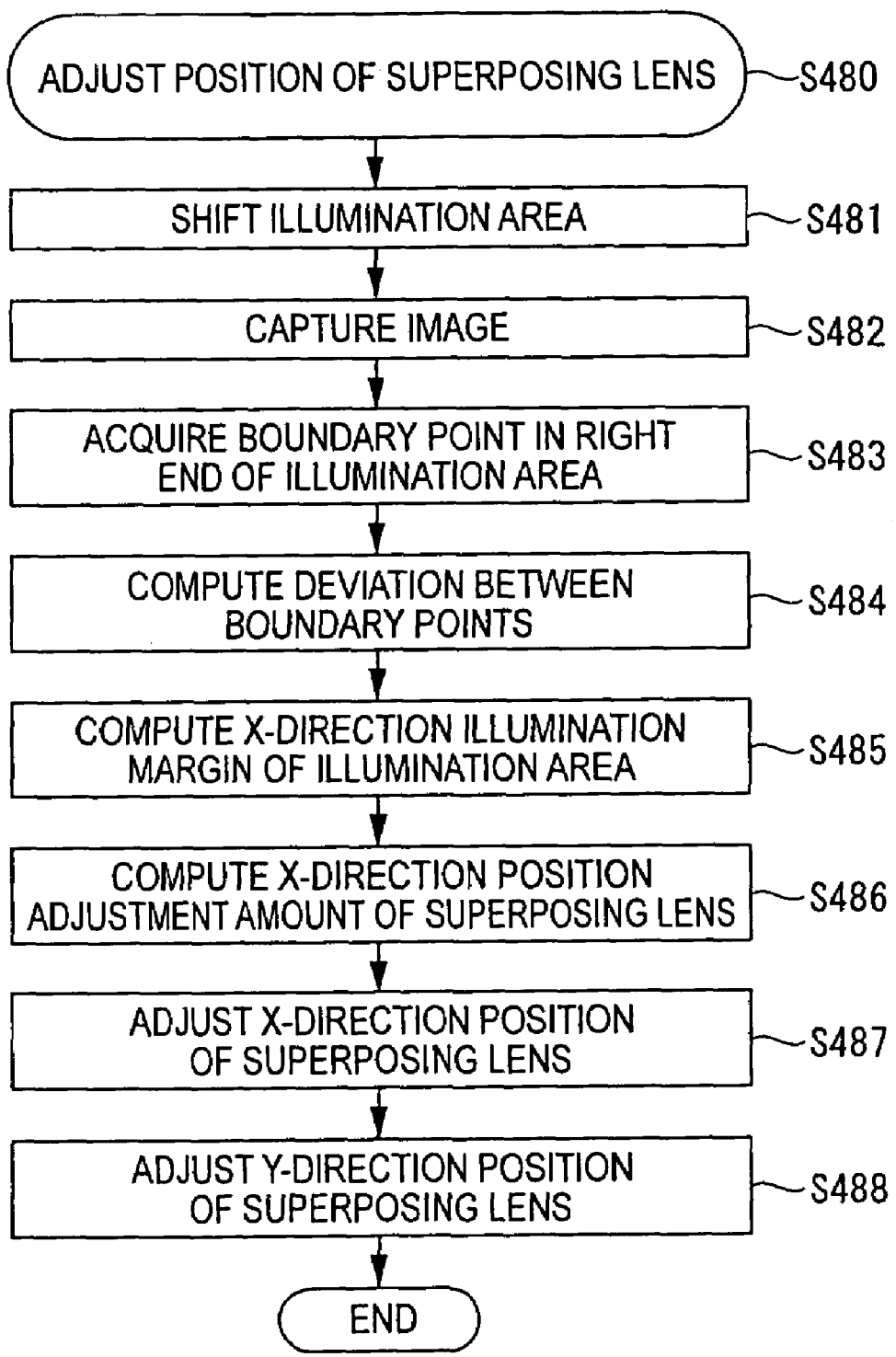
FIG. 41 is a flowchart explaining a manufacturing method of the optical unit according to the aforesaid embodiment.

In the step S470, after adjusting the positions of the second lens array 213 and the polarization converter 214, the control device 600 adjusts the position of the superposing lens 215 based on the optical image picked by the CCD 423G (FIGS. 26 and 27) for green light (step S480). In other words, the above procedure is performed according to a flowchart shown in FIG. 41.

Firstly, the drive controller 633 of the control device 600 drives the jig driver 300A by outputting a predetermined control signal to the jig driver 300A. The pulse motor (not shown) is then driven to shift the X-axis shifter 323 of the second positioning jig 320 holding the superposing lens 215 so that the superposing lens 215 is shifted in the X direction by a predetermined amount XG1 (refer to FIG. 42(A)) (step S481).

The image capture 631 of the controlling unit 630 inputs the G signal output from the CCD 423G for green light of the optical image detecting device 400 and converts the input signal into an image signal to output to the image processor 632 (step S482).

Figure 42:
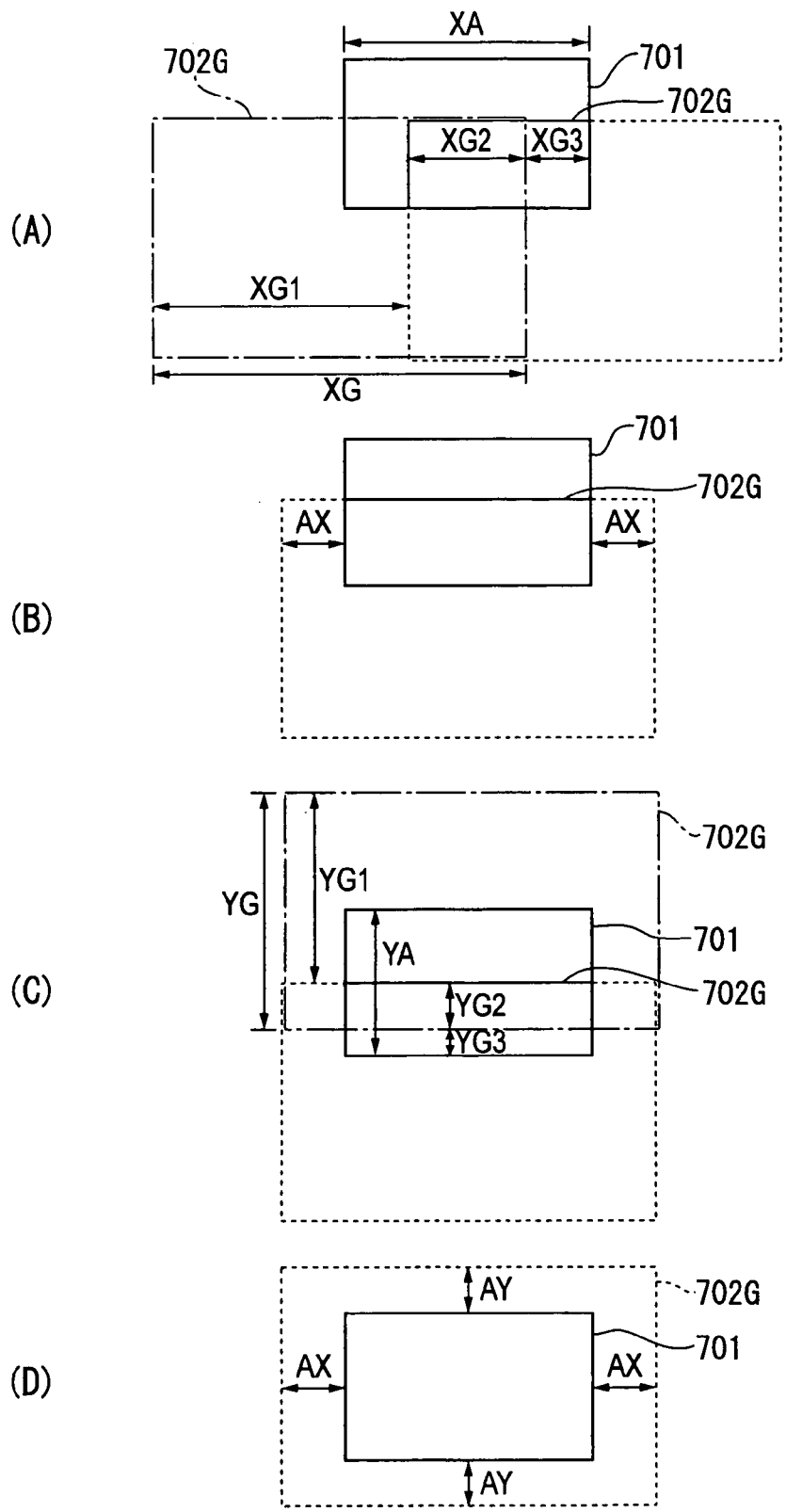
FIG. 42 is an illustration showing an example of an image captured by the control device, which is an optical image picked by the optical image detecting device, according to the aforesaid embodiment.

FIG. 42 is an illustration showing an example of the image captured by the control device 600, which is the optical image picked by the optical image detecting device 400.

In the step S481, as a result of that the superposing lens 215 is shifted in the X direction only by the predetermined amount XG1, the illumination area 702G shifts so that a right end of the illumination area 702G is arranged inside the image formation area 701 as shown by a chained line in FIG. 42(A).

The controlling unit 630 of the control device 600 acquires a boundary point at the right end of the illumination area 702G in the approximately same manner as the above-described steps S472 to S475 (step S483). The acquired boundary point is then stored in the memory 634.

After the step S483, the arithmetic unit 632E of the control device 600 computes a deviation XG2 between the boundary point acquired in the step S483 and stored in the memory 634, and the designed optimum boundary position set in advance (step S484). Incidentally, in the step S477, since the position of the second lens array 213 has been adjusted, the boundary point at the left end of the illumination area 702G shown by a solid or a broken line in FIG. 42(A) is positioned on the designed optimum boundary position set in advance.

After the step S484, the arithmetic unit 632E computes a width XG of the illumination area 702G in the X direction as shown in FIG. 42(A) based on the shift amount XG1 of the superposing lens 215 in the step S481 and the deviation XG2 in the step S484. Further, the arithmetic unit 632E reads out the respective boundary points at the left and right ends of the image formation area 701 stored in the memory 634 to compute the deviation XA (FIG. 42(A)) between the boundary points. The deviation XA corresponds to the width of the image formation area 701 in the X direction. The arithmetic unit 632E then computes illumination margins AX (FIG. 42(B)) of the illumination area 702G in the X direction based on the computed width XG of the illumination area 702G and the width XA of the image formation area 701 (step S485). Specifically, the arithmetic unit 632E subtracts the width XA of the image formation area 701 from the width XG of the illumination area 702G, and then divides the subtracted value by two to compute the illumination margins AX (FIG. 42(B)). That is, the left and right illumination margins AX of the illumination area 702G are the same.

In the step S485, after computing the illumination margins AX, the arithmetic unit 632E reads out the boundary point at the right end of the illumination area 702G and the boundary point at the right end of the image formation area 701 stored in the memory 634. Further, the arithmetic unit 632E computes a deviation XG3 (FIG. 42(A)) between the respective read boundary points to compute a position adjustment amount of the superposing lens 215 in the X direction based on the computed deviation XG3 and the illumination margins AX computed in the step S485 (step S486). The arithmetic unit 632E then stores the computed position adjustment amount in the X direction in the memory 634.

The drive controller 633 of the control device 600 reads out the position adjustment amount of the superposing lens 215 in the X direction stored in the memory 634 to output a control signal corresponding to the read position adjustment amount to the jig driver 300A. Then, the jig driver 300A drives the pulse motor (not shown) to shift the X-axis shifter 323 of the second positioning jig 320 holding the superposing lens 215 so that the superposing lens 215 is shifted in the X direction only by the position adjustment amount computed by the arithmetic unit 632E (step S487). In this state, as shown in FIG. 42(B), the left and right illumination margins of the illumination area 702G are the same.

As described above, after adjusting the position of the superposing lens 215 in the X direction, the position of the superposing lens 215 in the Y direction is adjusted (step S488).

The position of the superposing lens 215 in the Y direction can be adjusted in the approximately same manner as the process (the steps S481 to S487) for the above position adjustment in the X direction.

Specifically, referring to FIGS. 42(C) and (D), the superposing lens 215 is shifted in the Y direction only by a predetermined amount YG1 so that the lower end of the illumination area 702G is arranged inside the image formation area 701 in the same manner as the above-described step S481.

Further, a boundary point at the lower end of the illumination area 702G is acquired to compute a deviation YG2 between the acquired boundary point and the designed optimum boundary position set in advance in the same manner as the above-described steps S482 to S484.

Further, a width YG of the illumination area 702G in the Y direction based on the shift amount YG1 of the superposing lens 215 and the deviation YG2, and also a width YA of the image formation area 701 in the Y direction based on the respective boundary points at the lower end and the upper end of the image formation area 701 in the same manner as the above-described step S485. Then, illumination margins AY of the illumination area 702G in the Y direction are computed based on the computed width YG of the illumination area 702G and the width YA of the image formation area 701.

Furthermore, a position adjustment amount of the superposing lens 215 in the Y direction is computed based on a deviation YG3 between the boundary point at the lower end of the illumination area 702G and the boundary point at the lower end of the image formation area 701, and the illumination margins AY in the same manner as the above-described step S486.

The position of the superposing lens 215 is then adjusted in the Y direction based on the computed position adjustment amount in the Y direction in the same manner as the above-described step S487.

In this state, as shown in FIG. 42(D), the left and right illumination margins AX of the illumination area 702G are the same while the upper and lower illumination margins AY of the illumination area 702G are the same.

(iii) Position Adjustment of Relay Lens

Figure 43:
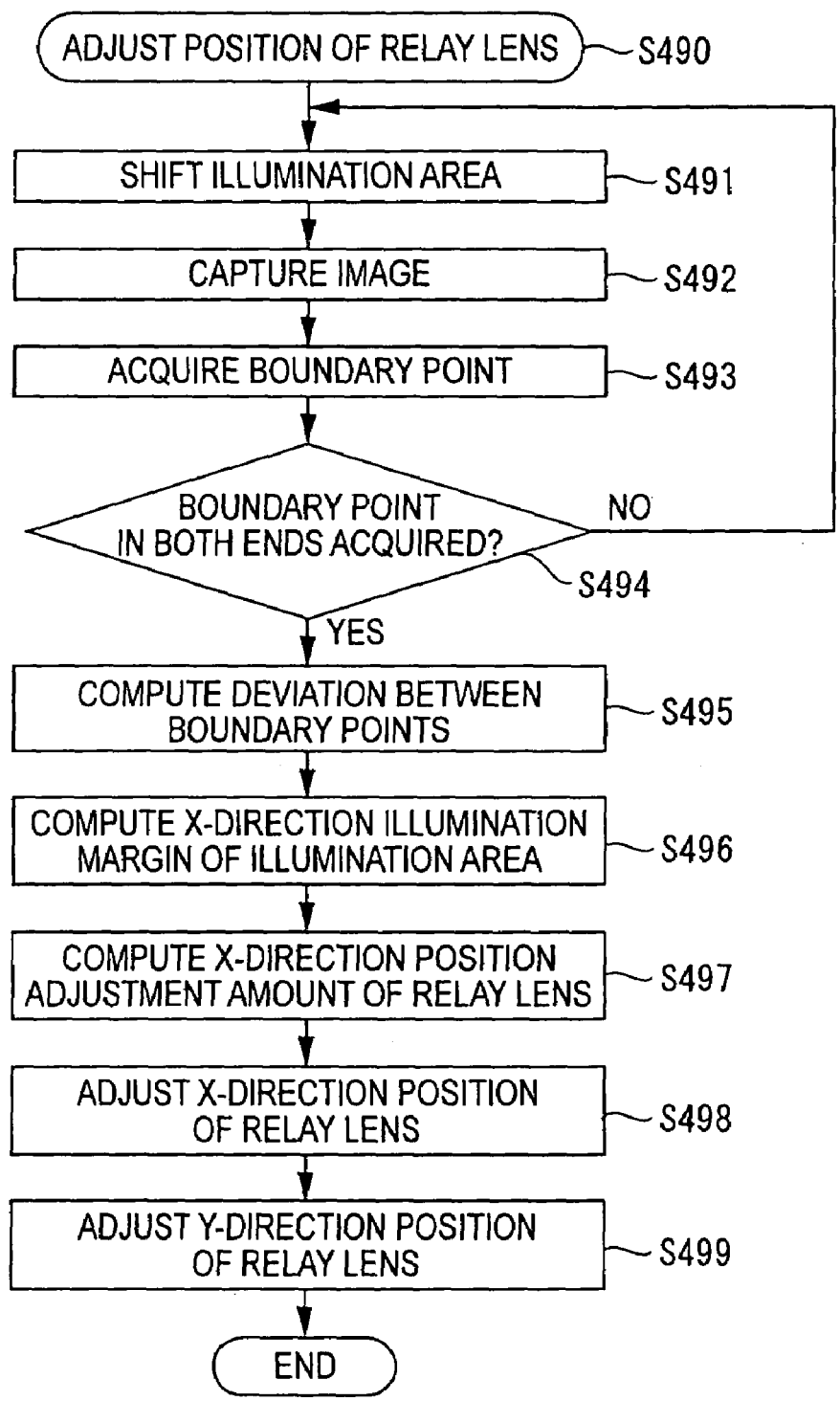
FIG. 43 is a flowchart explaining a manufacturing method of the optical unit according to the aforesaid embodiment.

In the step S480, after adjusting the position of the superposing lens 215, the control device 600 adjusts the position of the relay lens 233 based on the optical image picked by the CCD 423B for blue light so that the illumination area of the blue light is positioned at a predetermined position relative to the image formation area of the liquid crystal panel 241B (step S490). In other words, the above procedure is performed according to a flowchart shown in FIG. 43.

Firstly, the drive controller 633 of the control device 600 drives the jig driver 300A by outputting a predetermined control signal to the jig driver 300A. The pulse motor (not shown) is driven to shift the X-axis shifter 323 of the second positioning jig 620 holding the relay lens 233 so that the relay lens 233 is shifted in the X direction only by a predetermined amount XB1 (refer to FIG. 44(A)) (step S491). On account of the surface tension of the ultraviolet curing adhesive, the first positioning members 253A suspending the relay lens 233 follow when the relay lens 233 shifts The image capture 631 of the controlling unit 630 inputs the B signal output from the CCD 423B for blue light of the optical image detecting device 400 and converts the input signal into an image signal to output to the image processor 632 (step S492).

Figure 44:
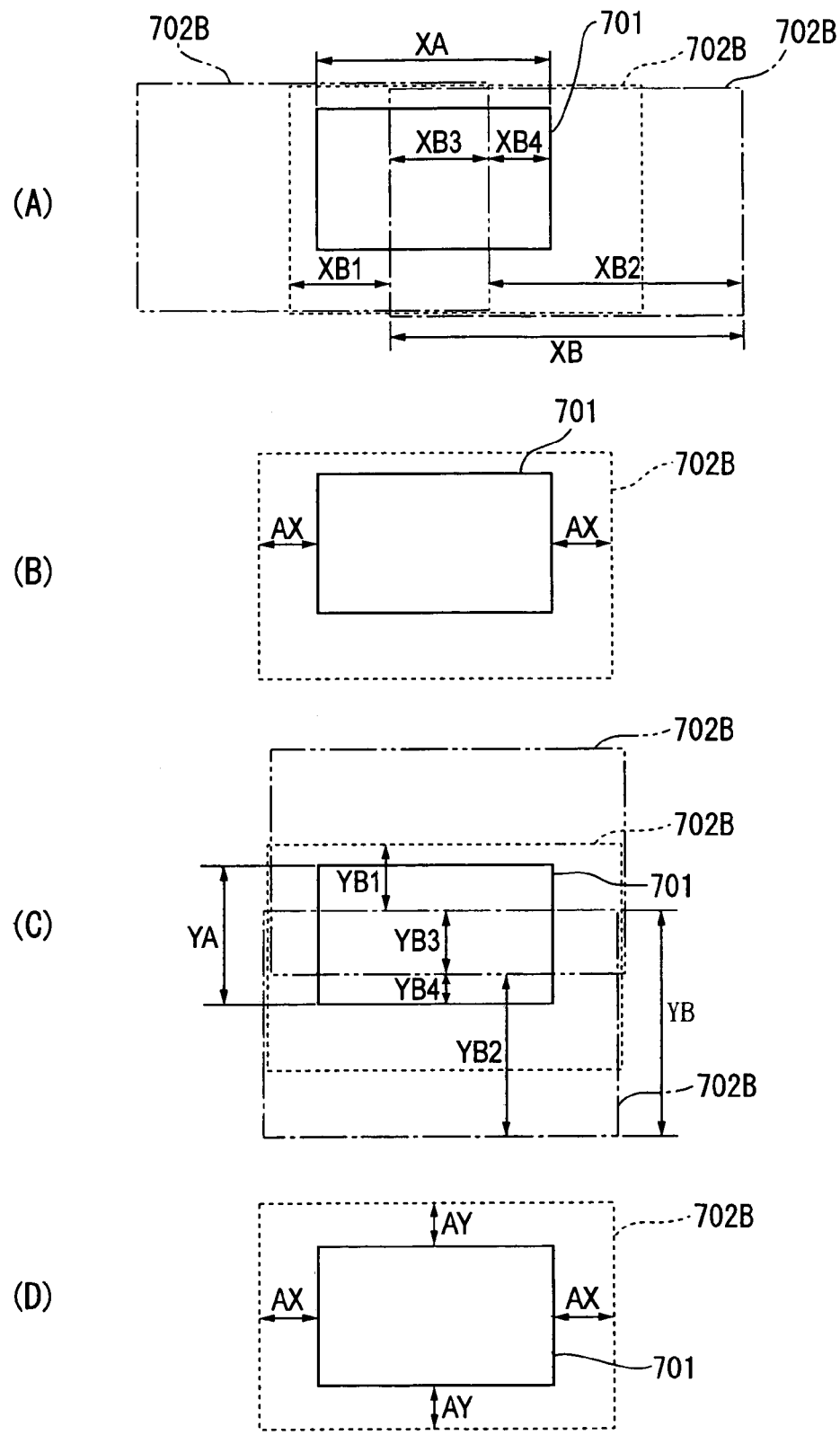
FIG. 44 is an illustration showing an example of an image captured by the control device, which is an optical image picked by the optical image detecting device, according to the aforesaid embodiment.

FIG. 44 is an illustration showing an example of the image captured by the control device 600, which is the optical image picked by the optical image detecting device 400.

In the step S491, as a result of that the relay lens 233 is shifted in the X direction only by the predetermined amount XB1, the illumination area 702B shifts so that a left end of the illumination area 702B is arranged inside the image formation area 701 as shown by a chained line in FIG. 44(A).

Then, the controlling unit 630 of the control device 600 acquires a boundary point at the left end of the illumination area 702B in the approximately same manner as the above-described steps S472 to S475 (step S493). The acquired boundary point is then stored in the memory 634.

After the step S493, the controlling unit 630 of the control device 600 determines whether or not boundary points at both sides of the illumination area 702B are acquired based on the information stored in the memory 634 (step S494).

In the step S494, when the controlling unit 630 determines "No", or determines that a boundary point at only one end of the illumination area 702B is acquired, the step returns to the step S491 so that the drive controller 633 of the control unit 600 shifts the X-axis shifter 323 of the second positioning jig 620 holding the relay lens 233 in a direction opposite to the above shifting direction to shift the relay lens 233 in the X direction only by a predetermined amount XB2 (FIG. 44(A)).

In the step S492, as described above, the image capture 631 of the controlling unit 630 then captures the image picked by the optical image detecting device 400.

As a result of that the relay lens 233 is shifted in the X direction only by the predetermined amount XB2, the illumination area 702B shifts so that a right end of the illumination area 702B is arranged inside the image formation area 701 as shown by a chain double-dashed line in FIG. 44(A).

In the step S493, as described above, the controlling unit 630 of the control device 600 acquires a boundary point at the right end of the illumination area 702B to store the acquired boundary point in the memory 634.

On the other hand, in the step S494, when the controlling unit 630 determines "Yes", or determines that the boundary points at the both (left and right) ends of the illumination area 702B are acquired, the arithmetic unit 632E reads out the boundary points at the left and right ends of the illumination area 702B stored in the memory 634 to compute a deviation XB3 between the above boundary points (step S495).

After the step S495, the arithmetic unit 632E computes a width XB of the illumination area 702B in the X direction as shown in FIG. 44(A) based on the shift amount XB2 of the relay lens 233 in the step S491 and the deviation XB3 computed in the step S495. Further, the arithmetic unit 632E reads out the respective boundary points at the left and right ends of the image formation area 701 stored in the memory 634 to compute the deviation XA (FIG. 44(A)) between the boundary points. The deviation XA corresponds to the width of the image formation area 701 in the X direction. The arithmetic unit 632E then computes illumination margins AX (FIG. 44(B)) of the illumination area 702B in the X direction based on the computed width XB of the illumination area 702B and the width XA of the image formation area 701 in the same manner as the above-described step S485 (step S496).

In the step S496, after computing the illumination margins AX, the arithmetic unit 632E reads out the boundary point at the right end of the illumination area 702B and the boundary point at the right end of the image formation area 701 stored in the memory 634. Further, the arithmetic unit 632E computes a deviation XB4 (FIG. 44(A)) between the respective read boundary points to further compute a position adjustment amount of the relay lens 233 in the X direction based on the computed deviation XB4 and the illumination margins AX computed in the step S496 (step S497). The arithmetic unit 632E then stores the computed position adjustment amount in the X direction in the memory 634.

After the step S497, the drive controller 633 of the control device 600 reads out the position adjustment amount of the relay lens 233 in the X direction stored in the memory 634 to output a control signal corresponding to the read position adjustment amount to the jig driver 300A. Then, the jig driver 300A drives the pulse motor (not shown) to shift the X-axis shifter 323 of the second positioning jig 320 holding the relay lens 233 so that the relay lens 233 is shifted in the X direction only by the position adjustment amount computed by the arithmetic unit 632E (step S498). In this state, as shown in FIG. 44(B), the left and right illumination margins AX of the illumination area 702B are the same.

As described above, after adjusting the position of the relay lens 233 in the X direction, the position of the relay lens 233 in the Y direction is adjusted (step S499). The position of the relay lens 233 in the Y direction can be adjusted in the approximately same manner as the above process (steps S491 to S498) for the position adjustment in the X direction.

Specifically, referring to FIGS. 44(C) and (D), the relay lens 233 is shifted in the Y direction only by a predetermined amount YB1 so that an upper end of the illumination area 702B is arranged inside the image formation area 701 to acquire a boundary point at the upper end of the illumination area 702B in the same manner as the above-described steps S491 to S494. Further, the relay lens 233 is shifted in the Y direction by a predetermined amount YB2 so that a lower end of the illumination area 702B is arranged inside the image formation area 701 to acquire a boundary point at the lower end of the illumination area 702B.

A deviation YB3 between the respective boundary points at the upper and lower ends of the illumination area 702B is acquired in the same manner as the above-described step S495.

A width YB of the illumination area 702B in the Y direction is computed as is a width YA of the image formation area 701 in the Y direction to further compute illumination margins AY of the illumination area 702B in the Y direction based on the widths YB and YA in the same manner as the above-described step S496.

Furthermore, a position adjustment amount of the relay lens 233 in the Y direction is computed based on a deviation YB4 between the boundary point at the lower end of the illumination area 702B and the boundary point at the lower end of the image formation area 701, and the illumination margins AY of the illumination area 702B in the Y direction, in the same manner as the above-described step S497.

The position of the relay lens 233 is then adjusted in the Y direction based on the computed position adjustment amount of the Y direction in the same manner as the above-described step S498.

In this state, as shown in FIG. 44(D), the left and right illumination margins AX of the illumination area 702B are the same while the upper and lower illumination margins AY of the illumination area 702B are the same. Accordingly, the above-described illumination area 702G for green light is coincided with the illumination area 702B for blue light.

(iv) Position Adjustment of Reflection Mirror

In the step S490, after the position of the relay lens 233 is adjusted, the control device 600 adjusts the position of the reflection mirror 223 based on the optical image picked by the CCD 423R for red light (FIGS. 26 and 27) to position the illumination area by way of the red light at a predetermined position relative to the image formation area of the liquid crystal panel 241R (step S500).

Incidentally, the description will be omitted since the position of the reflection mirror 223 can be adjusted in the same manner as the position adjustment of the relay lens 233, except that the control device 600 controllably drives the first positioning jig 310 holding the reflection mirror 223, and that the position thereof is adjusted based on the illumination area 702R for red light (FIG. 34). The third positioning members 253C abutting on the reflection mirror 223 follow when the position of the reflection mirror 223 is adjusted on account of the surface tension of the ultraviolet curing adhesive.

(v) Position Adjustment of Incident-Side Polarization Plate

Figure 45:
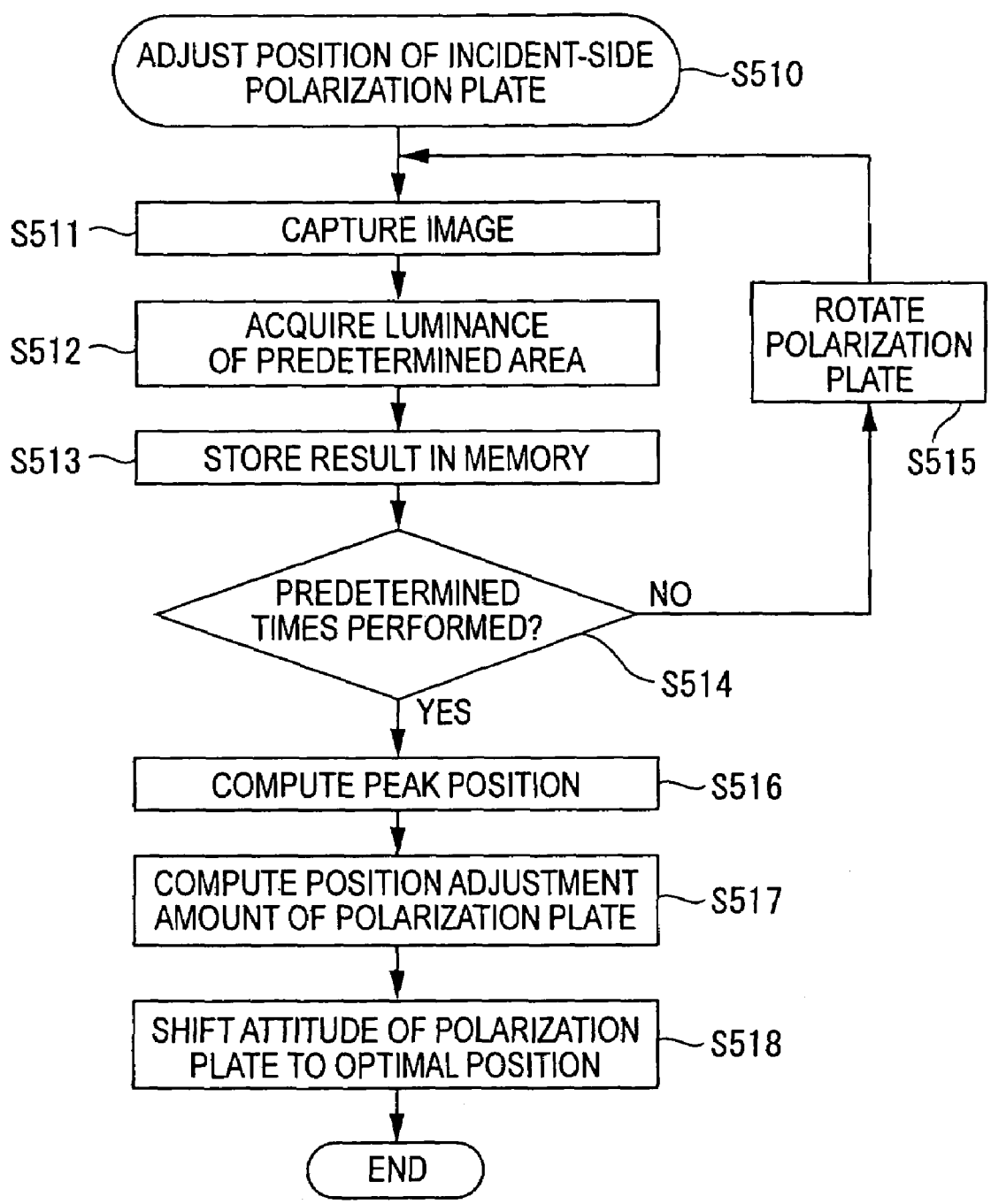
FIG. 45 is a flowchart explaining a manufacturing method of the optical unit according to the aforesaid embodiment.

In the steps S470 to S500, after the positions of the superposing lens 215, the relay lens 233 and the reflection mirror 223 are adjusted while the illumination areas of the green, blue and the red lights are aligned, the control device 600 adjusts the position of the incident-side polarization plates 242 (step S5 10). In other words, the above procedure is performed according to a flowchart shown in FIG. 45.

Note that, a predetermined pattern generating device (not shown) is used to generate a pattern causing full shade areas (dark and black) on the liquid crystal panels 241R, 241G and 241B so that the optical image detecting device 400 picks the entirely black picked images 700.

Firstly, the image capture 631 of the controlling unit 630 inputs the R, G and B signals output from the optical image detecting device 400 and converts the input signals into an image signal to output to the image processor 632 (step S511).

Figure 46:
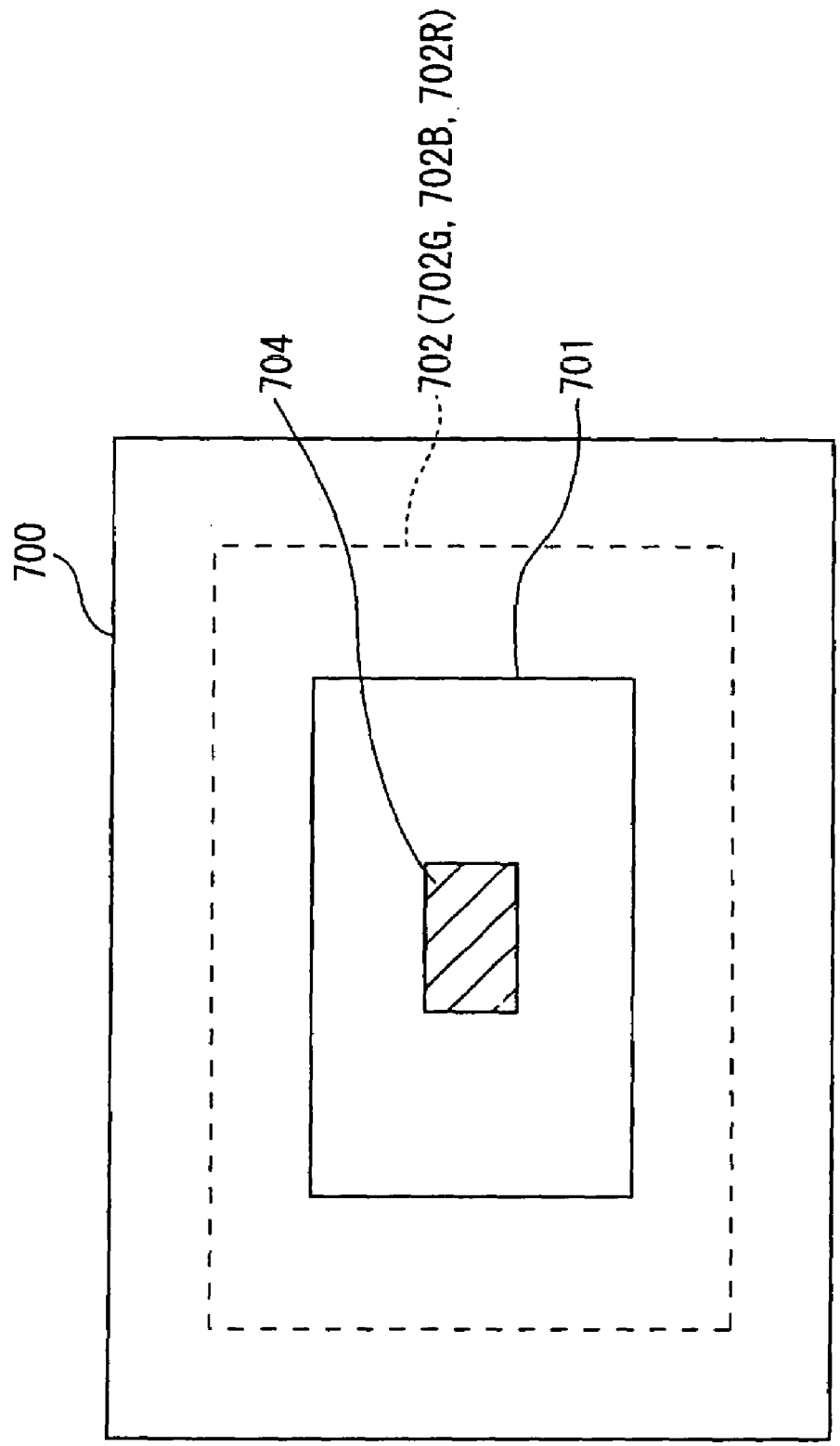
FIG. 46 is an illustration showing an example of an image captured by the control device, which is an optical image picked by the optical image detecting device, according to the aforesaid embodiment.

FIG. 46 is an illustration showing an example of the image captured by the control device 600, which is the optical image picked by the optical image detecting device 400.

Then, the luminance acquiring unit 632A of the control device 600 acquires a luminance values in an area 704 (FIG. 46) at the approximately center of each picked image 700 by way of the red, green and blue lights (step S512). The luminance acquiring unit 632A stores the acquired luminance values of the respective red, green and blue lights in the memory 634.

After the step S512, the arithmetic unit 632E reads out the luminance values of the respective red, green and blue lights stored in the memory 634 to equalize them. The equalized luminance value is related to each turn angle position of the turning portions 333 of the third positioning jig 330 holding the incident-side polarization plates 242 corresponding to each of the R, G and B to store in the memory 634 (step S513).

The controlling unit 630 of the control device 600 determines whether or not the above-described steps S511 to S513 are performed for a predetermined number of times according to the luminance value stored in the memory 634 (step S514). If the controlling unit 630 determines "No", the drive controller 633 of the controlling unit 630 drives the jig driver 300A by outputting a predetermined control signal to the jig driver 300A. The pulse motors (not shown) are then driven to turn the turning portions 333 of the second positioning jigs 310 for turning the incident-side polarization plates 242 around the illumination optical axis by a predetermined angle (step S515). Then, the above steps S511 to S513 are performed again.

As described above, the controlling unit 630 controls the jig driver 300A to turn the turning portion 333 of the third positioning jig 330 holding the incident-side polarization plate 242 so that the incident-side polarization plates 242 are turned by a predetermined angle to repeatedly acquire the luminance values in the predetermined area 704 for the predetermined number of times.

Figure 47:
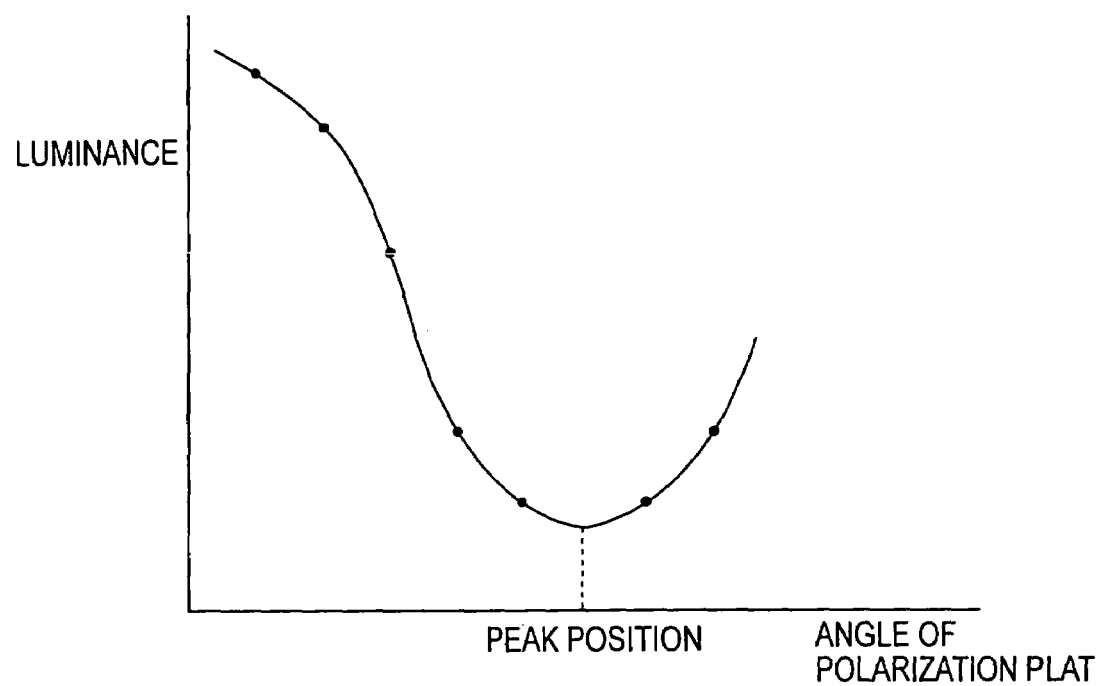
FIG. 47 is an illustration to explain a manufacturing method of the optical unit according to the aforesaid embodiment.

According to such operation, as shown in FIG. 47, a relationship between the attitude positions of the incident-side polarization plates 242 and the luminance values of the picked images 700 can be acquired.

On the other hand, when the controlling unit 630 determines "Yes" in the step S523, or the above operation is performed for the predetermined number of times, the arithmetic unit 632E of the controlling unit 630 reads out the luminance values corresponding to the attitude positions of the incident-side polarization plates 242 associated with the respective R, G and B stored in the memory 634 to compute peak positions of the luminance values relative to the attitude positions of the incident-side polarization plates 242 for the respective R, G and B (step S516). In other words, the computed peak positions represent the optimum positions of the incident-side polarization plates 242 for respective red, green and blue lights relative to the liquid crystal panels 241R, 241G and 241B and the irradiation-side polarization plates 243.

After the step S5 16, the arithmetic unit 632E computes deviations between the current turn angle positions of the turning portions 333 of the third positioning jigs 330 holding the incident-side polarization plates 242 for the red, green and blue lights, and the respective computed peak positions (step S517). The deviations are then stored in the memory 634. The computed deviations correspond to each position adjustment amount of the incident-side polarization plates 242.

After the step S517, the drive controller 633 drives the jig driver 300A by outputting a predetermined control signal to the jig driver 300A based on the deviations stored in the memory 634. The pulse motors (not shown) are then driven to turn the turning portion 333 of the third positioning jig 330 holding the incident-side polarization plate 242 for each red, green and blue light so that the respective incident-side polarization plates 242 are turned to the optimum positions (step S518).

Incidentally, when the positions of the respective incident-side polarization plates 242 are adjusted, all the incident-side polarization plates 242 can be adjusted at the approximately same time in the above manner, or the respective polarization plates can be adjusted one by one. When the adjustment is performed one by one, the order is not limited particularly.

As described above, after positioning the optical components 213 to 215, 223 and 233 requiring the adjustment, the ultraviolet curing adhesive is irradiated by ultraviolet ray so that the optical components 213 to 215, 223 and 233 are fixed on the container 25A (step S520).

More specifically, the control device 600 drives the ultraviolet irradiator (not shown) after positioning the optical components 213 to 215, 223 and 233. The ultraviolet ray is irradiated from the upper side of the container 25A on the ultraviolet curing adhesive filled between the peripheries of the second lens array 213 and the polarization converter 214; and the respective support portions 251B and 251F (FIGS. 16 and 17) of the component housing 251 to cure the ultraviolet curing adhesive. Further, the ultraviolet ray is irradiated toward the first positioning members 253A from the lateral side of the container 25A. The irradiated ultraviolet ray passes through the first positioning members 253A to cure the ultraviolet curing adhesive applied between the grooves (not shown) of the first positioning members 253A and the respective peripheries of the superposing lens 215 and the relay lens 233; and also the adhesive applied between the peripheries of the first positioning members 253A and the holes 251A. Further, the ultraviolet ray is irradiated toward the third positioning member 253C from the lateral side of the container 25A. The irradiated ultraviolet ray passes through the plate body 253C1 (FIG. 15) and the pins (not shown) to cure the ultraviolet curing adhesive applied between the peripheries of the pins and the holes 251C as well as the one applied between the tip ends of the pins and the back side of the reflection face of the reflection mirror 223.

After fixing all the positions of the optical components 212 to 215, 221 to 224, 231 to 234 and 242, and the prism unit on the component housing 251 of the container 25A, the lid 25B is connected to the container 25A by way of screws etc. (step S50) to manufacture the optical unit 2.

(2-6) Advantages of Second Embodiment

According to the above-described second embodiment, following advantages can be obtained.

(2-6-1) A group of the optical components 212 to 214, 221, 222, 224, 231 and 242 of the optical systems 21, 22 and 23 excluding the light source device 211, are fixed on the support portions 251I, 251B and 251F formed on the inside of the container 25A while being positioned at the predetermined positions on the illumination optical axes of the light beam irradiated by the light source device 211 by way of the optical component positioning jigs 300. Accordingly, the manufacturing accuracy of the respective support portions 251I, 251B and 251F for the group of the optical components 212 to 214, 221, 222, 224, 231 and 242 need not to be so high. The positions of the rest of the optical components 215, 223 and 232 to 234 are fixed at the predetermined positions inside the container 25A by way of the first positioning members 253A and the third positioning members 253C inserted from the outside of the container 25A to the inside thereof through the holes 251A and 251C while being positioned at the predetermined positions on the illumination optical axes of the light beam irradiated by the light source device 211 by way of the optical component positioning jigs 300. Therefore, as compared to the conventional optical component casing having external position reference faces inside and requiring highly accurate manufacturing, the optical component casing 25 can easily be manufactured while the production cost can be reduced.

(2-6-2) Since the container 25A and the lid 25B are made of aluminum, the heat generated at the optical systems 21, 22 and 23 and the electric optical device 24 is radiated to the optical component casing 25, thus enhancing the cooling efficiency of the optical components. Further, the intensity of the optical component casing 25 can be maintained.

(2-6-3) Since the group of the optical components 212 to 214, 221, 222, 224, 231 and 242 are directly fixed on the respective support portions 251I, 251B and 251F, and the rest of the optical components 215, 223 and 232 to 234 are positioned and fixed on the container 25A by way of the first positioning members 253A and the third positioning members 2513, a member such as a holder frame for holding the optical components 212 to 215, 221 to 224, 231 to 234 and 242 can be omitted, thereby reducing the production cost for manufacturing the optical unit 2 when the optical unit 2 is manufactured.

(2-6-4) Since the first positioning members 253A are only used for the optical components 215 and 223 requiring relatively high positioning accuracy, the number of the first positioning members 253A may be minimized, thus reducing the weight and the production cost of the optical component casing 25 based upon the omission of the members. Further, when the optical unit 2 is manufactured, the placement process of the first positioning members 253A can be simplified, thus quickly manufacturing the optical unit 2 and also reducing the production cost of the optical unit 2.

(2-6-5) Since the groove 253A1 is formed on the end of each first positioning member 253A to abut on the outer peripheries of the optical components 215 and 233 for suspending them, the optical components 215 and 233 can be easily and precisely positioned by way of the first positioning members 253A. Further, the optical components 215 and 233 can be fixed on the optical component casing 25 by way of the first positioning members 253A without displacement.

(2-6-6) Since the reflection mirrors 223, 232 and 234 are fixed on the container 25A by way of the third positioning members 253C, the fixing state of the reflection mirrors 223, 232 and 234 on the optical component casing 25 can be preferably maintained. When the reflection mirrors 223, 232 and 234 are replaced and so on, since each four pins are integrated with the plate body 253C1, the four pins can be removed at once without a cumbersome work of removing the four pins one by one, thus enhancing reworkability of the reflection mirrors 223, 232 and 234.

(2-7) Modifications of Second Embodiment

In the present embodiment, though the optical component casing 25 includes the container 25A and the lid 25B, of which the plurality of holes 251D are formed on the bottom side of the container 25A so that the part of the optical component positioning jig 300 can be inserted through, it is not limited thereto. The optical component casing 25 is only required to have at least one opening, to which the part of the optical component positioning jig 300 can be inserted, and such opening may be provided on the lateral side of the container 25A or the lid 25B. The optical component casing 25 may be a hollow structure integrating the container 25A and the lid 25B. In such case, it is required to form a plurality of holes on the top side or the bottom side of the optical component casing 25 so that the part of the optical component positioning jig 300, the optical components 212 to 215, 221 to 224, 231 to 234 and 242, and the prism unit can be inserted.

In the present embodiment, though the ultraviolet curing adhesive is used for fixing the optical components 212 to 215, 221 to 224, 231 to 234 and 242, a heat curing adhesive can be used. The adhesive is not limited to the ultraviolet curing adhesive neither the heat curing adhesive. The adhesive used for fixing the optical components 213 to 215, 223, 233 and 242 requiring the adjustment may be any adhesive as long as the optical components 213 to 215, 223, 233 and 242 can be shifted together with the positioning members 253A and 253C on account of the surface tension of the adhesive in the operation (steps S450 to S510) for adjusting the positions of the optical components 213 to 215, 223, 233 and 242. The adhesive used for fixing the optical components 212, 221, 222, 224, 231, 232 and 234 not requiring the adjustment may be any adhesive as long as the adhesive would not be dried while fixing the positions.

In the present embodiment, though the optical components with the adhesive applied in advance are placed on the jigs (steps S310, S420 and S430), and the positioning members 253A and 253C with the adhesive applied in advance are placed (steps S330 and S440), the adhesive may be applied just prior to adjusting positions of the optical components (steps S450 to S510). With such arrangement, it is not required to care about the surface tension and the drying of the adhesive. Accordingly, there is a wide choice of the adhesive. For instance, an instant adhesive may also be used. If the instant adhesive is used, the optical components can be fixed (steps S340 and S520) at the time of applying the adhesive, thus facilitating the manufacturing operation.

(3) Third Embodiment

Though the container 25A and the lid 25B of the optical component casing 25 are made of an aluminum plate by sheet metal processing in the first and second embodiments, the container 25A and the lid 25B can be made of synthetic resin by molding such as injection molding, or constituted of a molding product of magnesium alloy, aluminum alloy or the like.

The optical component casing 25 can be arranged by a molding product in a profile like the one according to the above-described first and second embodiments. However, since there is higher flexibility for the profile when molding as compared to sheet metal processing, following profile can be considered for example.

Figure 48:
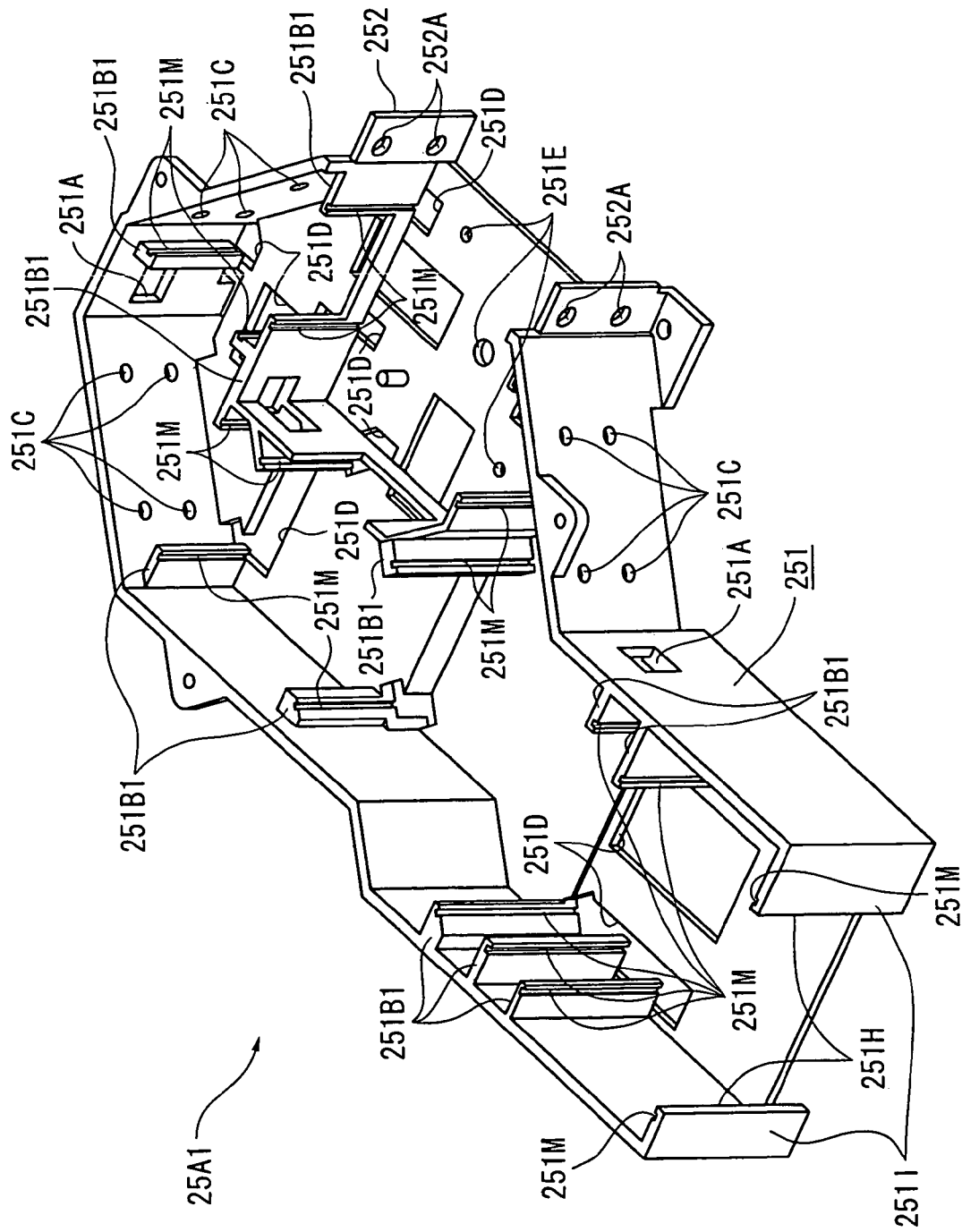
FIG. 48 is a perspective view showing an upper side of a container of an optical component casing according to a third embodiment.

Specifically, FIG. 48 is a perspective view showing an upper side of a container 25A1 of the optical component casing 25 made of synthetic resin by molding according to the present embodiment.

Since the container 25A1 has the approximately same structure as the container 25A described in the first and second embodiments, the same reference numerals will be attached to the same components to omit the detailed description thereof. Though not shown, positioning holes similar to the positioning holes 251G of the container 25A described in the first and second embodiments are formed on a back side of a bottom side of the container 25A1. Though not shown neither, a lid also has a structure similar to the lid 25B described in the first and second embodiments.

A support portions 251B1 and 251I are formed on the container 25A1 corresponding to the optical components 212 to 214, 221, 222, 224, 231 and 242. The support portions 251B1 and 251I abut on the optical components to serve as members supporting the optical components in the same manner as the support portions 251B, 251F and 251I described in the second embodiment. Though not shown, the optical components 215, 223 and 232 to 234 can be supported by the first positioning members 253A and the third positioning members 253C in the same manner as the structure described in the second embodiment.

Grooves 251M are formed on the support portions 251B1 and 251I at abutting faces abutting on the optical components 212 to 214, 221, 222, 224, 231 and 242.

Figure 49:
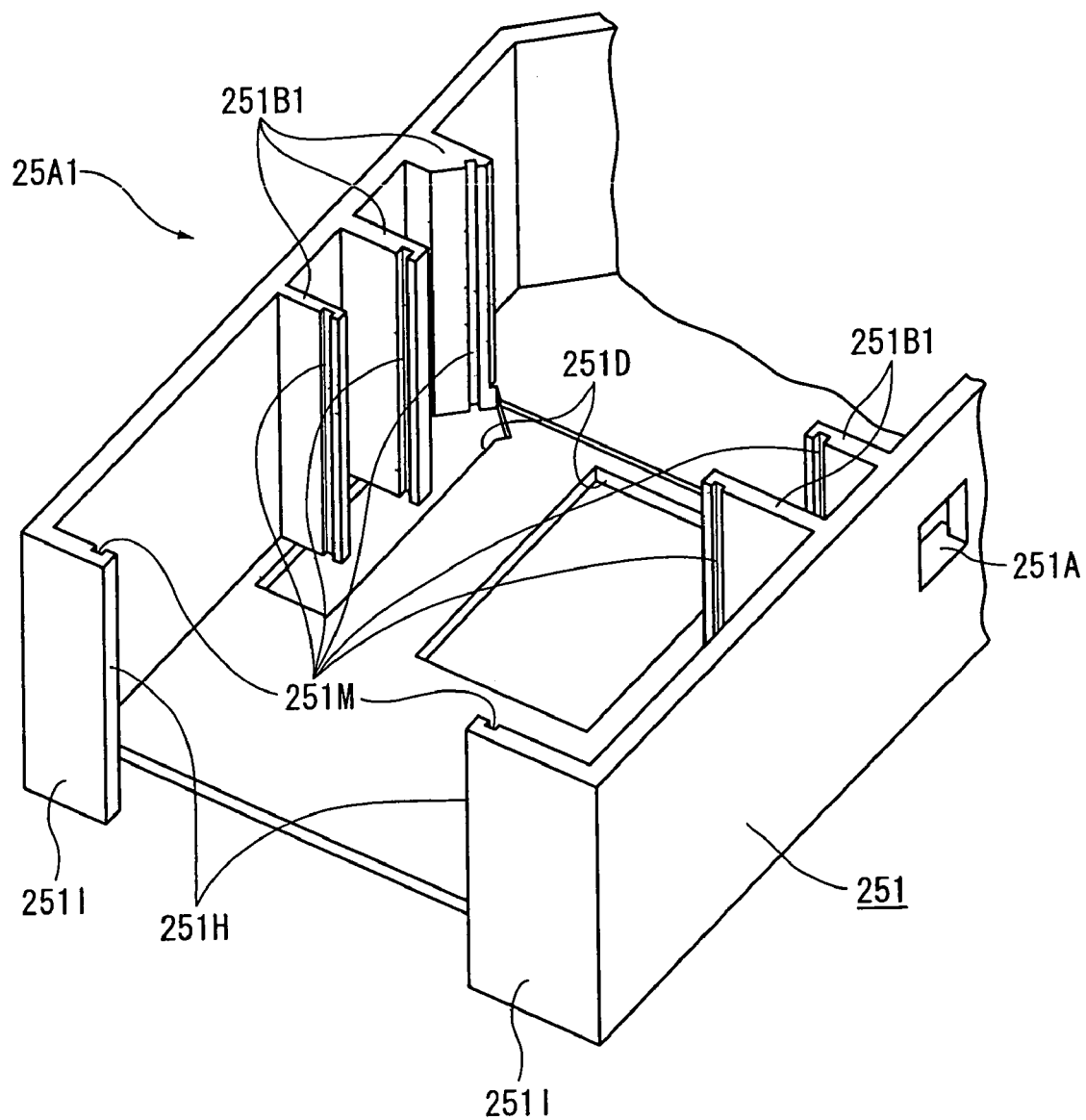
FIG. 49 is an illustration in which a part of FIG. 48 is enlarged.

FIG. 49 is an illustration showing the grooves 251M formed on the support portion 251B1. In other words, FIG. 49 is the illustration in which a part of FIG. 48 is enlarged.

The grooves 251M are formed on the support portions 251B1 to penetrate through each support portion 251B1 from an upper end to a lower end.

Figure 50:
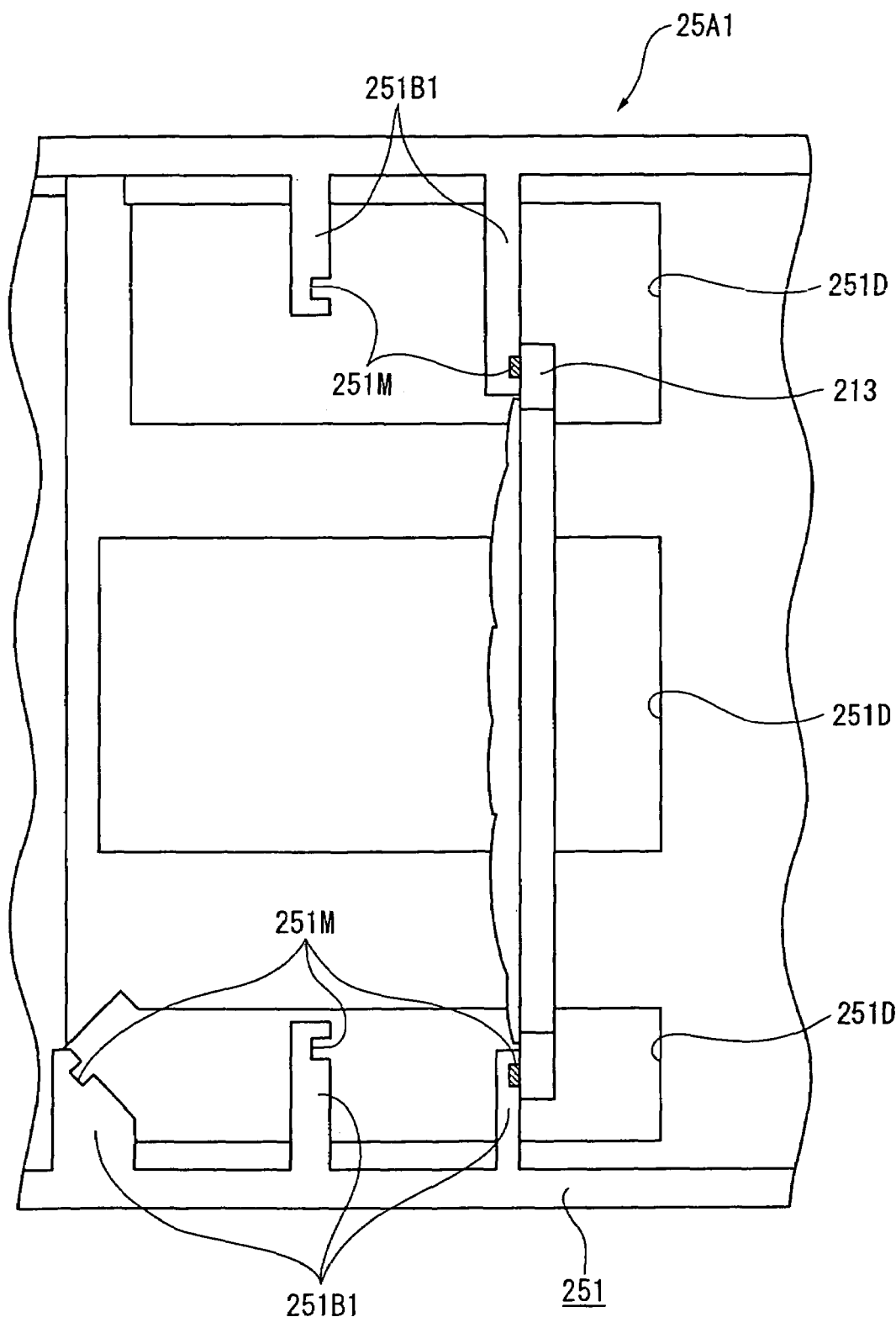
FIG. 50 is an illustration showing the state that the optical component is supported by the container of FIG. 48.

FIG. 50 is an illustration showing the state that the optical component is supported by the support portions 251B1. In other words, FIG. 50 is the illustration showing the state that the second lens array 213 is supported by the support portions 251B1 seen from the upper side.

Figure 51:
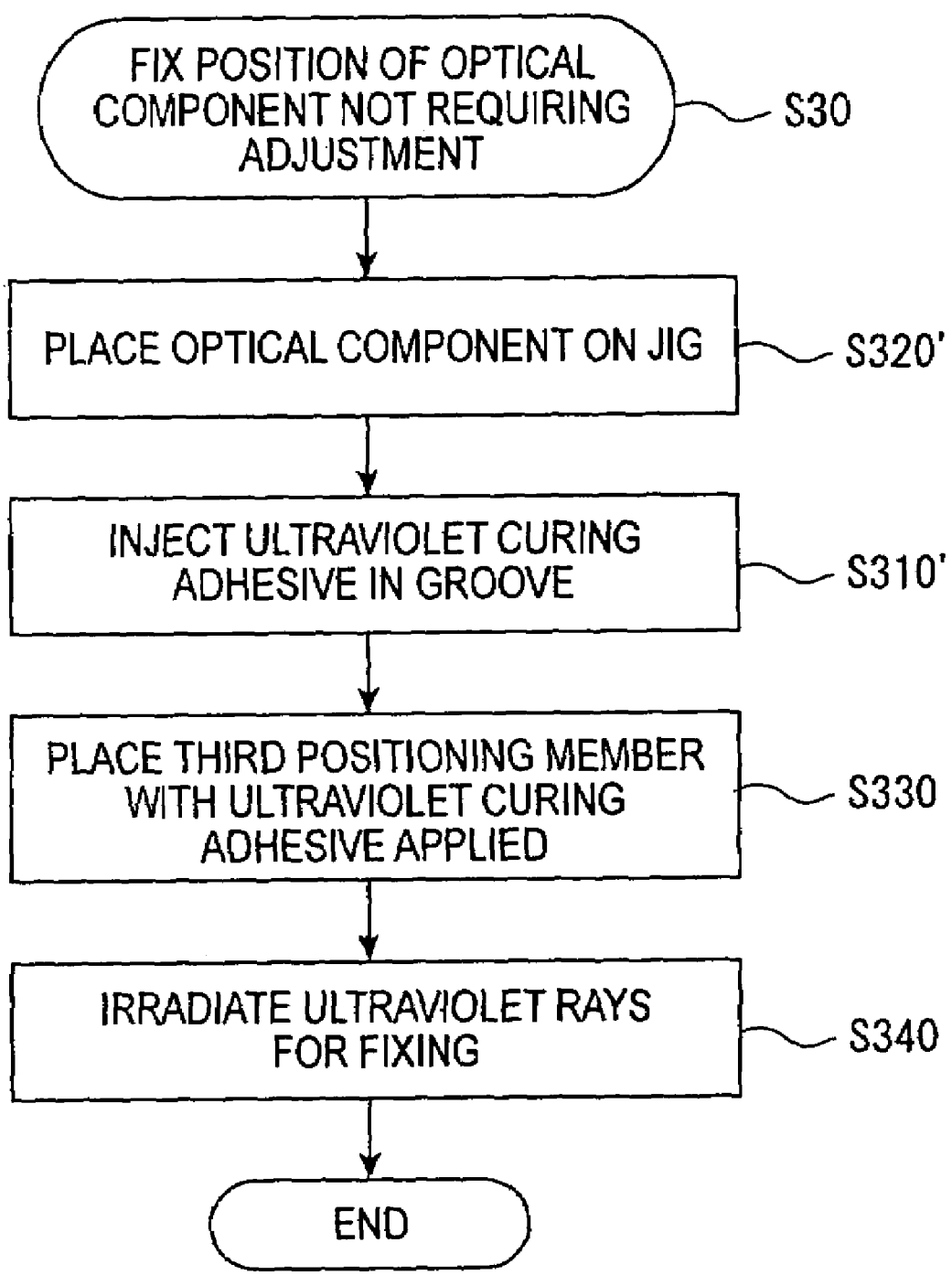
FIG. 51 is a flowchart explaining a method for fixing the position of the optical component not requiring adjustment on the container according to the aforesaid embodiment.

FIG. 51 is a flowchart explaining a method for fixing the positions of the optical components 212, 221, 222, 224, 231, 232 and 234 not requiring the adjustment on the container 25A1. In the method shown in FIG. 51, firstly, the optical components are placed on the optical component positioning jigs 300 for positioning without applying the ultraviolet curing adhesive on the optical components to position the optical components in the same manner as the step S320 by omitting the operation of the step S310 described with reference to FIG. 30. The ultraviolet curing adhesive is then injected into the grooves 251M from the upper ends of the support portions 251B1 and 251I as is between the optical components and the support portions 251B1 and 251I (step S310'). Further, the third positioning members 253C are placed (step S330). Finally, the ultraviolet ray is irradiated on the adhesive to fix the positions of the optical components on the container 25A1 (step S340).

Figure 52:
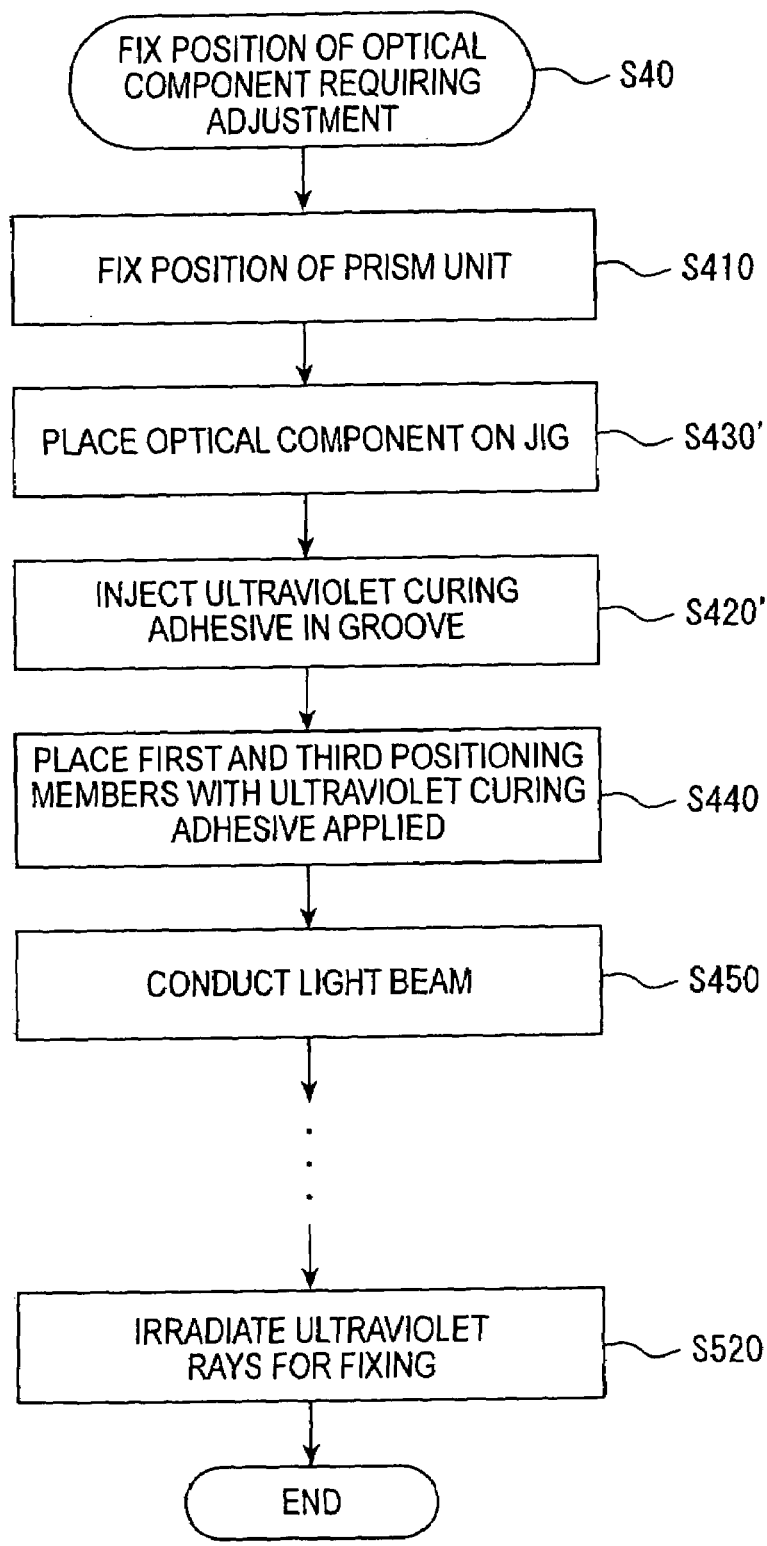
FIG. 52 is a flowchart explaining a method for fixing the position of the optical component requiring adjustment on the container according to the aforesaid embodiment.

FIG. 52 is a flowchart explaining a method for fixing the positions of the optical components 213 to 215, 223, 233 and 242 requiring the adjustment on the container 251 AI. According to the method shown in FIG. 52, firstly, the position of the prism unit is fixed in the same manner as the step S410 described with reference to FIG. 32 (step S410), and then the optical components are placed on the optical component positioning jigs 300 for positioning without applying the ultraviolet curing adhesive on the optical components in the same manner as the step S430 to position the optical components by omitting the operation of the step S420 (step S430'). The ultraviolet curing adhesive is then injected into the grooves 251M from the upper end of the support portions 251B 1 as is between the optical components and the support portions 251B1 (step S420'). Further, the first positioning members 253A and the third positioning members 253C are placed (step S440). Thereafter, though not partly shown in FIG. 52, the positions of the optical components are adjusted in the same manner as the step S450 to S510 described with reference to FIG. 32. Finally, the ultraviolet ray is irradiated on the adhesive to fix the positions of the optical components on the container 25A1 (step S520).

Since such optical component casing is used, the adhesive can easily be injected between the optical components and the support portions 251B1, thus easily and promptly fixing the positions of the optical components after positioning the optical components. Additionally, the optical components can be prevented from the adhesive unnecessarily adhering. Even when the gaps between the support portions 251B1 and 251I, and the optical components become narrow due to manufacturing error of the container 25A1, the positions of the optical components can easily be fixed on the container 25A1.

Figure 53:
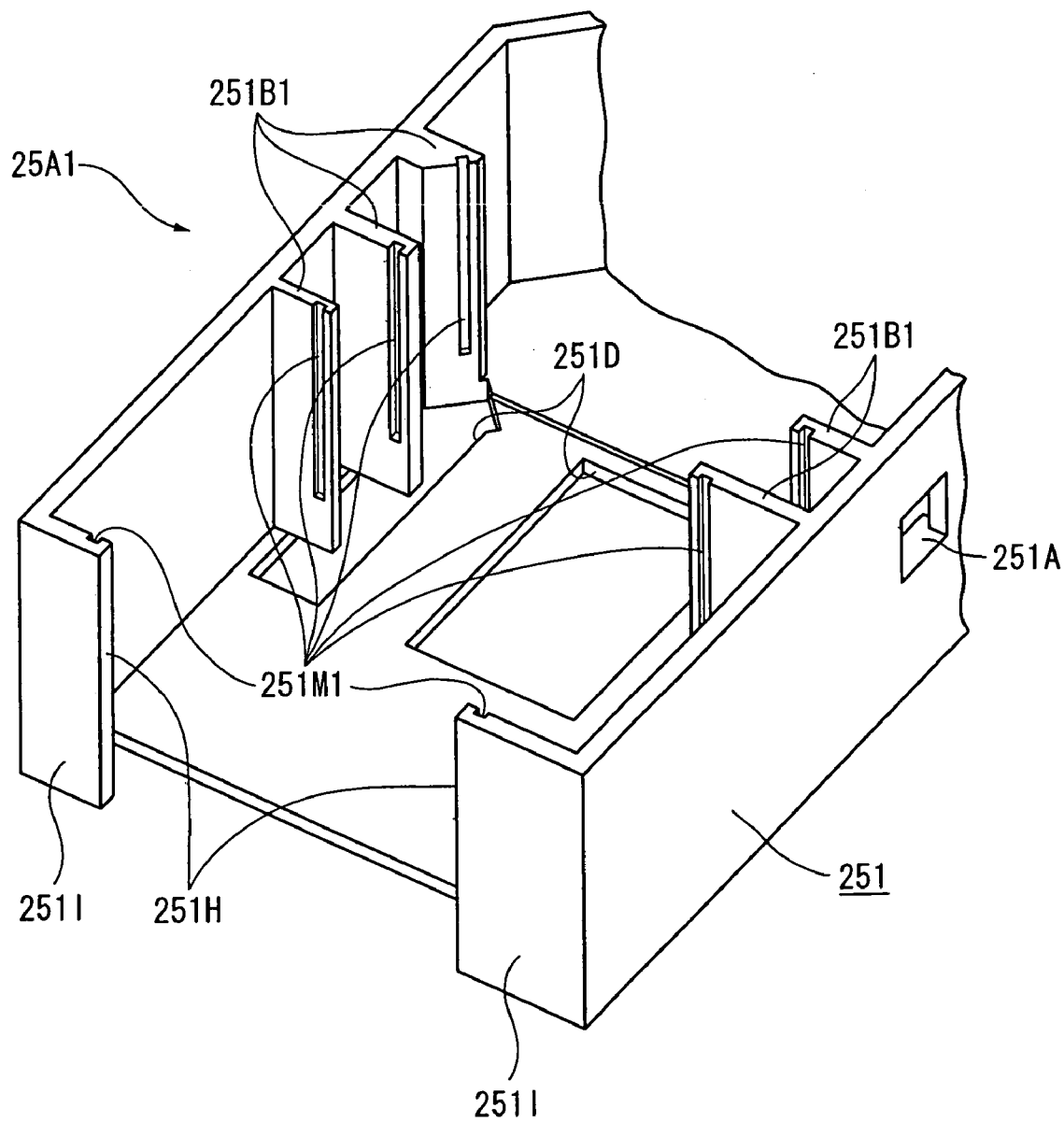
FIG. 53 is an illustration showing a modification of the container according to the aforesaid embodiment.
Figure 54:
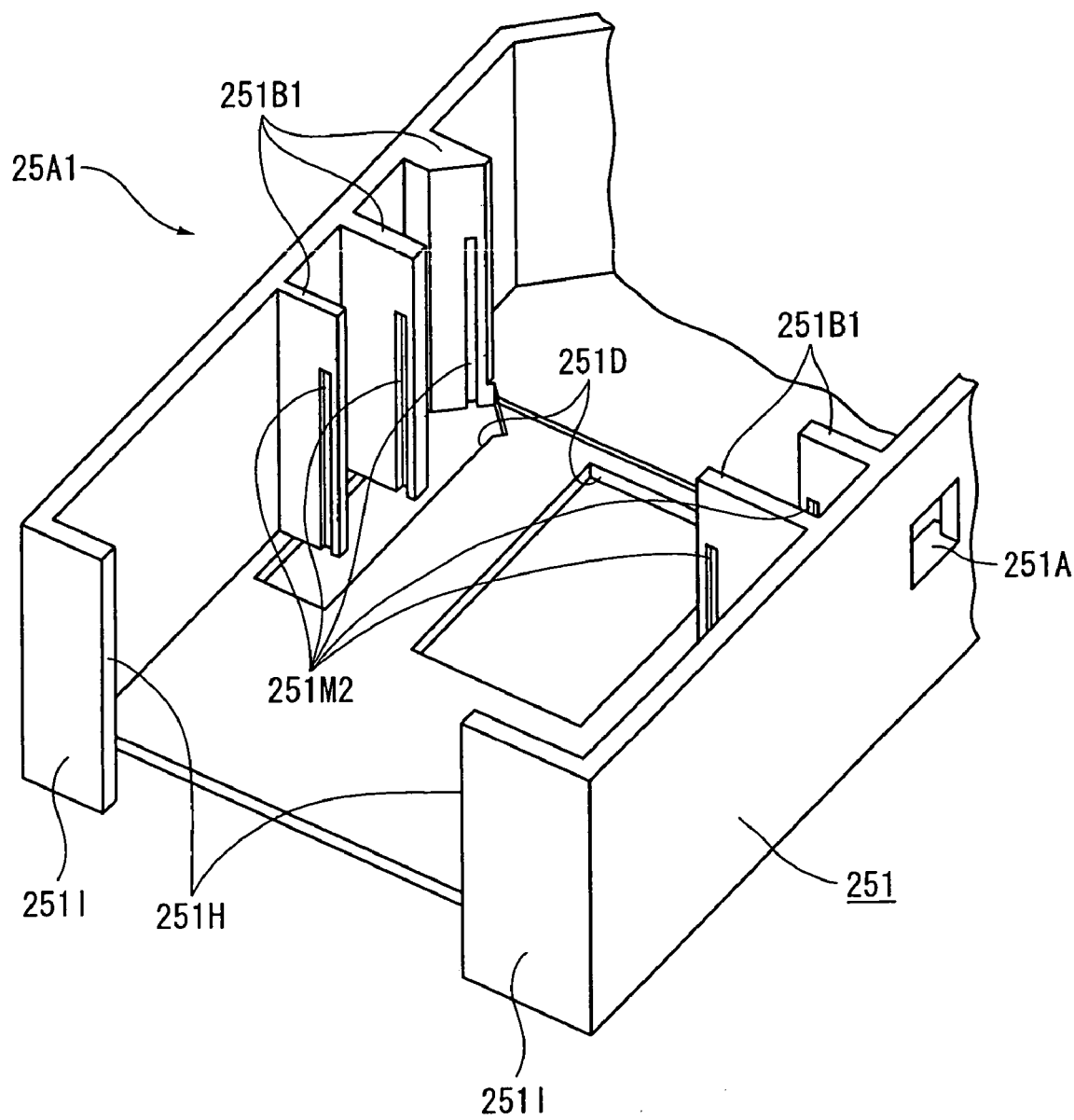
FIG. 54 is an illustration showing a modification of the container according to the aforesaid embodiment.

Incidentally, the grooves 251M may employ the structure shown in FIGS. 53 and 54 other than the structure of penetrating the support portion 251B1 from the upper end to the lower end thereof.

Specifically, in FIG. 53, groove 251M1 is formed on the support portion 251B1 from the upper end to a part near the lower end of the support portion 251B1. That is, the groove 251M1 does not penetrate through the support portion 251B1 from the upper end to the lower end thereof. With such arrangement, in the step S310' and S420', the adhesive can be prevented from leaking from the lower side of the container 25A1 when the adhesive is injected into the groove 251M1.

Further, in FIG. 54, groove 251M2 is formed on the support portion 251B1 from the lower end to a part near the upper end of the support portion 251B1. That is, the groove 251M2 does not penetrate through the support portion 251B1 from the lower end to the upper end thereof. For instance, when the container 25A1 is held by an optical component casing holder of the manufacturing apparatus 100 so that the upper opening of the container 25A1 is oriented to the lower side, in the step S310' and S420', when the adhesive is injected into the groove 251M2 from the lower side, the adhesive can be prevented from leaking from the upper opening of the container 251A.

In the present embodiment, though the optical component casing 25 includes the container 25A1 and the lid, of which the plurality of holes 251D are formed on the bottom side of the container 25A1 so that the part of the optical component positioning jig 300 can be inserted, it is not limited thereto. The optical component casing 25 is only required to have at least one opening, to which the part of the optical component positioning jig 300 can be inserted, and such opening may be provided on the lateral side of the container 25A1 or the lid. The optical component casing 25 may be a hollow structure integrating the container 25A1 and the lid. In such case, it is required to form a plurality of holes on the top side or the bottom side of the optical component casing 25 so that the part of the optical component positioning jig 300, the optical components 212 to 215, 221 to 224, 231 to 234 and 242, and the prism unit can be inserted.

In the present embodiment, though the ultraviolet curing adhesive is used for fixing the optical components 212 to 215, 221 to 224, 231 to 234 and 242, a heat curing adhesive can be used. The adhesive is not limited to the ultraviolet curing adhesive neither the heat curing adhesive. The adhesive used for fixing the optical components 213 to 215, 223, 233 and 242 requiring the adjustment may be any adhesive as long as the optical components 213 to 215, 223, 233 and 242 can be shifted together with the positioning members 253A and 253C on account of the surface tension of the adhesive in the operation (steps S450 to S510) for adjusting the positions of the optical components 213 to 215, 223, 233 and 242. The adhesive used for fixing the optical components 212, 221, 222, 224, 231, 232 and 234 not requiring the adjustment may be any adhesive as long as the adhesive would not be dried while fixing the positions.

In the present embodiment, after the adhesive is injected into the grooves 251M, 251M1 and 251M2 (steps S310' and S426'), the positioning members 253A and 253C with the adhesive applied are placed (steps S330 and S440), and then the adhesive is cured (steps S340 and S520) to fix the positions of the optical components 212 to 215, 221 to 224, 231 to 234 and 242. Further, the position adjustment of the optical components (step S450 to S510) is performed with the adhesive applied in advance. However, the positions of the optical components can be adjusted without the adhesive applied so as to apply the adhesive just prior to fixing the optical components (steps S340 and S520). With such arrangement, it is not required to care about the surface tension and the drying of the adhesive. Accordingly, there is a wide choice of the adhesive. For instance, an instant adhesive may also be used. If the instant adhesive is used, the optical components can be fixed (steps S340 and S520) at the time of applying the adhesive, thus facilitating the manufacturing operation.

(4) Forth Embodiment

Though all or a group of the optical components fixed in the container 25A are fixed in the container 25A by way of the positioning members 253A, 253B and 253C in the above-described first and second embodiments, it is not limited thereto. For example, the positions of all of the optical components 212 to 215, 221 to 224, 231 to 234 and 242 can be directly fixed in the container 25A. With such arrangement, following structure may be employed for the container. Note that, structure of a lid is the same as the lid 25B described in the first and second embodiments.

Figure 55:
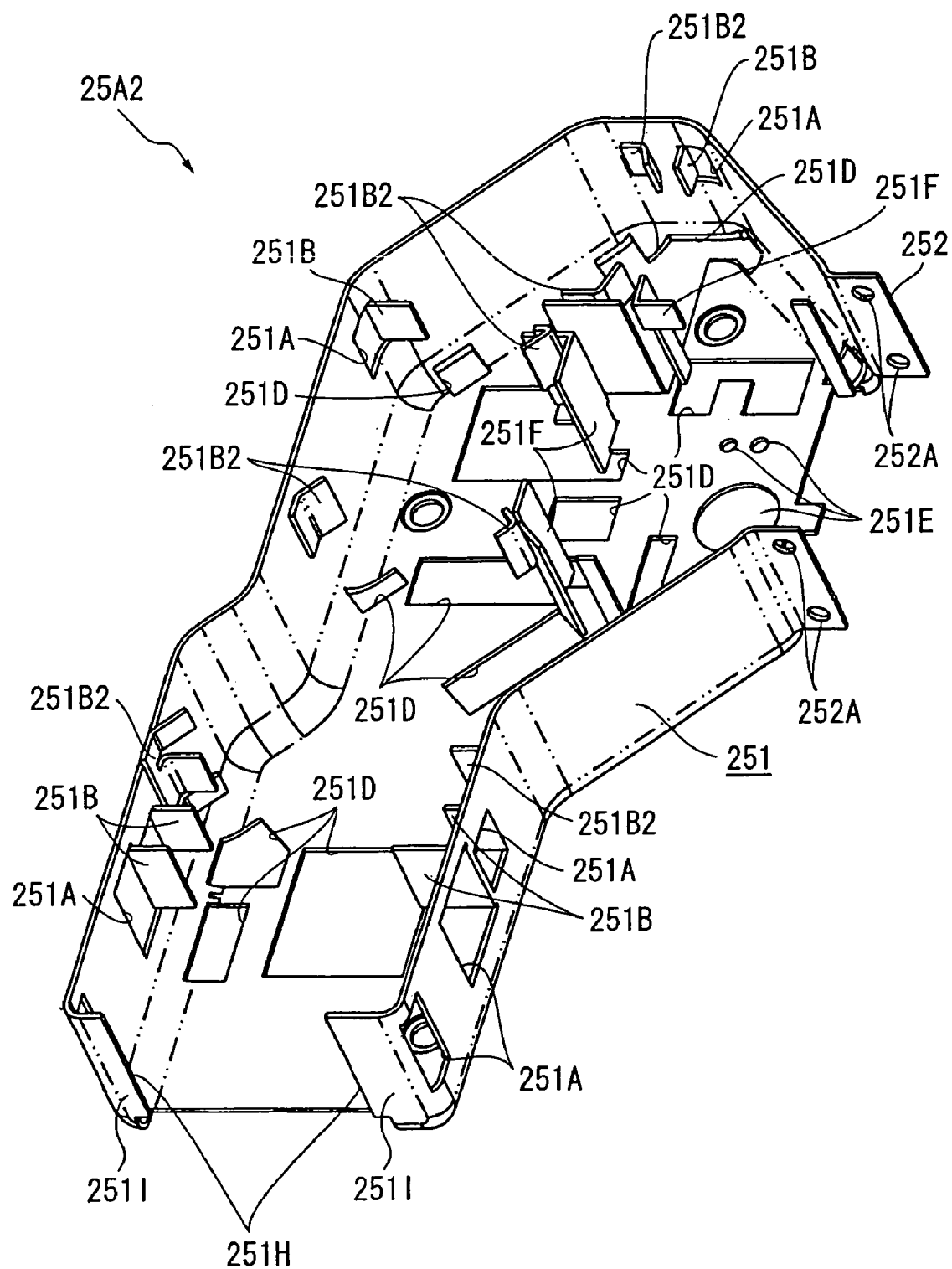
FIG. 55 is a perspective view showing an upper side of a container of an optical component casing according to a fourth embodiment.
Figure 56:
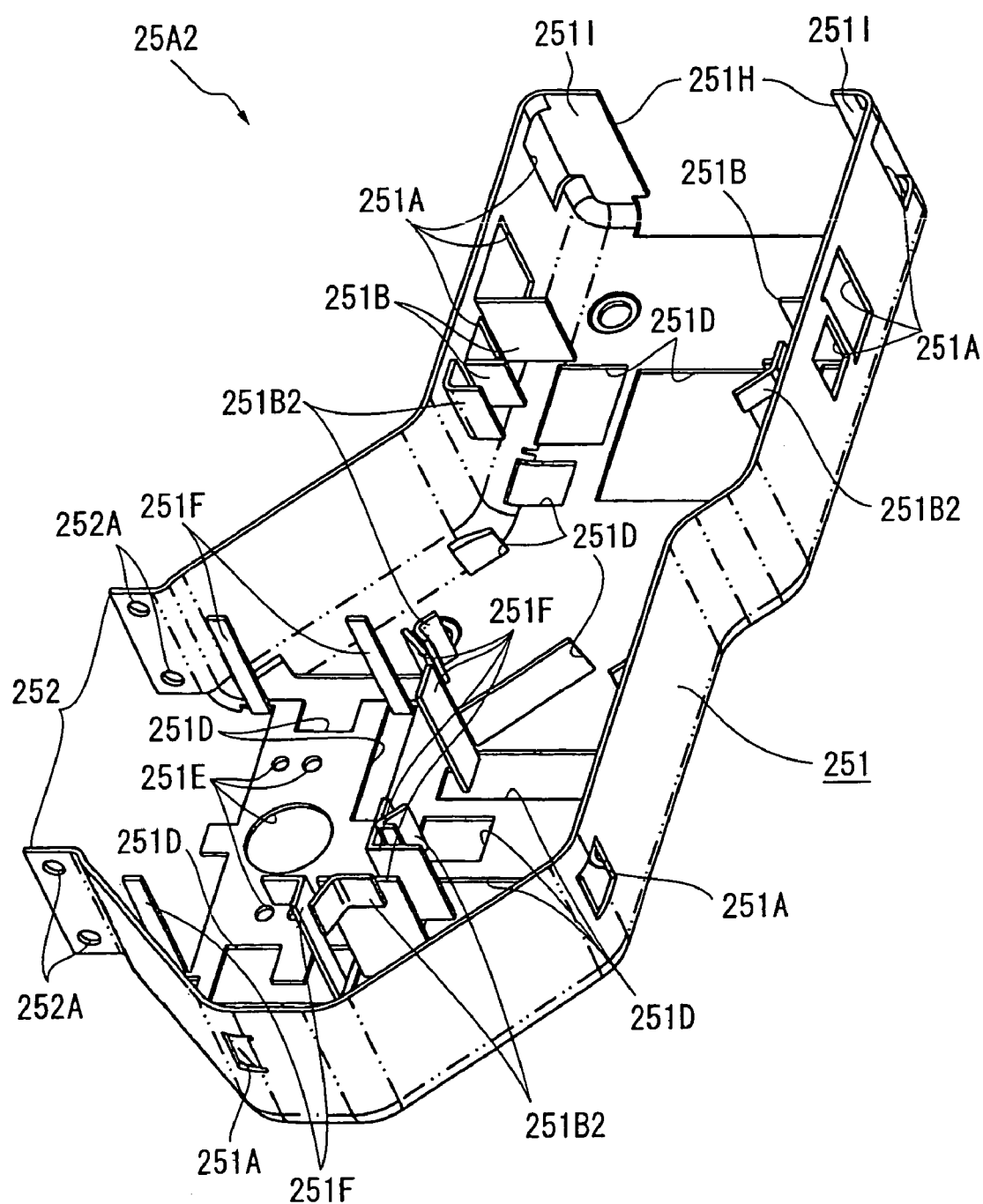
FIG. 56 is a perspective view showing the upper side of the container according to the aforesaid embodiment.

FIGS. 55 and 56 are perspective views each showing the container 25A of optical component casing formed by sheet metal processing seen from the upper side.

Since the container 25A2 has the approximately same structure as the above-described container 25A, the same reference numerals will be attached to the same components to omit the detailed description thereof.

As shown in FIG. 55 or 56, approximately laterally-viewed L-shaped support portions 251B2 are fixed on the lateral sides and the support portions 251F of the container 25A2 corresponding to the optical components 215, 221, 222 and 223 by welding etc. The support portions 251B2 serve as members supporting the optical components in the same manner as the support portions 251B, 251F and 251I described in the second embodiment. Without limiting to such arrangement, parts of the lateral side or the bottom side of the container 25A2 may be cut and folded so that the cut and folded parts serve as the support portions 251B2 in the same manner as the above-described support portions 251B and 251F, The optical components 223, 232 and 234 are directly fixed on the lateral side of the container 25A2 without the holes 251C formed on the lateral side thereof corresponding to the optical components 223, 232 and 234, which are described in the first and the second embodiments.

With this arrangement, the optical component casing 25 does not require the positioning members 253A, 253B and 253C, thus reducing the weight of the optical component casing 25, and consequently, reducing the weight of the optical unit 2.

The manufacturing method of the optical unit 2 according to the present embodiment is the same as that of the second embodiment except that the operation for placing the positioning members 253A and 253C (step S330 in FIG. 30 and step S440 in FIG. 32) is omitted. Since the above operation is omitted in the present embodiment, the manufacturing operation of the optical unit 2 can be facilitated as compared to the manufacturing method of the second embodiment.

The optical component casing 25 according to the present embodiment is not limited to that formed by sheet metal processing, and may be made of synthetic resin by molding such as injection molding, or constituted of a molding product of magnesium alloy, aluminum alloy or the like in the same manner as the optical component casing 25 described in the third embodiment. For example, following structure shown in FIGS. 57 and 58 may be employed as such structure.

Figure 57:
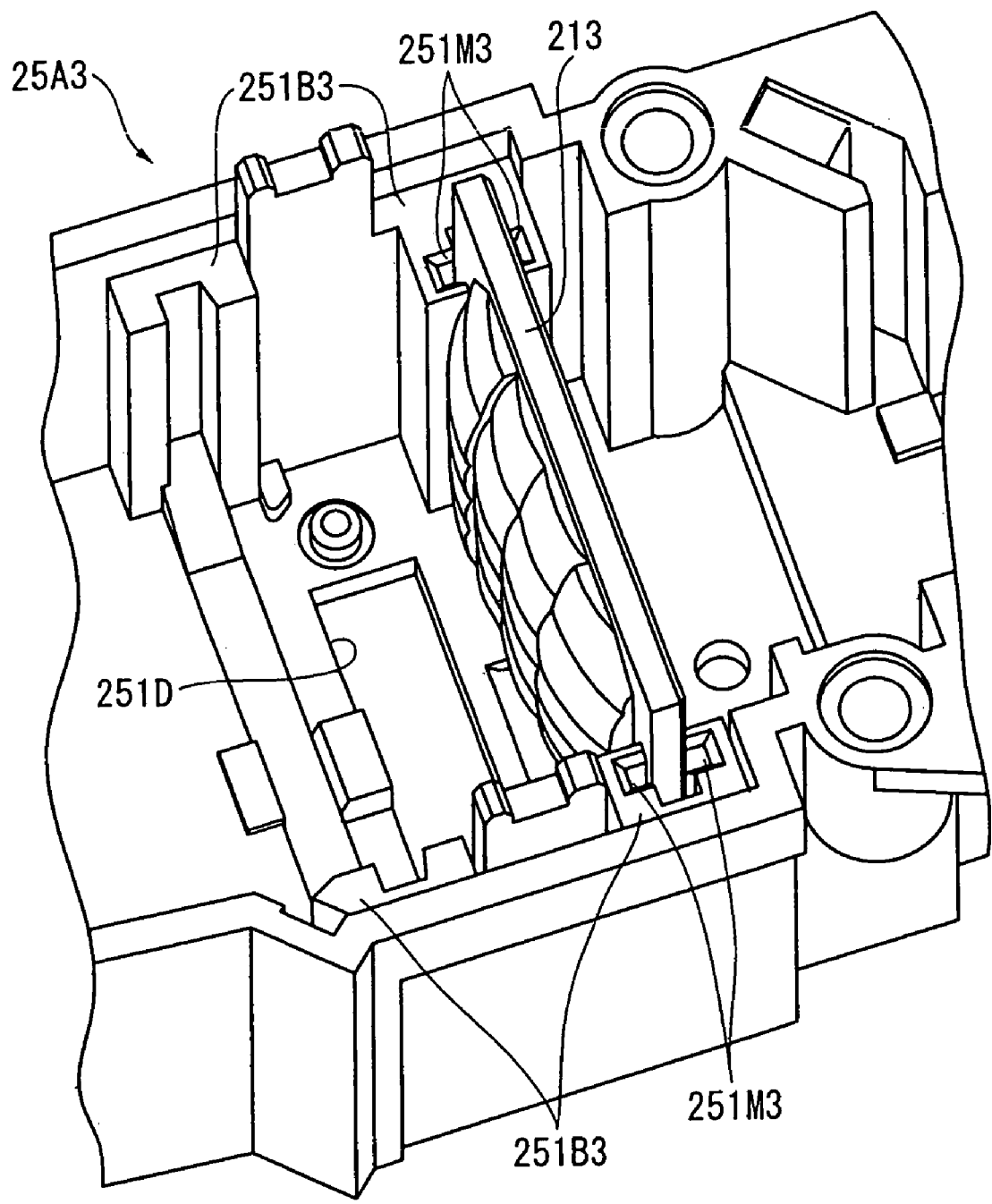
FIG. 57 is an illustration showing a lens holding structure according to the aforesaid embodiment.
Figure 58:
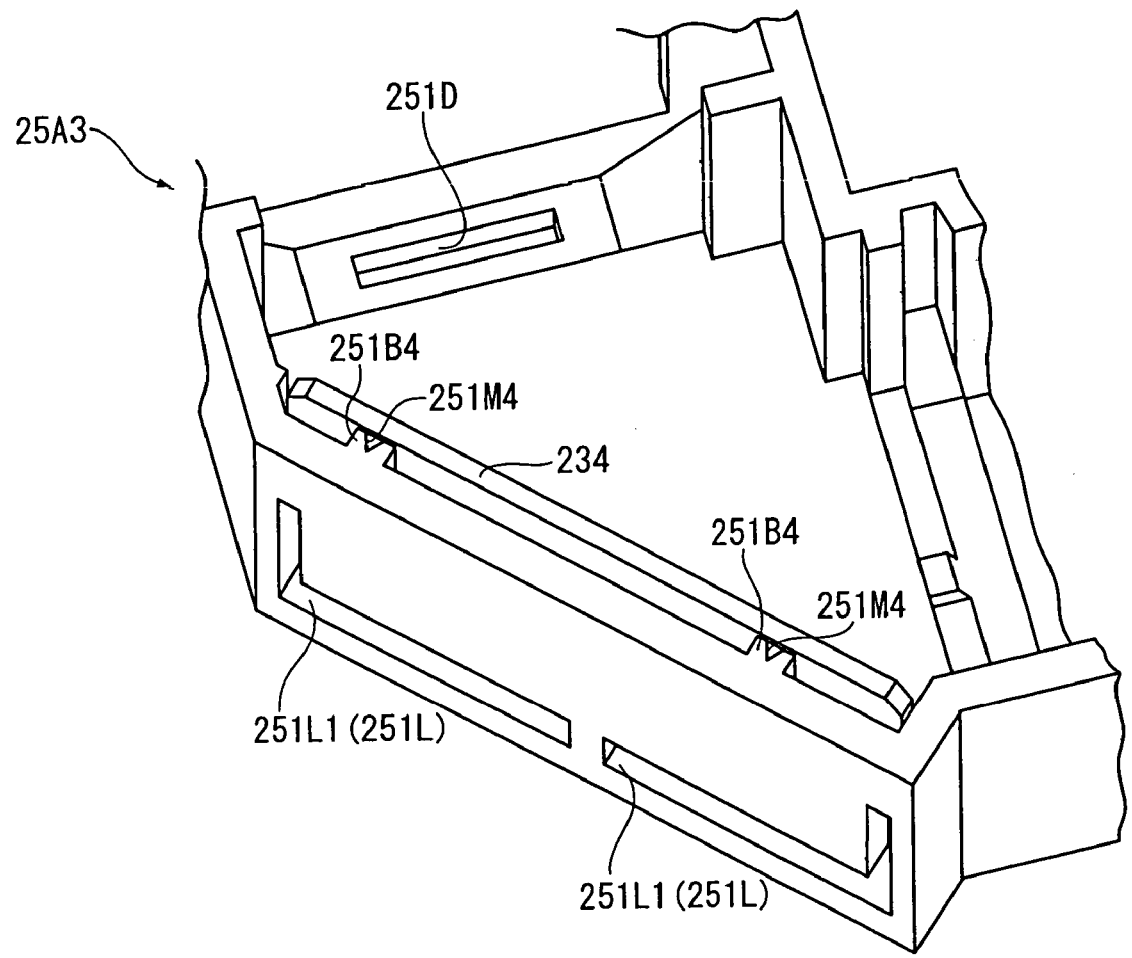
FIG. 58 is an illustration showing a reflection mirror holding structure according to the aforesaid embodiment.

FIGS. 57 and 58 are illustrations each showing holding structure of the optical components in a container 25A3 of the optical component casing 25 which is a molding product by injection molding. Specifically, FIG. 57 is the illustration to explain lens holding structure. FIG. 58 is an illustration to explain the reflection mirror holding structure.

As shown in FIG. 57, support portions 251B3 for supporting the lateral ends opposite each other of the second lens array 213 are formed on the container 25A3 corresponding to the position of the second lens array 213. Though the support portions 251B3 for holding the second lens array 213 are mainly shown in FIG. 57, other support portions 251B3 are formed at the positions corresponding to the rest of the optical components 212, 214, 215, 221 to 224, 231, 233 and 242.

The support portions 251B3 vertically provided on the bottom side of the container 25A3 along the lateral side thereof, and is formed in a profile having a V-shaped cross-section so as to sandwich the light-incident side and the light-irradiation side of the second lens array 213 to support the both ends of the second lens array 213 by inner sides of the V-shaped cross-section.

Grooves 251M3 for injecting the adhesive are formed on the inner sides of the support portions 251B3 near the light-incident side and the light-irradiation side of the second lens array 213. The second lens array 213 is fixed on the support portions 251B3 by injecting the ultraviolet curing adhesive into the grooves 251 M3 while the second lens array 213 is positioned by way of the optical component positioning jig 300.

As shown in FIG. 58, projections 2511B4 are formed on the lateral side of the container 25A3 corresponding to the reflection mirror 234 as support portions for supporting the back side of the reflection mirror 234 by projected tip ends thereof. Though the projections 2511B4 for supporting the reflection mirror 234 are mainly shown in FIG. 58, other projections 251B4 are formed at the positions corresponding to the rest of the optical components 223 and 232.

Though not shown in detail, the projections 251B4 project from the lateral side and extend upward and downward to be arranged in parallel each other so as to support around the left and right ends of the reflection mirror 234.

Grooves 251M4 for injecting the adhesive are formed on the tip ends of the projections 251B4. The reflection mirror 234 is fixed on the projections 251B4 by injecting the ultraviolet curing adhesive into the groove 251M4 while the reflection mirror 234 is positioned by way of the optical component positioning jig 300.

Each groove 251M3 and 251M4 may penetrate from the upper end to the lower end in the same manner as the groove 251M described in the third embodiment, or may be formed from the upper end to a part near the lower end in the same manner as the grooves 251M1 not to penetrate from the upper end to the lower end.

As shown in FIG. 58, frame-shaped holes 251L are formed on the lateral side corresponding to the reflection mirror 234 to planerly surround the two projections 251B4. The holes 251L are formed in a frame-shape by way of two approximately planarly-viewed L-shaped holes 251L1.

In the above arrangement, the manufacturing method of the optical unit 2 is the same as that of the third embodiment except that the operation for placing the positioning members 253A and 253C (step S330 in FIG. 51 and step S440 in FIG. 52) is omitted. With such arrangement, since the above operation is omitted in the present embodiment, the manufacturing operation of the optical unit 2 can be facilitated as compared to that of the third embodiment.

Further, since the support portions 251B3 are formed in a V-shape and the optical components such as the second lens array 213 are fixed on the inner sides thereof, the optical components such as the second lens array 213 can preferably be maintained, and the support portions 251B3 reduce an external force so that the positions of the optical components can be fixed on the container 25A3 without displacement.

Further, gaps are formed between the inner side of the container 25A3 and the backsides of the optical components such as the reflection mirror 234 while the optical components such as the reflection mirror 234 are bonded to the tip ends of the projections 251B4. Accordingly, when the optical components such as the reflection mirror 234 are replaced etc., the optical components such as the reflection mirror 234 can easily be removed from the container 25A3 by inserting a tip end of a driver etc. into the gap, thus enhancing reworkability of the reflection mirror 234.

Furthermore, since the grooves 251M3 and 251M4 for injecting the adhesive are formed on the supporting portions 251B3 and the projections 251B4, the adhesive can easily be injected between the optical components, and either the support portions 251B3 and the projections 251B4, thus easily and promptly fixing the positions of the optical components after positioning. Additionally, the optical components can be prevented from the adhesive unnecessarily adhering. Even when the gaps between either the support portions 251B3 and projections 251B4, and the optical components become narrow due to manufacturing error of the container 25A3, the positions of the optical components can easily be fixed on the container 25A3.

Since the frame-shaped holes 215L are formed on the lateral side corresponding to the optical components such as the reflection mirror 234, a part of the inner side, where the projections 25 1B4 are formed, is likely to be broken from the container 25A3. Accordingly, when the optical components such as the reflection mirror 234 bonded to the projections 2511B4 by the adhesive are removed from the container 25A3, the adhesive would not be remained in the container 25A3 by breaking the part of the inner side where the projections 251B4 are formed even though the adhesive is adhered on the grooves 251M4. Thus, the optical component casing 25 can be recycled.

In the present embodiment, though the optical component casing 25 includes the container 25A2 or 25A3 and the lid, and the plurality of holes 251D are formed on the bottom side of the container 25A2 or 25A3 so that the part of the optical component positioning jig 300 can be inserted, it is not limited thereto. The optical component casing 25 is only required to have at least one opening, to which the part of the optical component positioning jig 300 can be inserted, and such opening may be provided on the lateral side of the container 25A2 or 25A3, or on the lid. The optical component casing 25 may be a hollow structure integrating the container 25A2 or 25A3 and the lid. In such case, it is required to form a plurality of holes on the top side or the bottom side of the optical component casing 25 so that the part of the optical component positioning jig 300, the optical components 212 to 215, 221 to 224, 231 to 234 and 242, and the prism unit can be inserted.

In the present embodiment, though the ultraviolet curing adhesive is used for fixing the optical components 212 to 215, 221 to 224, 231 to 234 and 242, a heat curing adhesive can be used. The adhesive is not limited to the ultraviolet curing adhesive neither the heat curing adhesive. Any adhesive can be used as long as the optical components 213 to 215, 223, 233 and 242 requiring the adjustment can be shifted. The adhesive used for fixing the optical components 212, 221, 222, 224, 231, 232 and 234 not requiring the adjustment may be any adhesive as long as the adhesive would not be dried while fixing the positions.

Further, in the present embodiment, the optical components with the adhesive applied are placed on the jig (steps S310, S420 and S430). Further, the position adjustment of the optical components (step S450 to S510) is performed with the adhesive applied in advance. However, the placement of the optical components and the positioning of the optical components can be performed without the adhesive applied so as to apply the adhesive just prior to fixing the optical components (steps S340 and S520). With such arrangement, it is not required to care about the surface tension and the drying of the adhesive. Accordingly, there is a wide choice of the adhesive. For instance, an instant adhesive may also be used. If the instant adhesive is used, the optical components can be fixed (steps S340 and S520) at the time of applying the adhesive, thus facilitating the manufacturing operation.

(5) Fifth Embodiment

Though the positions of the optical components are fixed after the container 25A, 25A1, 25A2 or 25A3 is placed on the manufacturing apparatus 100 in the second to fourth embodiments, the container 25A, 25A1, 25A2 or 25A3 may be placed after the optical components are positioned. Alternatively, when the container 25A, 25A1, 25A2 or 25A3 is placed on the manufacturing apparatus 100, the opening side thereof instead of the bottom side can be placed on the side of the second table 220.

Figure 59:
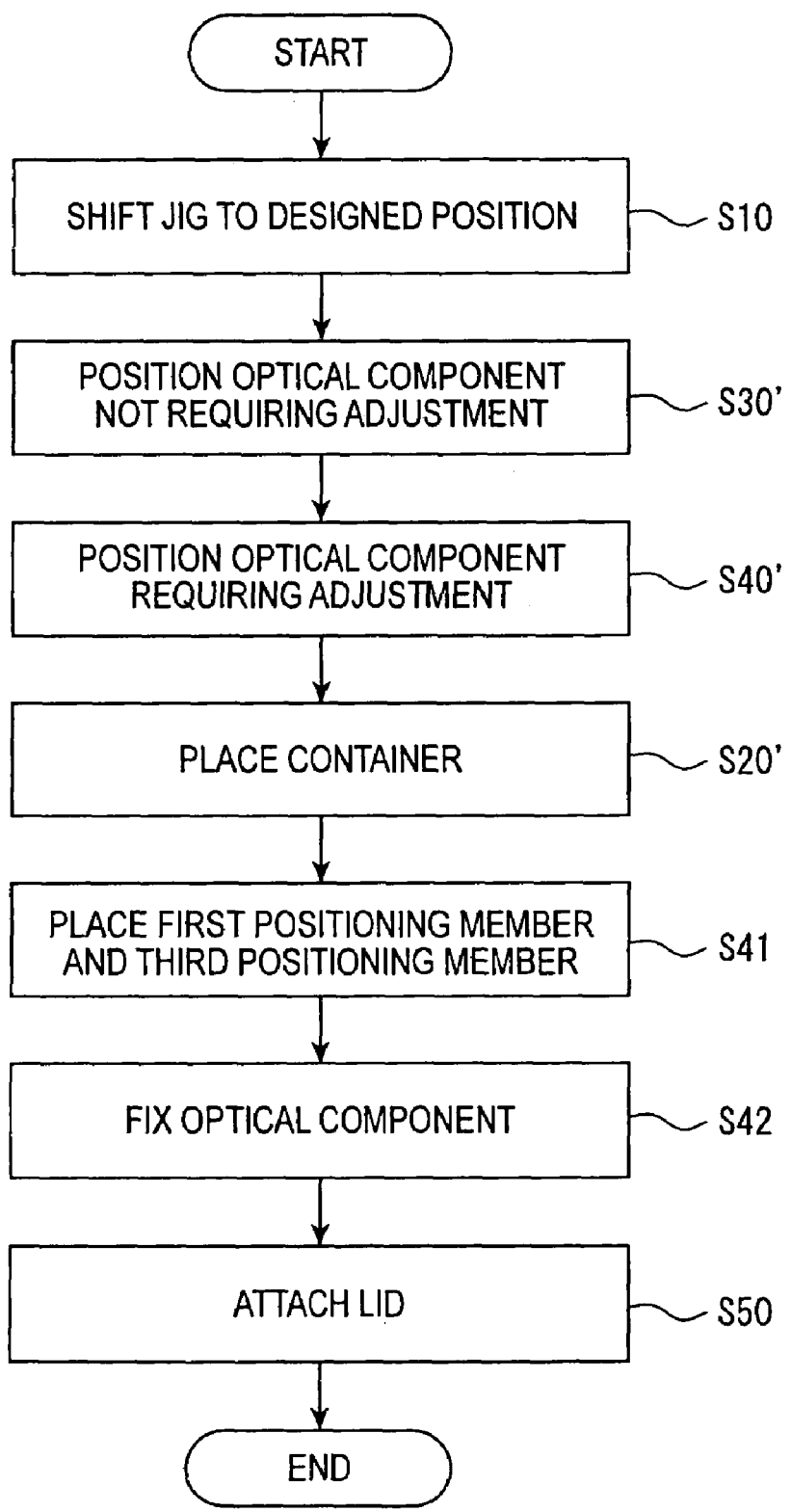
FIG. 59 is a flowchart explaining a method for manufacturing an optical unit according to a fifth embodiment.
Figure 60:
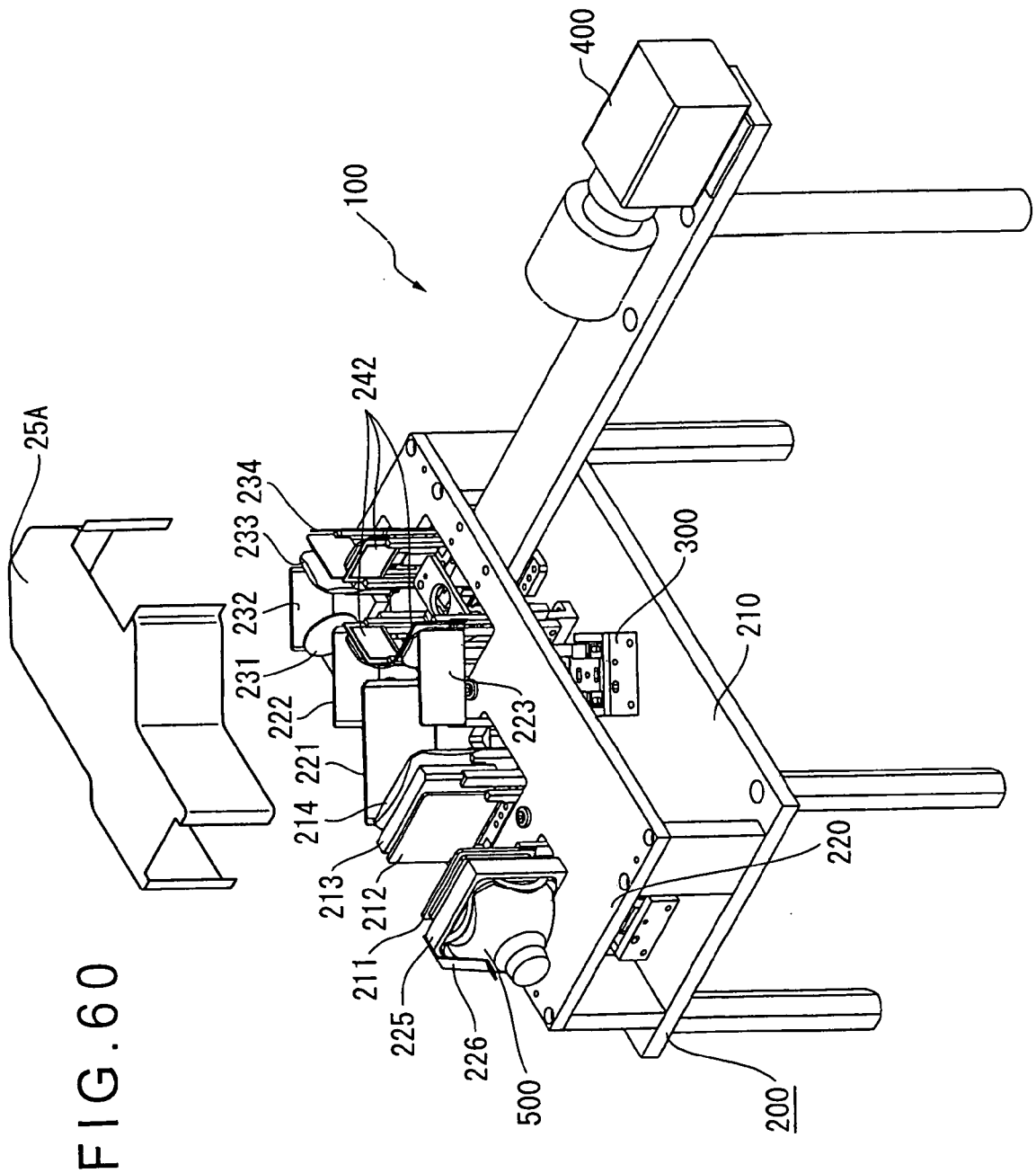
FIG. 60 is an illustration showing the state of step S20' of FIG. 59.

FIG. 59 is a flowchart explaining the optical unit 2 according to a fifth embodiment, and FIG. 60 is an illustration showing the state of a step S20', of FIG. 59. The fifth embodiment is the same as the second embodiment except a manufacturing method of the optical unit 2.

Firstly, as shown in FIG. 60, the optical component positioning jig 300 is arranged on the designed positions in the same manner as the manufacturing method according to the second embodiment. Secondly, the optical components 212 to 215, 221 to 224, 231 to 234, 242 and the prism unit are positioned on the design predetermined positions with the use of the optical component positioning jigs 300 of the manufacturing apparatus 100 (step S30' and S40'). The step S30' includes an operation corresponding to the steps S310 and S320 previously described with reference to FIG. 30 and an operation for positioning the prism unit by way of the manufacturing apparatus 100. Further, the step S40' corresponds to the steps S420, S430, S450, S460, S470, S480, S490, S500 and S510 previously described with reference to FIG. 32 etc. Then, as shown in FIG. 60, the container 25A is placed with the opening side thereof opposite to the side of the second table 220 (step S20'). With such operation, the positioned optical components 212 to 215, 221 to 224, 231 to 234, 242 and the prism unit are housed in the container 25A. Further, the optical components 215, 223, 232, 233 and 234 are placed on the first positioning members 253A or the third positioning members 253C with the ultraviolet curing adhesive applied in the same manner as the above-described steps S330 and S440 (step S41). The optical components 212 to 215, 221 to 224, 231 to 234 and 242 are fixed on the container 25A by curing the ultraviolet curing adhesive (step S42). Finally, the lid 25B is attached in the same manner as the above-described step S500.

With such manufacturing method, the same advantages as the second embodiment can be obtained. When the container 25A is placed on the manufacturing apparatus 100 according to the present embodiment, when the opening side thereof is placed on the side of the second table 220 instead of the bottom side, the holes 251D would not be necessary to insert the optical component positioning jig 300. Accordingly, the production cost of the optical component casing can be reduced, and consequently, the production cost of the optical unit can be reduced.

The optical component casing 25 is only required to have at least one opening, to which the part of the optical component positioning jig 300 can be inserted, and such opening may be provided on the lateral side of the container 25A or the lid 25B, even when the opening face thereof is not placed on the side of the second table 220. The optical component casing 25 may be a hollow structure integrating the container 25A and the lid 25B. In such case, it is required to form a plurality of holes on the top side or the bottom side of the optical component casing 25 so that the part of the optical component positioning jig 300, the optical components 212 to 215, 221 to 224, 231 to 234 and 242, and the prism unit can be inserted.

In the present embodiment, though the ultraviolet curing adhesive is used for fixing the optical components 212 to 215, 221 to 224, 231 to 234 and 242, a heat curing adhesive can be used. The adhesive is not limited to the ultraviolet curing adhesive neither the heat curing adhesive. The adhesive used for fixing the optical components 212 to 215, 221 to 224, 231 to 234 and 242 may be any adhesive as long as the adhesive would not be dried while fixing the positions.

Further, in the present embodiment, the optical components with the adhesive applied are placed on the jig (steps S310, S420 and S430). Further, the position adjustment of the optical components (step S40') is performed with the adhesive applied in advance. However, the placement of the optical components and the positioning of the optical components can be performed without the adhesive applied so as to apply the adhesive just prior to fixing the optical components (step S420). With such arrangement, it is not required to care about the drying of the adhesive. Accordingly, there is a wide choice of the adhesive. For instance, an instant adhesive may also be used. If the instant adhesive is used, the optical components can be fixed (step S420) at the time of applying the adhesive, thus facilitating the manufacturing operation.

Incidentally, the scope of the present invention is not restricted to the above embodiments but includes following modifications as long as an object of the present invention can be achieved.

Though a projector using three optical modulators are taken as an example in the above embodiments, the present invention may be applied to a projector using a single optical modulator, two optical modulators or more than three optical modulators.

Though a liquid crystal panel is used as the optical modulator in the above embodiments, an optical modulator other than the liquid crystal panel such as a device using a micro-mirror may be used.

Though a transmissive optical modulator having different light-incident side and light-irradiation side is used in the above embodiments, a reflective optical modulator having common light-incident side and light-irradiation side may be used.

Though a front-type projector that projects an image in a direction for observing a screen is taken as an example in the above embodiments, the present invention may be applied to a rear-type projector that projects an image in a direction opposite to the direction for observing the screen.

INDUSTRIAL AVAILABILITY

As described above, since the optical component casing of the present invention can reduce the production cost and easily be manufactured, it is useful as the optical component casing for a projector utilized in the field of presentation and the home theater.

The invention claimed is:

1. An optical component casing with an illumination optical axis of light beam irradiated by a light source being set therein, in which a plurality of optical components are housed and arranged at predetermined positions on the illumination optical axis, the optical component casing comprising:

a casing body having a plurality of holes penetrating toward the inside thereof, in which the plurality of optical components are housed and arranged therein; and a plurality of positioning members for positioning the plurality of optical components at the predetermined positions in the casing body, wherein the plurality of positioning members are inserted to the plurality of holes to abut on the optical components so that the plurality of optical components are positioned at the predetermined positions on the illumination optical axis of the light beam irradiated by the light source, wherein the plurality of positioning members include a parallel arrangement positioning member that abuts on the optical component arranged along an inner side of the casing body to position the optical component at the predetermined position on the illumination optical axis of the light beam irradiated by the light source, and wherein the parallel arrangement positioning member has a plurality of pins inserted into the plurality of holes to abut on the optical component.

2. The optical component casing according to claim 1, wherein the casing body is formed by sheet metal processing.

3. The optical component casing according to claim 1, wherein the parallel arrangement positioning member includes a plate body integrating the plurality of pins.

4. A projector comprising:

an optical component casing according to claim 1;

a plurality of optical components housed and arranged in the optical component casing to form an optical image in accordance with image information; and a projection optical device for projecting the optical image formed by the plurality of optical components in an enlarged manner.

5. An optical component casing with an illumination optical axis of light beam irradiated by a light source being set therein, in which a plurality of optical components are housed and arranged at predetermined positions on the illumination optical axis, the optical component casing comprising:

a casing body having a plurality of holes penetrating toward the inside thereof, in which the plurality of optical components are housed and arranged therein; and and a plurality of positioning members for positioning the plurality of optical components at the predetermined positions in the casing body, wherein the plurality of positioning members are inserted to the plurality of holes to abut on the optical components so that the plurality of optical components are positioned at the predetermined positions on the illumination optical axis of the light beam irradiated by the light source, and wherein the plurality of positioning members include orthogonal arrangement positioning members each of which abuts on the optical component housed in the casing body in a manner orthogonal to the illumination optical axis of the light beam irradiated by the light source to position the optical component at the predetermined position on the illumination optical axis of the light beam irradiated by the light source.

6. The optical component casing according to claim 5, wherein the orthogonal arrangement positioning member has a groove having a V-shaped cross-section so that the groove abuts on an outer periphery of the optical component.

7. The optical component casing according to claim 5, wherein a support portion for supporting the positioning member is formed at the hole.

8. The optical component casing according to claim 7, wherein the hole is formed by cutting and folding a part of a lateral side of the casing body, wherein the cut and folded part of the lateral side serves as the support portion.

9. The optical component casing according to claim 5, wherein the casing body is formed by sheet metal processing.

10. A projector comprising:

an optical component casing according to claim 5;

a plurality of optical components housed and arranged in the optical component casing to form an optical image in accordance with image information; and a projection optical device for projecting the optical image formed by the plurality of optical components in an enlarged manner.

11. An optical component casing with an illumination optical axis of light beam irradiated by a light source being set therein, in which a plurality of optical components are housed and arranged at predetermined positions on the illumination optical axis, the optical component casing comprising:

a casing body having a plurality of holes penetrating toward the inside thereof, in which the plurality of optical components are housed and arranged therein;

and a plurality of positioning members for positioning the plurality of optical components at the predetermined positions in the casing body, wherein the plurality of positioning members are inserted to the plurality of holes to abut on the optical components so that the plurality of optical components are positioned at the predetermined positions on the illumination optical axis of the light beam irradiated by the light source; and a pair of plate members opposite to both ends of the optical component housed in an inclined manner relative to the lateral side of the casing body, wherein the plurality of positioning members include an inclined arrangement positioning member that includes spacers respectively interposed between the both ends of the optical component and the plate members to position the optical component at the predetermined position on the illumination optical axis of the light beam irradiated by the light source by way of the spacers.

12. The optical component casing according to claim 11, wherein the inclined arrangement positioning member includes the spacers, a mount fixed on the bottom side of the casing body and the pair of plate members vertically provided on the mount.

13. The optical component casing according to claim 11, wherein each part of the pair of plate members is cut and folded toward the other plate member, wherein the cut and folded part of the plate member serves as a support portion for supporting the spacer.

14. The optical component casing according to claim 11, wherein the spacer has a face slanted along an inclined direction of the optical component.

15. The optical component casing according to claim 11, wherein the casing body is formed by sheet metal processing.

16. A projector comprising:
an optical component casing according to claim 11;
a plurality of optical components housed and arranged in the optical component casing to form an optical image in accordance with image information; and
a projection optical device for projecting the optical image formed by the plurality of optical components in an enlarged manner.

17. An optical component casing with an illumination optical axis of light beam irradiated by a light source being set therein, in which a plurality of optical components are housed and arranged at predetermined positions on the illumination optical axis, the optical component casing comprising:
a casing body having holes penetrating toward the inside thereof and support portions for supporting a group of the plurality of optical components; and
a plurality of positioning members for positioning the rest of the plurality of optical components at predetermined positions in the optical component casing,
wherein the plurality of positioning members are inserted to the holes to abut on the optical components so that the rest of the optical components are positioned at the predetermined positions on the illumination optical axis of the light beam irradiated by the light source,
wherein the group of the optical components are held by the support portions while being positioned at the predetermined positions on the illumination optical axis of the light beam irradiated by the light source,
wherein each one side of the group of the optical components is fixed on each one side of the support portions, and
wherein a groove is formed on each of the support portions at a position abutting the one side of the group of the optical components to inject an adhesive for fixing the group of the optical components.

18. The optical component casing according to claim 17, wherein the groove is formed in an approximately planarly-viewed straight line extending from a first side of the support portion to a second side opposite to the first side so that an outflow of the adhesive from the first side to the second side opposite to the first side is restricted by a terminal on the second side.

19. A projector comprising:
an optical component casing according to claim 17;
a plurality of optical components housed and arranged in the optical component casing to form an optical image in accordance with image information; and
a projection optical device for projecting the optical image formed by the plurality of optical components in an enlarged manner.

20. An optical component casing with an illumination optical axis of light beam irradiated by a light source being set therein, in which a plurality of optical components are housed and arranged at predetermined positions on the illumination optical axis, the optical component casing comprising:
a plurality of support portions formed on an inner side of the optical component casing for respectively supporting the plurality of optical components,
wherein the plurality of optical components are respectively held by the plurality of support portions while being positioned at the predetermined positions on the illumination optical axis of the light beam irradiated by the light source,
wherein each one side of the plurality of optical components is respectively fixed on each one side of the plurality of support portions,
wherein at least one of the support portions is formed in a profile having a V-shape cross-section to sandwich and support both sides of the optical component, and
wherein each inner side of the support portions is fixed on at least one of the both sides of the optical component.

21. The optical component casing according to claim 20, wherein a groove for an adhesive for fixing the optical component to be injected is formed on the support portion at a position abutting on the optical component.

22. A projector comprising:
an optical component casing according to claim 20;
a plurality of optical components housed and arranged in the optical component casing to form an optical image in accordance with image information; and
a projection optical device for projecting the optical image formed by the plurality of optical components in an enlarged manner.

23. An optical component casing with an illumination optical axis of light beam irradiated by a light source being set therein, in which a plurality of optical components are housed and arranged at predetermined positions on the illumination optical axis, the optical component casing comprising:
a plurality of support portions formed on an inner side of the optical component casing for respectively supporting the plurality of optical components,
wherein the plurality of optical components are respectively held by the plurality of support portions while being positioned at the predetermined positions on the illumination optical axis of the light beam irradiated by the light source,
wherein each one side of the plurality of optical components is respectively fixed on each one side of the plurality of support portions,
wherein at least one of the plurality of support portions projects from the inner side of the optical component casing to support the optical component arranged along the inner side at a projected tip end thereof, and
wherein the tip end of the support portion is fixed on the one side of the optical component.

24. The optical component casing according to claim 23, wherein the optical component casing is a synthetic resin molding product having a frame-shaped hole formed on the inner side of the optical component casing to planarly surround the support portion.

25. A projector comprising:
an optical component casing according to claim 23;
a plurality of optical components housed and arranged in the optical component casing to form an optical image in accordance with image information; and
a projection optical device for projecting the optical image formed by the plurality of optical components in an enlarged manner.

26. An optical component casing with an illumination optical axis of light beam irradiated by a light source being set therein, in which a plurality of optical components are housed and arranged at predetermined positions on the illumination optical axis, the optical component casing comprising:
a casing body having holes penetrating toward the inside thereof and support portions for supporting a group of the plurality of optical components; and a plurality of positioning members for positioning the rest of the plurality of optical components at predetermined positions in the optical component casing, wherein the plurality of positioning members are inserted to the holes to abut on the optical components so that the rest of the optical components are positioned at the predetermined positions on the illumination optical axis of the light beam irradiated by the light source, wherein the group of the optical components are held by the support portions while being positioned at the predetermined positions on the illumination optical axis of the light beam irradiated by the light source, wherein each one side of the group of the optical components is fixed on each one side of the support portions, wherein the plurality of positioning members include a parallel arrangement positioning member that abuts on the optical component arranged along an inner side of the casing body to position the optical component at the predetermined position on the illumination optical axis of the light beam irradiated by the light source, and wherein the parallel arrangement positioning member has a plurality of pins inserted to the plurality of holes to abut on the optical component.

27. The optical component casing according to claim 26, wherein the parallel arrangement positioning member includes a plate body integrating the plurality of pins.

28. A projector comprising:
an optical component casing according to claim 26;
a plurality of optical components housed and arranged in the optical component casing to form an optical image in accordance with image information; and
a projection optical device for projecting the optical image formed by the plurality of optical components in an enlarged manner.

29. An optical component casing with an illumination optical axis of light beam irradiated by a light source being set therein, in which a plurality of optical components are housed and arranged at predetermined positions on the illumination optical axis, the optical component casing comprising:

a casing body having holes penetrating toward the inside thereof and support portions for supporting a group of the plurality of optical components; and a plurality of positioning members for positioning the rest of the plurality of optical components at predetermined positions in the optical component casing, wherein the plurality of positioning members are inserted to the holes to abut on the optical components so that the rest of the optical components are positioned at the predetermined positions on the illumination optical axis of the light beam irradiated by the light source, wherein the group of the optical components are held by the support portions while being positioned at the predetermined positions on the illumination optical axis of the light beam irradiated by the light source, wherein each one side of the group of the optical components is fixed on each one side of the support portions, wherein the plurality of positioning members include orthogonal arrangement positioning members each of which abuts on the optical component housed in the casing body in a manner orthogonal to the illumination optical axis of the light beam irradiated by the light source to position the optical component at the predetermined position on the illumination optical axis of the light beam irradiated by the light source.

30. The optical component casing according to claim 29, wherein the orthogonal arrangement positioning member has a groove having a V-shaped cross-section so that the groove abuts on an outer periphery of the optical component.

31. A projector comprising:
an optical component casing according to claim 29;
a plurality of optical components housed and arranged in the optical component casing to form an optical image in accordance with image information; and
a projection optical device for projecting the optical image formed by the plurality of optical components in an enlarged manner.

* * * * *